(12) United States Patent
Rosenblatt et al.

(10) Patent No.: US 8,850,052 B2
(45) Date of Patent: Sep. 30, 2014

(54) SYSTEM AND METHOD FOR SIMPLIFIED RESOURCE SHARING

(75) Inventors: Michael Rosenblatt, Campbell, CA (US); Gloria Lin, San Ramon, CA (US); Sean Anthony Mayo, Dover, NH (US); Taido Lantz Nakajima, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 806 days.

(21) Appl. No.: 12/286,495

(22) Filed: Sep. 30, 2008

(65) Prior Publication Data
US 2010/0082784 A1  Apr. 1, 2010

(51) Int. Cl.
*G06F 15/167* (2006.01)
*G06F 15/16* (2006.01)

(52) U.S. Cl.
USPC .......... 709/231; 709/212; 709/216; 709/227; 709/228; 709/230; 709/232; 709/233; 709/234; 709/235; 709/236; 709/237

(58) Field of Classification Search
CPC ............... H04L 65/4069; H04L 29/06326; H04L 29/06448
USPC .......... 709/202–207, 217–238, 244, 212, 216
See application file for complete search history.

(56) References Cited

U.S. PATENT DOCUMENTS

| | | |
|---|---|---|
| 4,701,601 A | 10/1987 | Francini et al. |
| 4,868,376 A | 9/1989 | Lessin et al. |
| 4,929,819 A | 5/1990 | Collins, Jr. |
| 5,239,167 A | 8/1993 | Kipp |
| 5,276,311 A | 1/1994 | Hennige |
| 5,540,301 A | 7/1996 | Dumont |
| 5,917,913 A | 6/1999 | Wang |

(Continued)

FOREIGN PATENT DOCUMENTS

| | | |
|---|---|---|
| EP | 1331561 A2 | 7/2003 |
| WO | 02/08863 A2 | 1/2002 |
| WO | 2008/112497 A1 | 9/2008 |
| WO | 2009/018255 A2 | 2/2009 |

OTHER PUBLICATIONS

C2, "Near Field Communication in the real World part I: Turning the NFC promise into profitable everyday applications", Innovation Research & Technology plc, Gloucestershire, United Kingdom. Filed by the Applicant with the IDS filed on Jan. 30, 2009.*

(Continued)

*Primary Examiner* — Edward Kim
(74) *Attorney, Agent, or Firm* — Womble Carlyle Sandridge & Rice LLP

(57) ABSTRACT

Systems, methods, and devices for simplified resource-sharing with electronic devices are provided. For example, a method for using at least one resource of a variety of electronic devices from another electronic device may include receiving resource-sharing information associated with a resource-sharing electronic device via near field communication, determining a resource-sharing scheme for using the resources of the resource-sharing electronic device based on the resource-sharing information, and sharing at least one resource of the resource-sharing electronic device using the determined resource-sharing scheme. The resource-sharing information may be received from a near field communication interface of the resource-sharing electronic device or from a radio frequency identification tag associated with the resource-sharing electronic device.

19 Claims, 63 Drawing Sheets

(56) References Cited

U.S. PATENT DOCUMENTS

| | | | |
|---|---|---|---|
| 6,175,922 B1 | 1/2001 | Wang | |
| 6,400,270 B1 | 6/2002 | Person | |
| 6,684,269 B2 | 1/2004 | Wagner | |
| 6,694,387 B2 | 2/2004 | Wagner | |
| 6,910,697 B2 | 6/2005 | Varatharajah et al. | |
| 7,089,214 B2 | 8/2006 | Wang | |
| 7,128,274 B2 | 10/2006 | Kelley et al. | |
| 7,149,503 B2 | 12/2006 | Aarnia et al. | |
| 7,240,036 B1 | 7/2007 | Mamdani et al. | |
| 7,316,347 B2 | 1/2008 | Poor | |
| 7,334,728 B2 | 2/2008 | Williams | |
| 7,376,591 B2 | 5/2008 | Owens | |
| 7,464,050 B1 | 12/2008 | Deaton et al. | |
| 8,041,338 B2* | 10/2011 | Chen et al. | 455/407 |
| 2002/0082931 A1 | 6/2002 | Siegel et al. | |
| 2002/0178088 A1 | 11/2002 | Lurie et al. | |
| 2004/0203352 A1 | 10/2004 | Hall et al. | |
| 2004/0203636 A1 | 10/2004 | Chan et al. | |
| 2005/0116027 A1 | 6/2005 | Aigiene et al. | |
| 2005/0125343 A1 | 6/2005 | Mendelovich | |
| 2005/0131871 A1 | 6/2005 | Howard et al. | |
| 2005/0222961 A1 | 10/2005 | Staib et al. | |
| 2006/0094356 A1* | 5/2006 | Dawidowsky | 455/41.1 |
| 2006/0111944 A1 | 5/2006 | Sirmans et al. | |
| 2006/0213972 A1 | 9/2006 | Kelley et al. | |
| 2006/0243609 A1 | 11/2006 | Cole et al. | |
| 2006/0266822 A1 | 11/2006 | Kelley et al. | |
| 2006/0287004 A1 | 12/2006 | Fuqua | |
| 2007/0022058 A1 | 1/2007 | Labrou et al. | |
| 2007/0043670 A1 | 2/2007 | Dionne | |
| 2007/0043678 A1 | 2/2007 | Dionne | |
| 2007/0150369 A1 | 6/2007 | Zivin | |
| 2007/0190939 A1 | 8/2007 | Abel | |
| 2007/0205275 A1 | 9/2007 | Nicola et al. | |
| 2007/0228179 A1 | 10/2007 | Atkinson | |
| 2007/0235539 A1 | 10/2007 | Sevanto et al. | |
| 2007/0255652 A1 | 11/2007 | Tumminaro et al. | |
| 2007/0265033 A1 | 11/2007 | Brostrom | |
| 2007/0278290 A1 | 12/2007 | Messerges et al. | |
| 2008/0005195 A1 | 1/2008 | Li | |
| 2008/0052243 A1 | 2/2008 | Narayanaswami et al. | |
| 2008/0059323 A1 | 3/2008 | Chang et al. | |
| 2008/0113614 A1* | 5/2008 | Rosenblatt | 455/3.05 |
| 2008/0154734 A1 | 6/2008 | Fernandez et al. | |
| 2008/0189360 A1* | 8/2008 | Kiley et al. | 709/203 |
| 2009/0068982 A1* | 3/2009 | Chen et al. | 455/407 |
| 2009/0282130 A1* | 11/2009 | Antoniou et al. | 709/220 |

OTHER PUBLICATIONS

NFC Forum; Near Field Communication and the NFC Forum: The Keys to Truly Interoperable Communications; http://www.nfc-forum.org/resources/white_papers/nfc_forum_marketing_white_paper.pdf; Wakefield, MA, USA 2007.

Near Field Communication in the real world part I; Turning the NFC promise into profitable, everyday applications; http://www.nfc-forum.org/resources/white_papers/Innovision_whitePaper1.pdf ; Innovation Research & Technology plc; Gloucestershire, United Kingdom.

Near Field Communication in the real world part II, Using the right NFC tag type for the right NFC application; http://www.nfc-forum.org/resources/white_papers/Innovision_whitePaper2.pdf ; Innovation Research & Technology plc; Gloucestershire, United Kingdom.

Near Field Communication in the real world part III, Moving to System on Chip (SoC) integration; http://www.nfc-forum.org/resources/white_papers/Innovision_whitePaper3.pdf ; Innovation Research & Technology plc; Gloucestershire, United Kingdom 2007.

Ricker, Thomas; Nokia's 6212 with Bluetooth NFC: Let the pairing revolution begin!; http://www.engadget.com/2008/04/15/nokias-6212-with-bluetooth-nfc-let-the-pairing-revolution-begi/ ; Engadget; 2008.

NFC trial in NYC enables merchant and transit payment via cell phones; Citi/ATT/MasterCard/Nokia run trial in NYC with MTA et al.; http://www.contactlessnews.com/2006/12/14/nfc-trial-in-nyc-enables-merchant-and-transit-payments-via-cell-phones ; Contactless News; 2006.

Port Authority, NJ Transit to test contactless cards; Port Authority/NJ Transit run compatible trial with NYC;http://www.contactlessnews.com/2008/02/25/port-authority-nj-transit-to-test-contactless-cards/ ; Contactless News 2008.

Bart NFC trial first to use mobile phones to pay for fares, food; Bart et al. run trial for automated food and transit payments; http://www.contactlessnews.com/2008/01/29/bart-nfc-trial-first-to-use-mobile-phones-to-pay-for-fares-food/ ; Contactless News 2008.

New NFC trial launched in Spokane; U.S. Bank/MasterCard run trial in Spokane, WA; http://www.contactlessnews.com/2008/01/28/new-nfc-trial-launched-in-spokane/ ; Contactless News 2008.

Ticketmaster UK & Live Nation Introduce State of the Art Access Control in Live Nation Theatres; Ticketmaster Press Release; Jul. 28, 2008.

Mobiqa; Mobile barcode solutions; Where Would You Like to Go?: http://www.mobiqa.com.

Mobiqa Airlines; Mobilising the business: http://www.mobiqa.com/airlines.

Mobiqa Cinama; mobi-ticket™—coming to a cinema near you: http://www.mobiqa.com/cinema.

Mobiqa Live Events; mobi-ticket™—let me entertain you: http://www.mobiqa.com/live.

Mobiqa Rail; Keep on track with mobi-ticket™: http://www.mobiqa.com/rail.

Mobiqa Retail; Shop for success with mobi-coupon™: http://www.mobiqa.com/retail.

K. Penttila, et al.; "Use and interface definition of mobile RFID reader integrated in a smart phone," Consumer Electronics, 2005, Proceedings of the 9th International Symposium on Macau SAR, Jun. 14-16, 2005, IEEE, Jun. 14, 2005, pp. 353-358.

Chinese Application No. 200980138604.X—First Office Action dated Apr. 18, 2013.

* cited by examiner

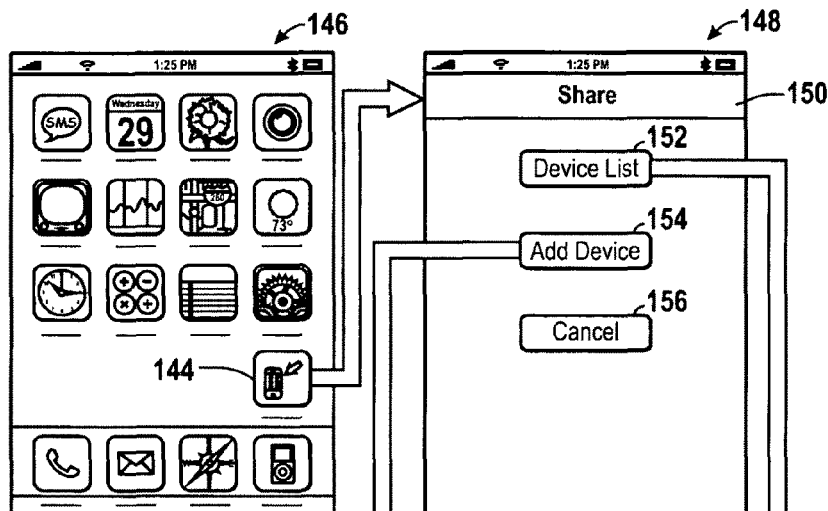
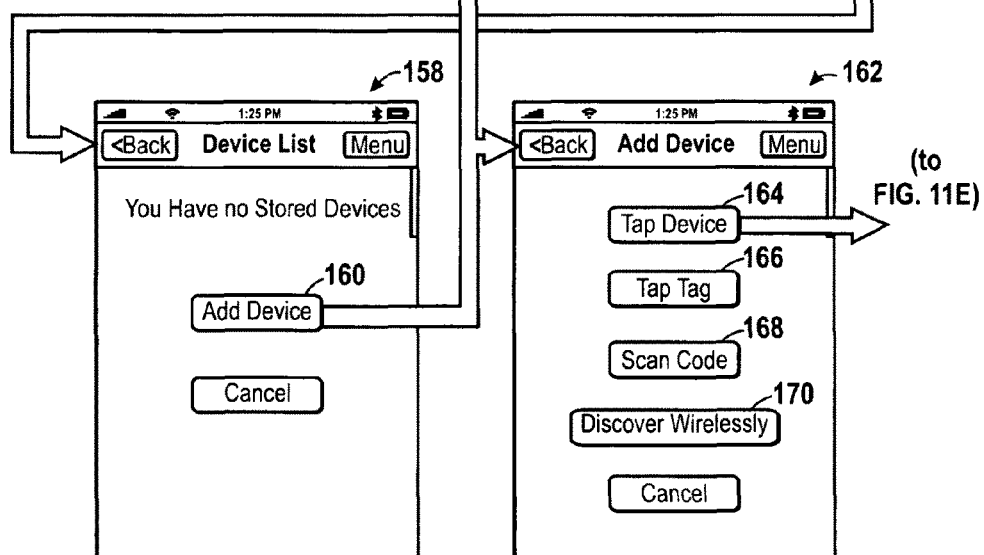
FIG. 11A  FIG. 11B
FIG. 11C  FIG. 11D (to FIG. 33E)

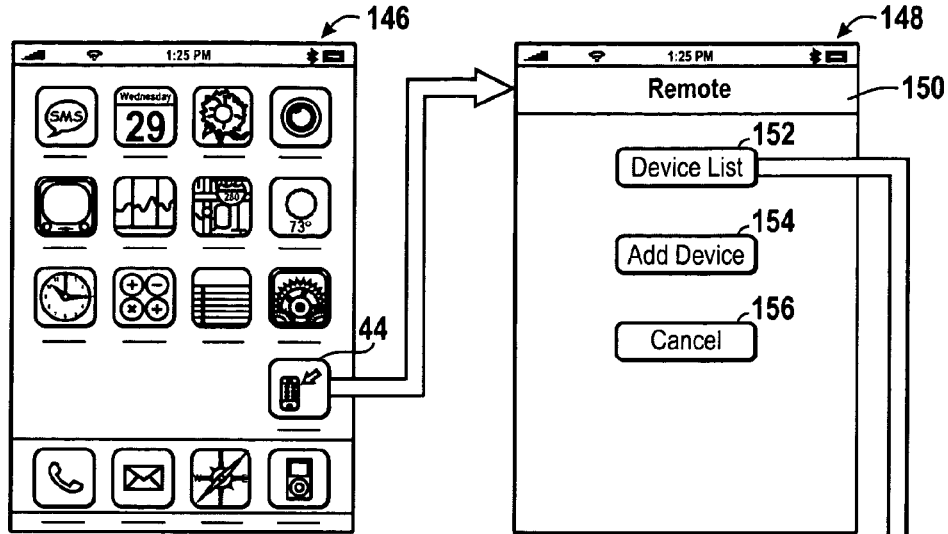
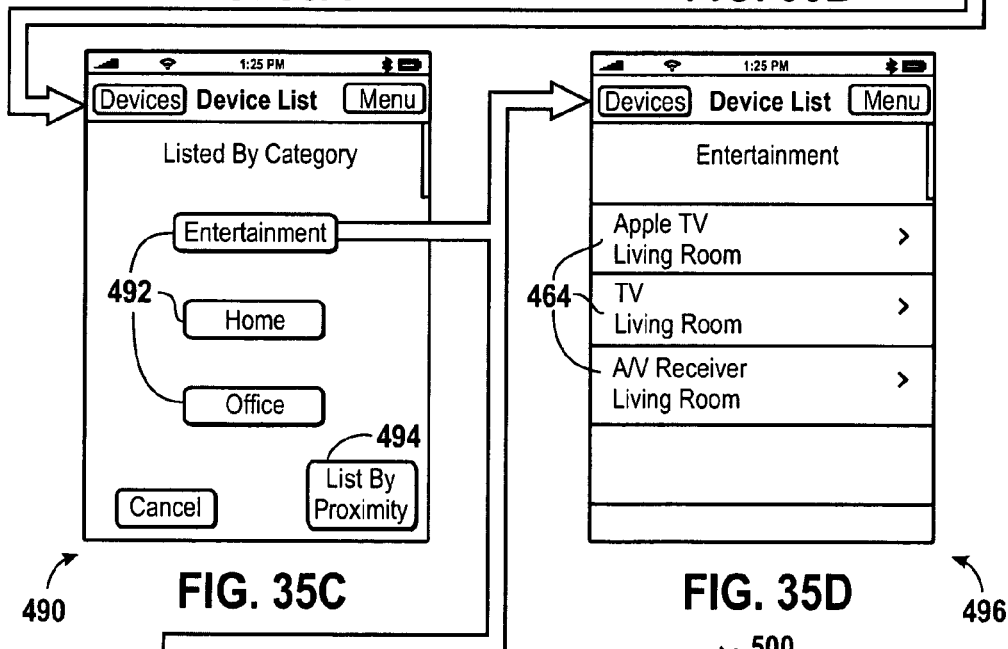
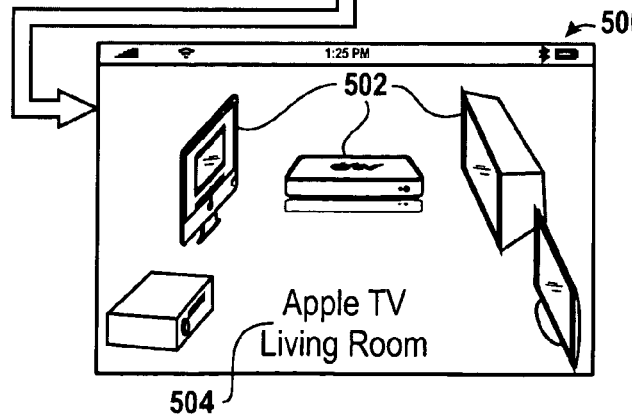
FIG. 35A  FIG. 35B  FIG. 35C  FIG. 35D  FIG. 35E

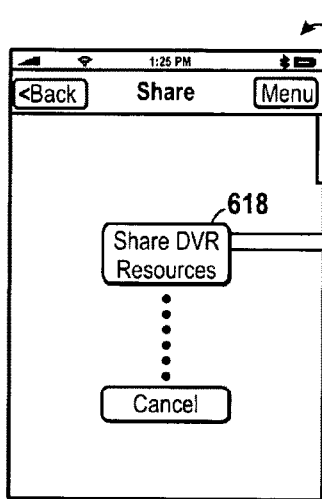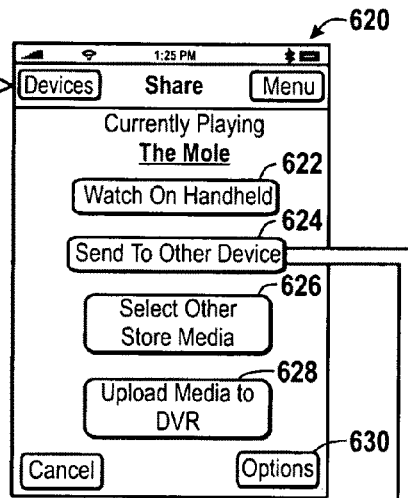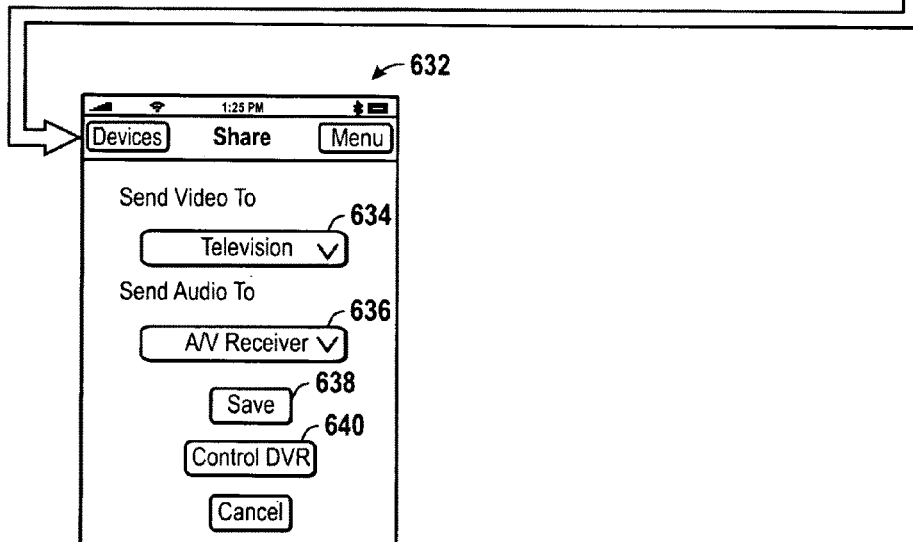
FIG. 46A        FIG. 46B
FIG. 46C

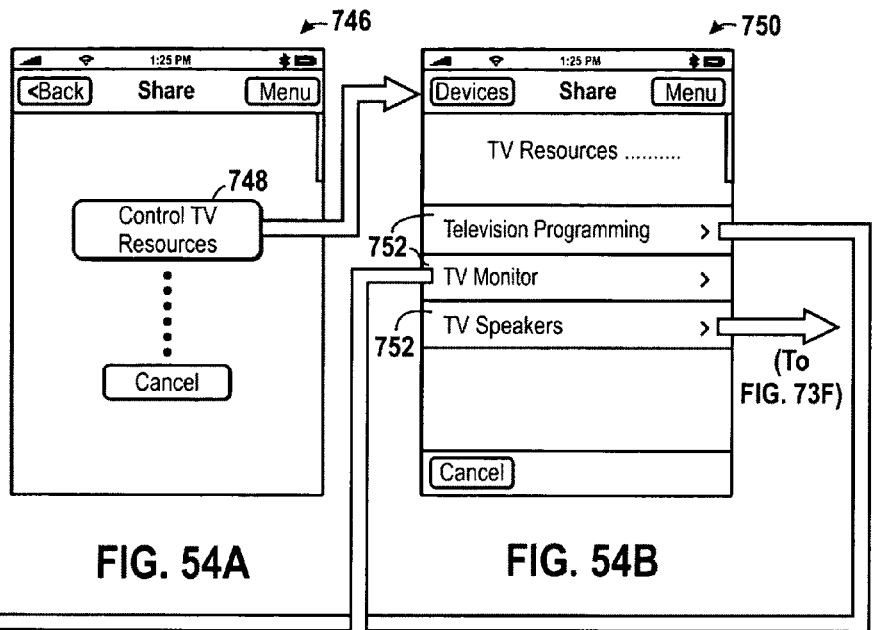
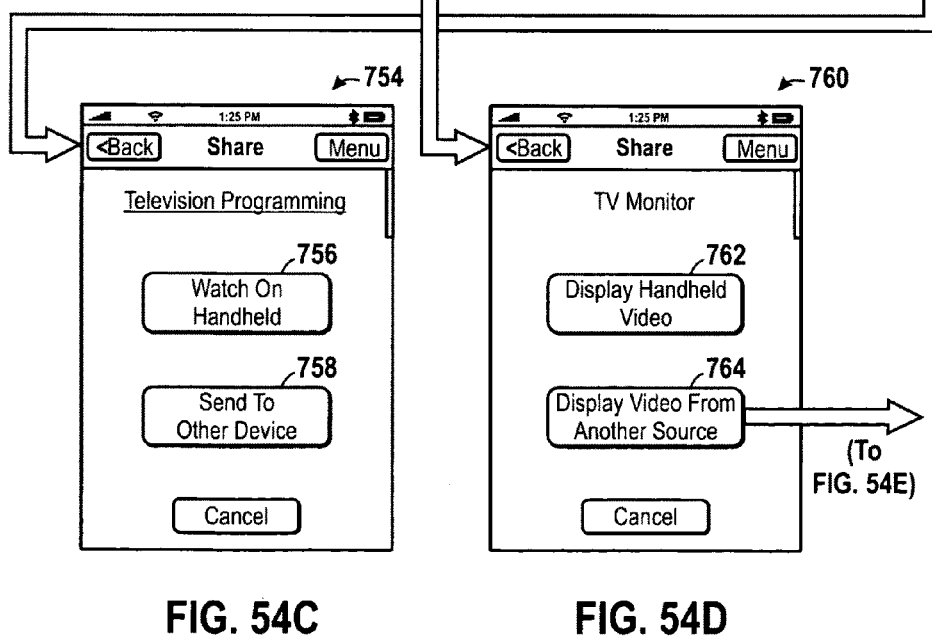
FIG. 54A   FIG. 54B
FIG. 54C   FIG. 54D

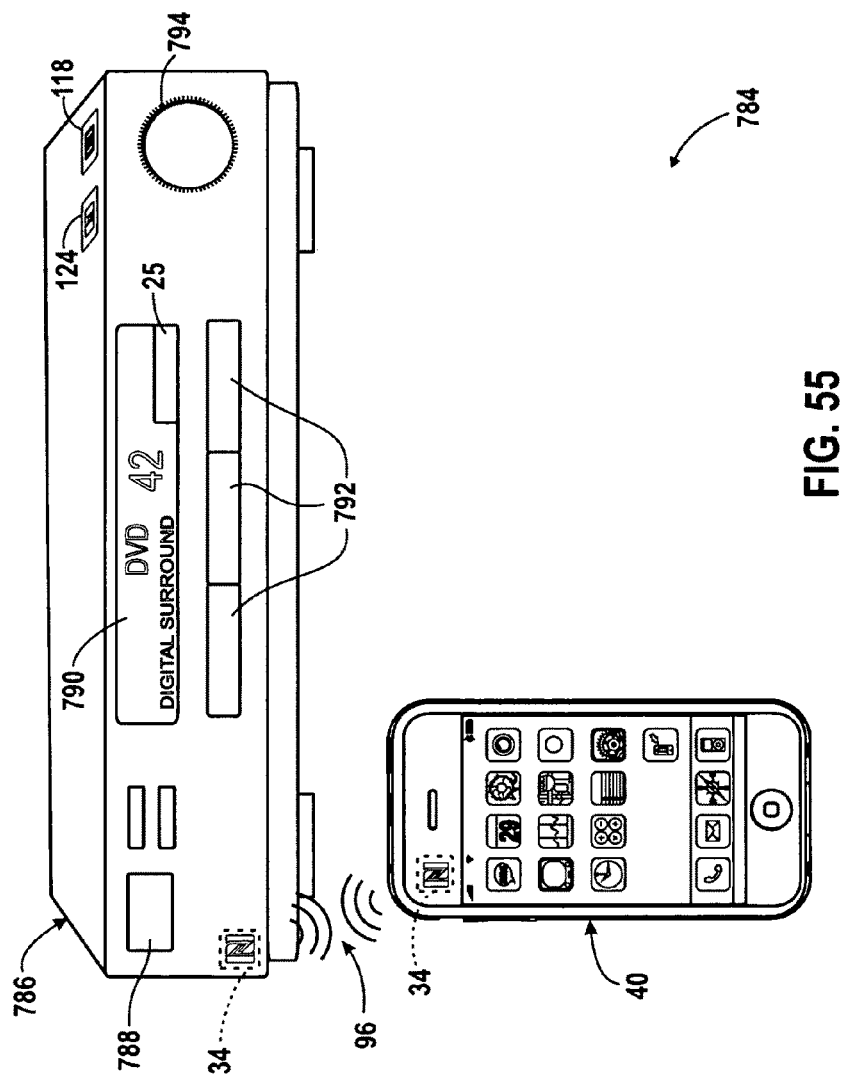

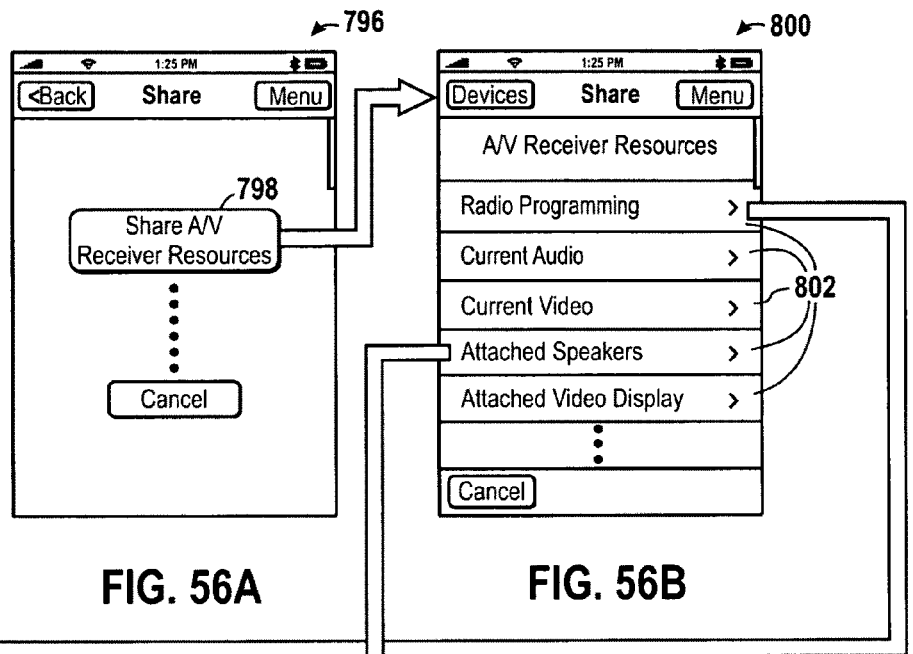
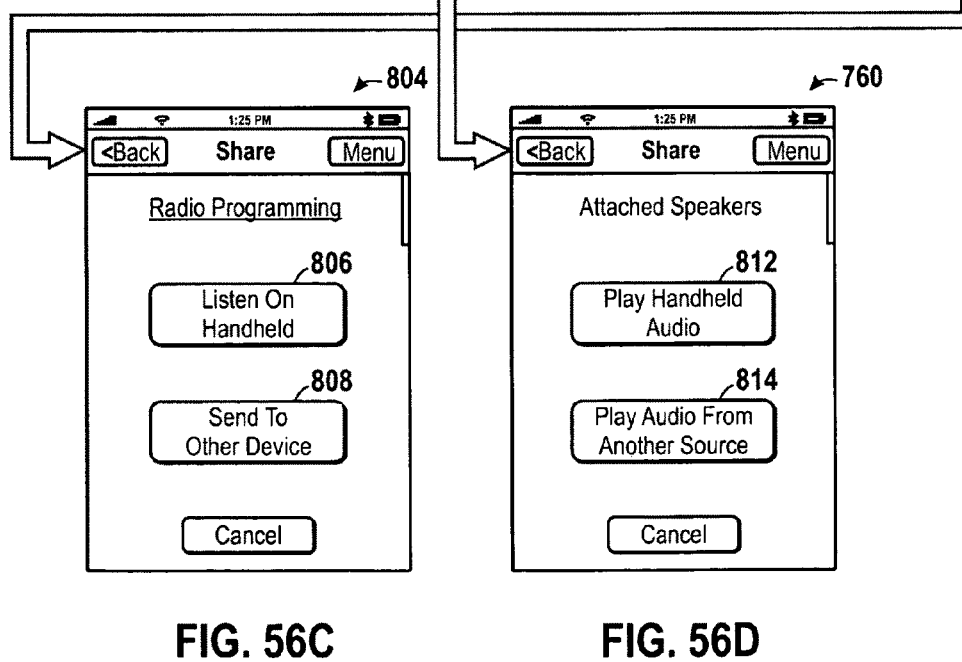
FIG. 56A  FIG. 56B  FIG. 56C  FIG. 56D

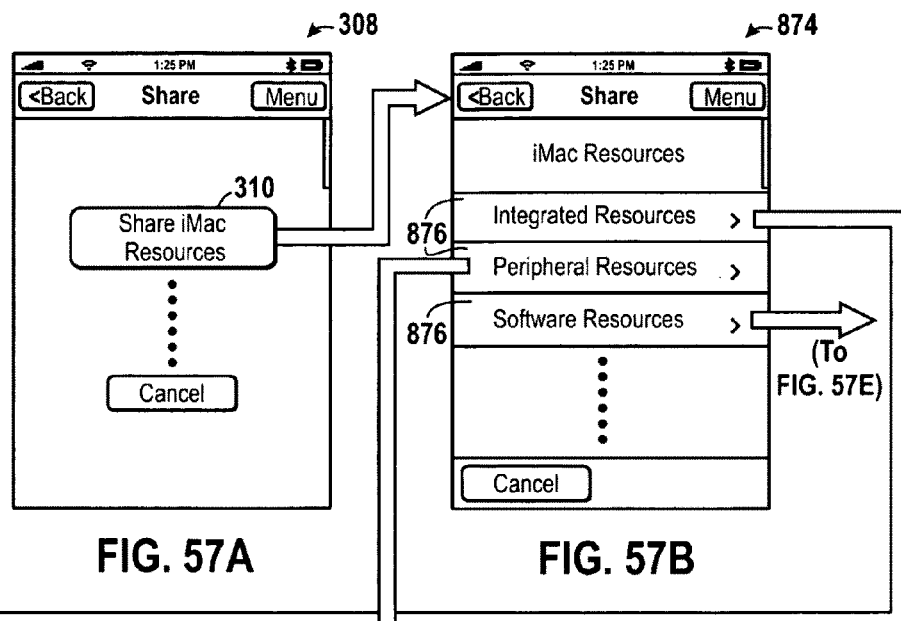
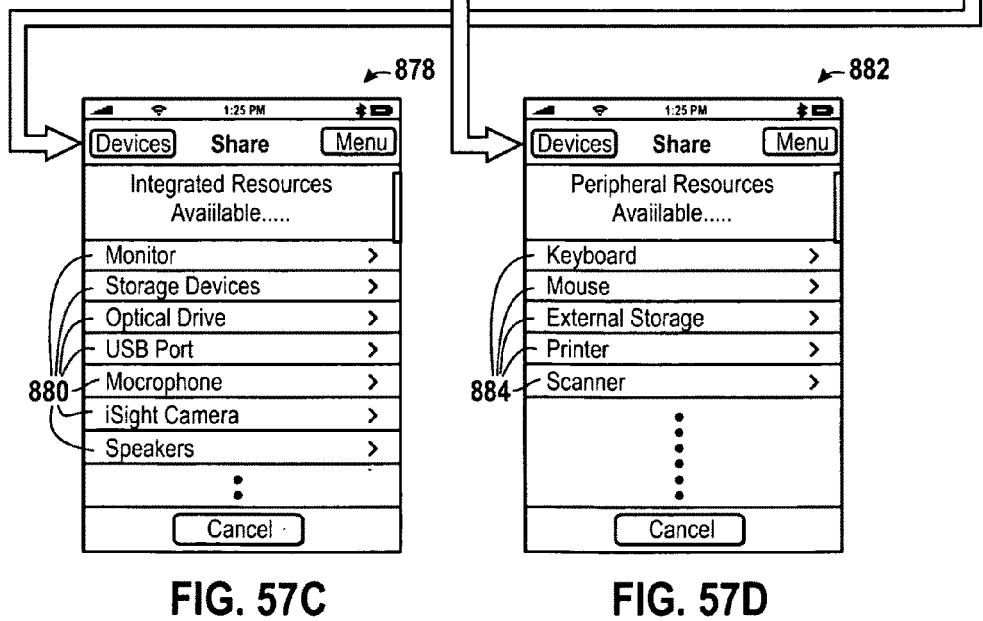
FIG. 57A  FIG. 57B
FIG. 57C  FIG. 57D

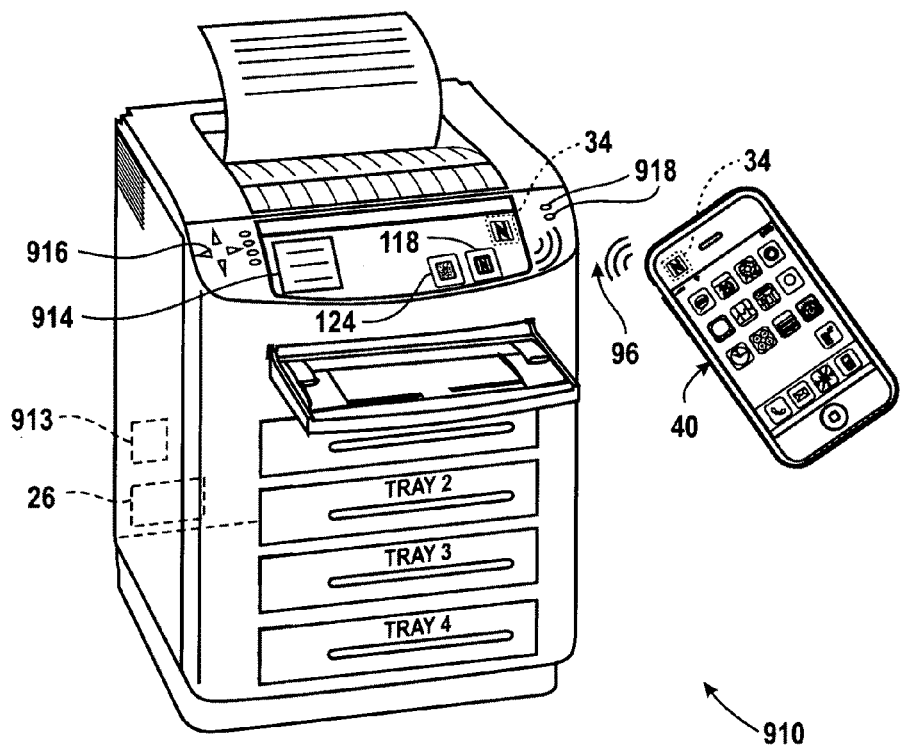
FIG. 60
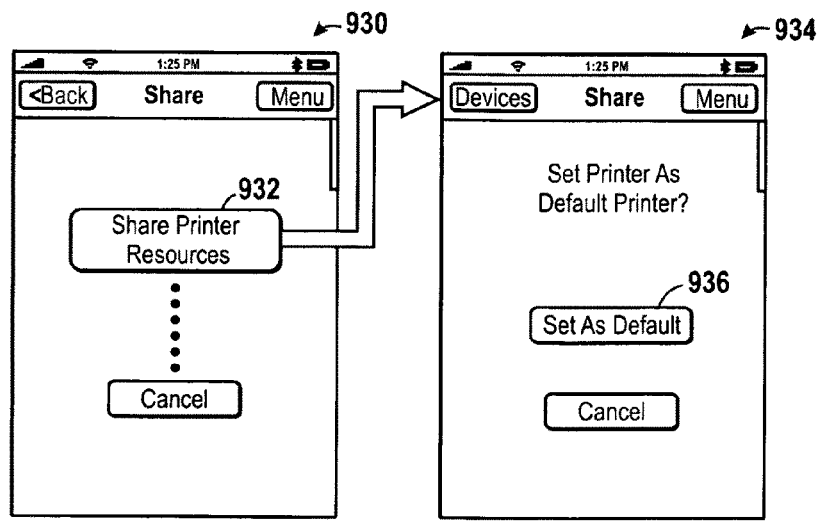
FIG. 61A  FIG. 61B

SYSTEM AND METHOD FOR SIMPLIFIED RESOURCE SHARING

BACKGROUND

1. Technical Field

The present disclosure relates generally to sharing resources among electronic devices and, more particularly, to sharing resources among electronic devices in a simplified manner.

2. Description of the Related Art

This section is intended to introduce the reader to various aspects of art that may be related to various aspects of the present disclosure, which are described or claimed below. This discussion is believed to be helpful in providing the reader with background information to facilitate a better understanding of the various aspects of the present disclosure. Accordingly, it should be understood that these statements are to be read in this light, and not as admissions of prior art.

A person may use a wide variety of electronic devices each day, including computers and media players, televisions and other entertainment devices, and/or consumer electronics such as digital cameras. Each electronic device may generally employ a variety of individual resources that may be available for use on the device. For example, a television may have a display screen to display television video and/or speakers to output television sound. To the extent that such resources may be available for use by another electronic device, initiating and establishing such sharing of resources may involve a series of complicated, unintuitive procedures.

SUMMARY

Certain aspects commensurate in scope with the disclosed embodiments are set forth below. It should be understood that these aspects are presented merely to provide the reader with a brief summary of certain forms the invention might take and that these aspects are not intended to limit the scope of the invention. Indeed, the invention may encompass a variety of aspects that may be set forth below.

By way of example, a method for using at least one resource of a variety of electronic devices from another electronic device may include receiving resource-sharing information associated with a resource-sharing electronic device via near field communication, determining a resource-sharing scheme for using the resources of the resource-sharing electronic device based on the resource-sharing information, and sharing at least one resource of the resource-sharing electronic device using the determined resource-sharing scheme. The resource-sharing information may be received from a near field communication interface of the resource-sharing electronic device or from a radio frequency identification tag associated with the resource-sharing electronic device.

BRIEF DESCRIPTION OF THE DRAWINGS

Advantages of the invention may become apparent upon reading the following detailed description and upon reference to the drawings in which:

FIGS. 11A-E are schematics of screens that may be displayed on a resource-using electronic device for establishing resource-sharing with a resource-sharing electronic device;

FIGS. 35A-E are schematics of screens that may be displayed in carrying out the method of the flowchart of FIG. 34;

FIGS. 46A-C are schematics of screens that may be displayed following the display for using the resources of the DVR of FIG. 45;

FIGS. 54A-F are schematics of screens that may be displayed for using the resources of the television of FIG. 53;

FIG. 55 is a schematic of a resource-sharing operation for establishing resource-sharing with an audio/video (A/V) receiver;

FIGS. 56A-D are schematics of screens that may be displayed for using the resources of the AN receiver of FIG. 55;

FIGS. 57A-E are schematics of screens that may be displayed for using the resources of the computer of FIG. 3;

FIG. 60 is a schematic of a resource-sharing operation for using the resources of a printer;

FIGS. 61A-B are schematics of screens that may be displayed for using the resources of the printer of FIG. 60;

DETAILED DESCRIPTION OF SPECIFIC EMBODIMENTS

The myriad electronic devices a person may use may frequently include a variety of resources available to each device. For example, a television may have a display for television video and speakers for television audio, but sharing the display or speakers with another device may involve a complicated or unintuitive process. With the techniques disclosed below, a user may share resources from many electronic devices on a single device. Moreover, resource-sharing may be initiated in a simplified manner; to use the resources of one device on another, the user may simply tap the two devices together.

One or more specific embodiments of the present invention are described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1:
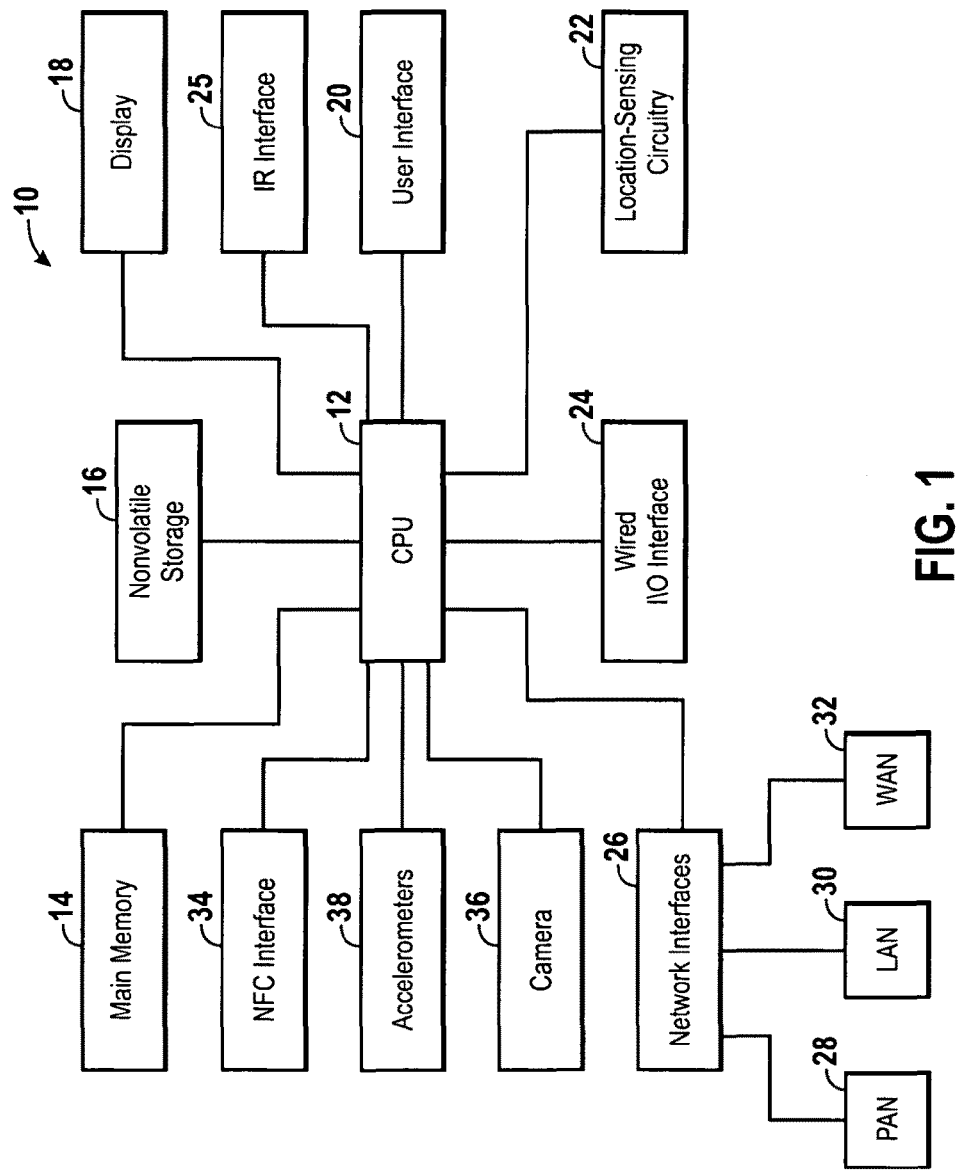
FIG. 1 is a block diagram illustrating an electronic device configured to share resources with or use resources from another electronic device.

FIG. 1 illustrates an electronic device 10 that may be configured as a resource-sharing device or a resource-using device. As discussed below with reference to FIGS. 2-7, the electronic device 10 may represent, among other things, a handheld device, a computer, a media player, a remote controller or a game controller associated with the media player or the computer, or other consumer devices, such as a digital video recorder (DVR), optical disc player, television, etc. As such, the electronic device 10 may represent, for example, an iPhone®, iPod®, iMac®, MacBook®, or AppleTV® available from Apple, Inc., or other devices by any manufacturer. It should be appreciated that embodiments of the electronic device 10 may include more or fewer elements than depicted in FIG. 1. Indeed, in one embodiment, the electronic device 10 may be an iPhone® configured as a resource-using device to use a resource of one or more resource-sharing devices, which may be computers, televisions, DVRs, optical disc players, standalone media players, satellite television or cable television receivers, audio/video (A/V) receivers, digital projectors, networkable thermostats, networkable security systems, networkable lighting, networkable garage door or security gate openers, networkable sprinkler systems, or digital cameras, etc.

The electronic device 10 may include at least one central processing unit (CPU) 12. For example, the CPU 12 may represent one or more microprocessors, and the microprocessors may be "general purpose" microprocessors, a combination of general and special purpose microprocessors, or ASICS. Additionally or alternatively, the CPU 12 may include one or more reduced instruction set (RISC) processors, video processors, or related chip sets. The CPU 12 may provide processing capability to execute an operating system, run various applications, and/or provide processing for one or more of the techniques described herein. Applications that may run on the electronic device 10 may include, for example, software for managing and playing audiovisual content, software for managing a calendar, software for using the resources of telephone capabilities, and software for using the resources of other electronic devices 10, as noted below.

A main memory 14 may be communicably coupled to the CPU 12, which may store data and executable code. The main memory 14 may represent volatile memory such as RAM, but may also include nonvolatile memory, such as read-only memory (ROM) or Flash memory. In buffering or caching data related to operations of the CPU 12, the main memory 14 may store data associated with applications running on the electronic device 10.

The electronic device 10 may also include nonvolatile storage 16. The nonvolatile storage 16 may represent any suitable nonvolatile storage medium, such as a hard disk drive or nonvolatile memory, such as Flash memory. Being well-suited to long-term storage, the nonvolatile storage 16 may store data files such as media (e.g., music and video files), software (e.g., for implementing functions on the electronic device 10), preference information (e.g., media playback preferences), lifestyle information (e.g., food preferences), exercise information (e.g., information obtained by exercise monitoring equipment), transaction information (e.g., information such as credit card information), wireless connection information (e.g., information that may enable media device to establish a wireless connection such as a telephone connection), subscription information (e.g., information that maintains a record of podcasts or television shows or other media a user subscribes to), as well as telephone information (e.g., telephone numbers). It should be appreciated that data associated with sharing resources with certain other electronic devices 10, such as resource-sharing software plug-ins, may be saved in the nonvolatile storage 16, as discussed further below.

A display 18 may display images and data for the electronic device 10. It should be appreciated that only certain embodiments may include the display 18. The display 18 may be any suitable display, such as liquid crystal display (LCD), a light emitting diode (LED) based display, an organic light emitting diode (OLED) based display, a cathode ray tube (CRT) display, or an analog or digital television. In some embodiments, the display 18 may function as a touch screen through which a user may interact with the electronic device 10.

The electronic device 10 may further include a user interface 20. The user interface 20 may represent indicator lights and user input structures, but may also include a graphical user interface (GUI) on the display 18. In practice, the user interface 20 may operate via the CPU 12, using memory from the main memory 14 and long-term storage in the nonvolatile storage 16. In an embodiment lacking the display 18, indicator lights, sound devices, buttons, and other various input/output (I/O) devices may allow a user to interface with the electronic device 10. In an embodiment having a GUI, the user interface 20 may provide interaction with interface elements on the display 18 via certain user input structures, user input peripherals such as a keyboard or mouse, or a touch sensitive implementation of the display 18.

As should be appreciated, one or more applications may be open and accessible to a user via the user interface 20 and displayed on the display 18 of the electronic device 10. The applications may run on the CPU 12 in conjunction with the main memory 14, the nonvolatile storage 16, the display 18, and the user interface 20. As will be discussed in greater detail below, instructions stored in the main memory 14, the nonvolatile storage 16, or the CPU 12 of the electronic device 10 may enable a user to use a resource of another electronic device 10. For example, a user may use resources many other electronic devices 10 from a single electronic device 10. As such, it should be appreciated that the instructions for carrying out such techniques on the electronic device 10 may represent a standalone application, a function of the operating system of the electronic device 10, or a function of the hardware of the CPU 12, the main memory 14, the nonvolatile storage 16, or other hardware of the electronic device 10.

In certain embodiments, the electronic device 10 may include location sensing circuitry 22. The location sensing circuitry 22 may represent global positioning system (GPS) circuitry, but may also represent one or more algorithms and databases, stored in the nonvolatile storage 16 or main memory 14 and executed by the CPU 12, which may be used to infer location based on various observed factors. For example, the location sensing circuitry 22 may represent an algorithm and database used to approximate geographic location based on the detection of local 802.11x (Wi-Fi) networks or nearby cellular phone towers. As discussed below, the electronic device 10 may employ the location sensing circuitry 22 as a factor for carrying out certain resource-sharing techniques. By way of example, the location sensing circuitry 22 may be used by the electronic device 10 to determine a user's location during an event; the location during the event may cause different information to be displayed on the electronic device 10.

With continued reference to FIG. 1, the electronic device 10 may also include a wired input/output (I/O) interface 24 for a wired interconnection between one electronic device 10 and another electronic device 10. The wired I/O interface 24 may represent, for example, a universal serial bus (USB) port or an IEEE 1394 or FireWire® port, but may also represent a proprietary connection. Additionally, the wired I/O interface 24 may permit a connection to user input peripheral devices, such as a keyboard or a mouse.

An infrared (IR) interface 25 may enable the electronic device 10 to receive and/or transmit signals with infrared light. By way of example, the IR interface 25 may comply with an infrared IrDA specification for data transmission. Alternatively, the IR interface 25 may function exclusively to receive data signals or to output data signals regarding an available resource. In this way, the electronic device 10 may issue signals to use a resource of other electronic devices 10 that may lack other interfaces for communication.

One or more network interfaces 26 may provide additional connectivity for the electronic device 10. The network interfaces 26 may represent, for example, one or more network interface cards (NIC) or a network controller. In certain embodiments, the network interface 26 may include a personal area network (PAN) interface 28. The PAN interface 28 may provide capabilities to network with, for example, a Bluetooth® network, an IEEE 802.15.4 (e.g., ZigBee) network, or an ultra wideband network (UWB). As should be appreciated, the networks accessed by the PAN interface 28 may, but do not necessarily, represent low power, low bandwidth, or close range wireless connections. The PAN interface 28 may permit one electronic device 10 to connect to another local electronic device 10 via an ad-hoc or peer-to-peer connection. However, the connection may be disrupted if the separation between the two electronic devices 10 exceeds the range of the PAN interface 28.

The network interface 26 may also include a local area network (LAN) interface 30. The LAN interface 30 may represent an interface to a wired Ethernet-based network, but may also represent an interface to a wireless LAN, such as an IEEE 802.11x wireless network. The range of the LAN interface 30 may generally exceed the range available via the PAN interface 28. Additionally, in many cases, a connection between two electronic devices 10 via the LAN interface 30 may involve communication through a network router or other intermediary device.

For some embodiments of the electronic device 10, the network interfaces 26 may include the capability to connect directly to a wide area network (WAN) via a WAN interface 32. The WAN interface 32 may permit a connection to a cellular data network, such as the Enhanced Data rates for GSM Evolution (EDGE) network or other 3G network. When connected via the WAN interface 32, the electronic device 10 may remain connected to the Internet and, in some embodiments, to another electronic device 10, despite changes in location that might otherwise disrupt connectivity via the PAN interface 28 or the LAN interface 30. As will be discussed below, the wired I/O interface 24 and the network interfaces 26 may represent high-bandwidth communication channels for transferring user data using the simplified data transfer techniques discussed herein.

Certain embodiments of the electronic device 10 may also include a near field communication (NFC) interface 34. The NFC interface 34 may allow for extremely close range communication at relatively low data rates (e.g., 464 kb/s), and may comply with such standards as ISO 18092 or ISO 21521, or it may allow for close range communication at relatively high data rates (e.g., 560 Mbps), and may comply with the TransferJets protocol. The NFC interface 34 may have a range of approximately 2 to 4 cm. The close range communication with the NFC interface 34 may take place via magnetic field induction, allowing the NFC interface 34 to communicate with other NFC interfaces 34 or to retrieve information from tags having radio frequency identification (RFID) circuitry.

As discussed below, the NFC interface 34 may provide a manner of initiating or facilitating a transfer of user data from one electronic device 10 to another electronic device 10.

The electronic device 10 of FIG. 1 may also include a camera 36. With the camera 36, the electronic device 10 may obtain digital images or videos. In combination with optical character recognition (OCR) software, barcode-reading software, or matrix-code-reading software running on the electronic device 10, the camera 36 may be used to input data from printed materials having text or barcode information. Such data may include information indicating how to use a resource of another device from a matrix barcode that may be printed on the other device, as described below.

In certain embodiments of the electronic device 10, one or more accelerometers 38 may sense the movement or orientation of the electronic device 10. The accelerometers 38 may provide input or feedback regarding the position of the electronic device 10 to certain applications running on the CPU 12. By way of example, the accelerometers 38 may include a 3-axis accelerometer from ST Microelectronics.

Figure 2:
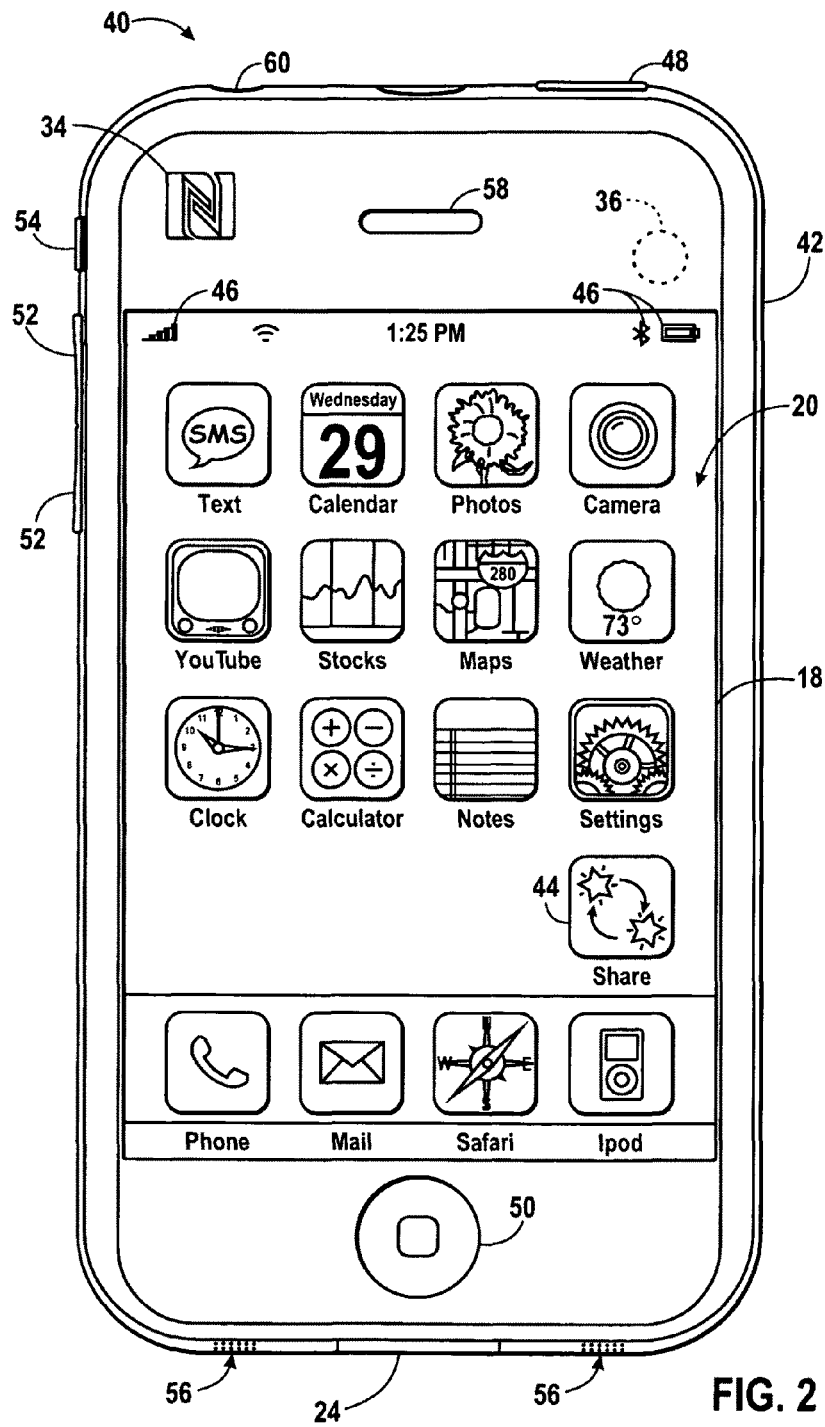
FIG. 2 is a schematic of a handheld device representing an embodiment of a resource-using electronic device of FIG. 1.

FIGS. 2-7 illustrate various specific embodiments of the electronic device 10 of FIG. 1. It should be appreciated that the specific embodiments of the electronic device 10 depicted in FIGS. 2-7 are representative only and should not be understood as exclusive. Turning first to FIG. 2, a handheld device 40 may represent an embodiment of the electronic device 10 of FIG. 1. By way of example, the handheld device 40 may be a portable phone or a portable media player, such as an iPhone® or an iPod® available from Apple Inc.

The handheld device 40 may have an enclosure 42 of plastic, metal, composite materials, or other suitable materials in any combination. The enclosure 42 may protect the interior components of the handheld device 40 from physical damage and electromagnetic interference (EMI). Additionally, the enclosure 42 may allow certain frequencies of electromagnetic radiation to pass through to wireless communication circuitry within the handheld device 40 to facilitate wireless communication.

The display 18 of the handheld device 40 may include the user interface 20 in the form of a GUI, which may have a number of individual icons representing applications that may be activated. In some embodiments of the handheld device 40, the display 18 may serve as a touch-sensitive input device and the icons may be selected by touch. In some embodiments, a resource-sharing application icon 44 may be selectable by a user. Here, the resource-sharing application is designated as "Share" to indicate that selection of the icon 44 will allow the user to remotely share resources or use resources with other devices.

When the resource-sharing application icon 44 is selected, the resource-sharing application may open, as described further below. The resource-sharing application may enable a user to use a resource of other electronic devices 10 using the techniques described herein. The user interface 20 on the display 18 of the handheld device 40 may also include certain status indicator icons 46, which may indicate the status of various components of the handheld device 40. For example, the status indicator icons may include a cellular reception meter, an icon to indicate when the PAN interface 28 is active (e.g., when a Bluetooth network is in use), or a battery life meter.

The handheld device 40 may connect to another electronic device 10, such as a computer, through the wired I/O interface 24 located at the bottom of the device. For example, the wired I/O interface 24 may be a proprietary connection for interconnecting the handheld device 40 and another electronic device 10 via USB or FireWire®. Once connected, the devices may synchronize and/or transfer certain data, such as information indicating how one device may use resources the other.

User input structures 48, 50, 52, and 54 may supplement or replace the touch-sensitive input capability of the display 18 for interaction with the user interface 20. By way of example, the user input structures 48, 50, 52, and 54 may include buttons, switches, a control pad, keys, knobs, a scroll wheel, or any other suitable input structures. The user input structures 48 and 50 may work in conjunction with the display 18 to use a resource of functions of the device. Particularly, the user input structure 48 may be a lock/unlock sliding button to lock or unlock the handheld device 40; the user input structure 50 may be a navigation button for navigating the user interface 20 to a default or home screen; the user input structures 52 may be a pair of buttons for navigating up or down a screen of the user interface 20 or for using the resources of volume; and the user input structure 54 may be an on/off button.

Certain embodiments of the handheld device 40 may include telephone functionality. As such, the handheld device 40 may include audio input structures 56 and an audio output structure 58. The audio input structures 56 may be one or more microphones for receiving voice data from a user, and the audio output structure 58 may be a speaker for outputting audio data, such as data received by the handheld device 40 over a cellular network. In certain embodiments, an audio port 60 may facilitate peripheral audio input and output devices, such as headsets, speakers, or microphones for use with the handheld device 40. It should be appreciated that telephone functionality associated with the handheld device 40 may also include emitting a ringtone through the audio output structure 58, causing the handheld device 40 to vibrate, or changing images on the display to indicate an incoming phone call.

As noted above, some embodiments of the electronic device 10 may include the NFC interface 34. The handheld device 40 depicted in FIG. 2 may include the NFC interface 34 in any suitable location within the enclosure 42. Because the NFC interface 34 may permit communication at a very short range, the location of the NFC interface 34 in the handheld device 40 may be indicated on exterior of the enclosure 42, as illustrated in FIG. 2. The NFC interface 34 may enable the handheld device 40 to engage in near field communication (NFC) with RFID tags or other NFC enabled electronic devices 10. For example, the NFC interface 34 may provide a manner of receiving information indicating how to use a resource of another device from an NFC interface 34 or an RFID tag located on the other device, as described further below.

The handheld device 40 of FIG. 2 may additionally include the camera 36, which may be located, for example, on the back of the handheld device 40. As discussed further below, the camera 36 may be used to obtain a digital image of a matrix barcode located on another electronic device 10. The handheld device 40 may thereafter employ matrix-code-reading software to extract resource-sharing information from the image, as described further below.

It should also be appreciated that the handheld device 40 may include the location sensing circuitry 22 or the accelerometers 38. Certain applications running on the handheld device 40 may obtain information relating to the position, orientation, or movement of the handheld device from the location sensing circuitry 22 or the accelerometers 38. The position, orientation, or movement information may enable applications to display personalized data or to display data in an innovative manner in response to user movement.

Figure 3:
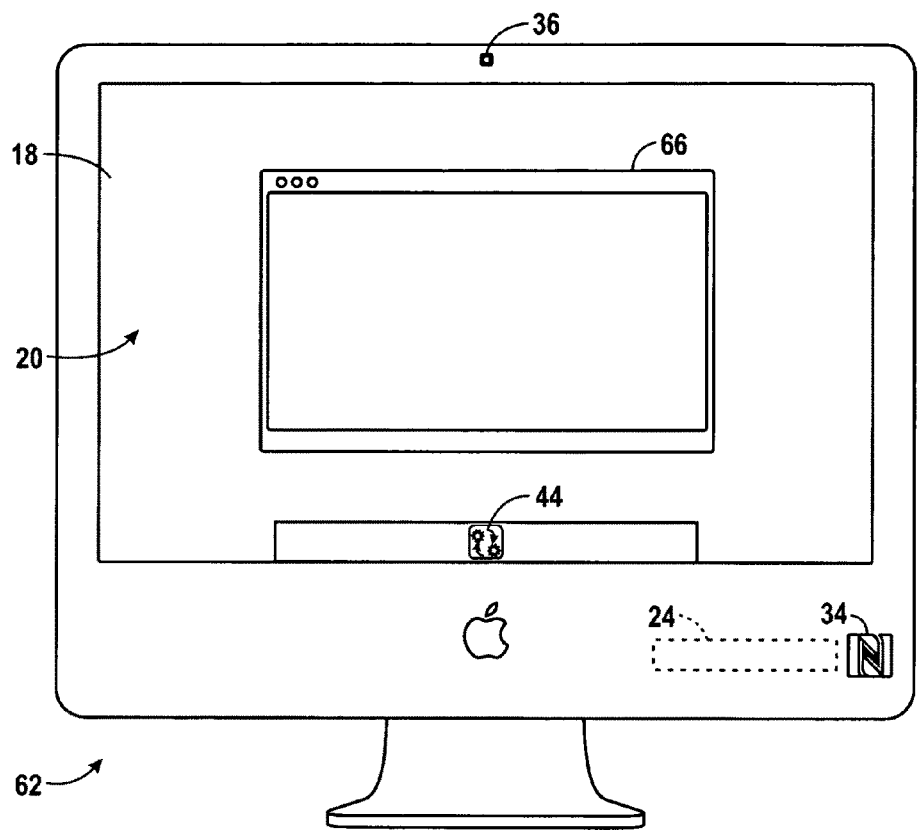
FIG. 3 is a schematic of a computer representing an embodiment of a resource-using electronic device of FIG. 1.

Turning to FIG. 3, a computer 62 may represent another embodiment of the electronic device 10 of FIG. 1. The computer 62 may be any computer, such as a desktop computer, a server, or a notebook computer, but may also be a standalone media player or video gaming machine. By way of example, the computer 62 may be an iMac®, a MacBook®, or an AppleTV® by Apple Inc. It should be noted that the computer 62 may also represent a personal computer (PC) by another manufacturer. An enclosure 64 may protect internal components of the computer 62. Such internal components may include, for example, the CPU 12, the main memory 14, the nonvolatile storage 16, certain network interfaces 26, and/or the NFC interface 34.

The location of the NFC interface 34 may be noted by a label on the exterior of the enclosure 64. The NFC interface 34 may permit near field communication between the computer 62 and other NFC enabled electronic devices 10, such as the handheld device 40. As should be appreciated, the NFC interface 34 may also enable the computer 62 to receive information indicating how to use a resource of another device from an NFC interface 34 or an RFID tag located on the other device, as described further below.

The display 18 of the computer 62 may display the user interface 20 in the form of a GUI. The user interface 20 of the computer 62 may depict any user data associated with applications 66 running on the computer 62. Additionally, the user interface 20 may include a variety of icons related to applications installed on the computer 62. One such icon may be the resource-sharing application icon 44. When the resource-sharing application icon 44 is selected, the resource-sharing application may open. The resource-sharing application may enable a user to use a resource of another device using the techniques described herein.

A user of the computer 62 may interact with the user interface 20 with various peripheral input devices, such as a keyboard or mouse, which may connect to the computer 62 via the wired I/O interface 24. The wired I/O interface 24 may also provide a high bandwidth communication channel for interconnecting other electronic devices 10, such as the handheld device 40, to the computer 62.

The computer 62 may also include the camera 36. As discussed further below, the camera 36 may obtain, among other things, a digital image of a matrix barcode encoding information relevant to resource-sharing. With the digital image, the handheld device 40 may employ matrix-code-reading software to extract resource-sharing information from the image.

Figure 4:
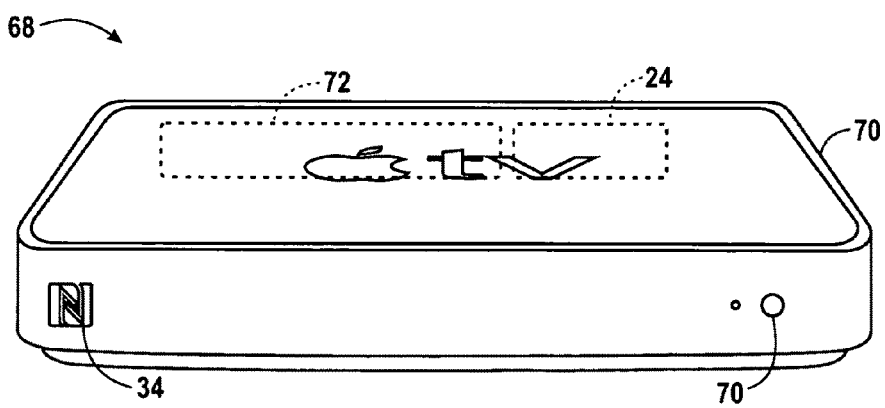
FIG. 4 is a schematic of a standalone media player representing an embodiment of a resource-sharing electronic device of FIG. 1.

FIG. 4 depicts a standalone media player 68 representing another embodiment of the electronic device 10 of FIG. 1 that may be configured to operate using the techniques described herein. By way of example, the standalone media player 68 may be an AppleTV® device by Apple, Inc. However, the standalone media player 68 may also represent a media player or video game console by another manufacturer.

Within an enclosure 70 of the standalone media player 68 may reside various components of the electronic device 10. For example, the enclosure 70 may house the nonvolatile storage 16 for storing media files and media playback software and the CPU 12 for processing the media files. Wireless network interfaces 26, such as the PAN interface 28 and LAN interface 30, may also be located within the enclosure 70, allowing the standalone media player 68 to communicate with other electronic devices 10 or to connect to the Internet. Using the wireless network interfaces 26, the standalone media player 68 may obtain or exchange media content as well as gain access to the Internet.

The standalone media player 68 may also include, among other things, an indicator light and infrared (IR) port 72 and audio/video (A/V) outputs 74. The indicator light and IR port 72 may include the IR port 25, and may receive an IR control signal from a remote control. Further, the indicator light and IR port 72 may indicate to a user when the standalone media player 68 is on, off, receiving or exchanging content, or obtaining data in accordance with techniques described herein. The A/V outputs 74 may provide a manner for connecting the standalone media player 68 to an analog or digital television or other media display devices. The standalone media player 68 may additionally include the wired I/O interface 24, which may permit the standalone media player 68 to communicate rapidly with a wired connection to another electronic device 10.

The standalone media player 68 may also include the NFC interface 34. With the NFC interface 34, the standalone media player 68 may communicate with another electronic device 10 having another NFC interface 34. By way of example, as described further below, the NFC interface 34 may enable the standalone media player 68 to transmit resource-sharing data to another NFC-enabled electronic device 10.

Figure 5:
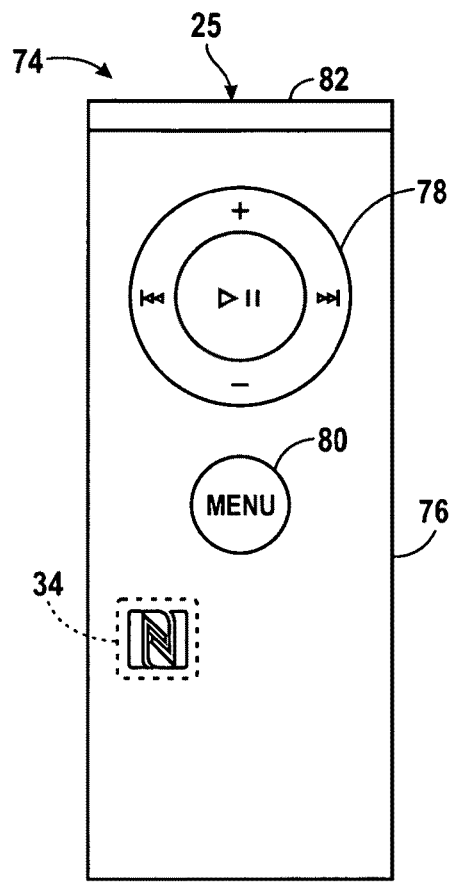
FIG. 5 is a schematic of a remote controller for the standalone media player of FIG. 4.

FIG. 5 illustrates a remote control 74, which may be used to use a resource of the standalone media player 68 of FIG. 4 or the computer 62 of FIG. 3. For example, the remote control 74 may represent another embodiment of the electronic device 10 of FIG. 1 and may be configured to operate with the simplified resource-sharing techniques described herein. By way of example, the remote control 74 may be an AppleTV® remote control adapted to perform the simplified resource-sharing techniques described below. It should be understood, however, that the remote control 74 may represent any remote control device capable of performing the simplified resource-sharing techniques.

An enclosure 76 of the remote control 74 may protect the internal components of the remote control 74 from physical damage or extraneous electromagnetic radiation, while permitting control signals, such as IR control signals, to exit for controlling the standalone media player 68 or the computer 62. Internal components protected by the enclosure 76 may include, for example, the CPU 12, the main memory 14, the nonvolatile storage 16, the IR interface 25, or the wireless network interfaces 26 of the PAN interface 28 or the LAN interface 30. The internal components may permit the remote control 74 to run device resource-sharing software, to obtain a resource-sharing software plug-in, and/or to use a resource of another device using the techniques discussed below.

The remote control 74 may include a multifunction button 78, which may permit a user to play, pause, fast forward, or rewind media, increase or decrease volume, or navigate a menu. Additionally, the remote control 74 may include a menu button 74 for navigating the standalone media player 68 or the computer 62 to a main menu screen. To control the standalone media player 68 or the computer 62, an infrared (IR) window 82 may permit control signals from the IR interface 25 to exit the enclosure 76 of the remote control 74. The control signals which exit the IR window 82 may be received by the indicator light and IR port 72 of the standalone media player 68 or by a peripheral device adapted for infrared communication communicably coupled to the computer 62.

As indicated by FIG. 5, the remote control 74 may also include the NFC interface 34. With the NFC interface 34, the remote control 74 may communicate with another electronic device 10 having another NFC interface 34. Using NFC communication via the NFC interface 34, the remote control 74 and the other electronic device 10 may initiate a simplified resource-sharing procedure that may transfer resources from the other electronic device 10 to the remote control 74, or transfer resources from the remote control 74 to the other device 10, according to techniques described in greater detail below.

Figure 6:
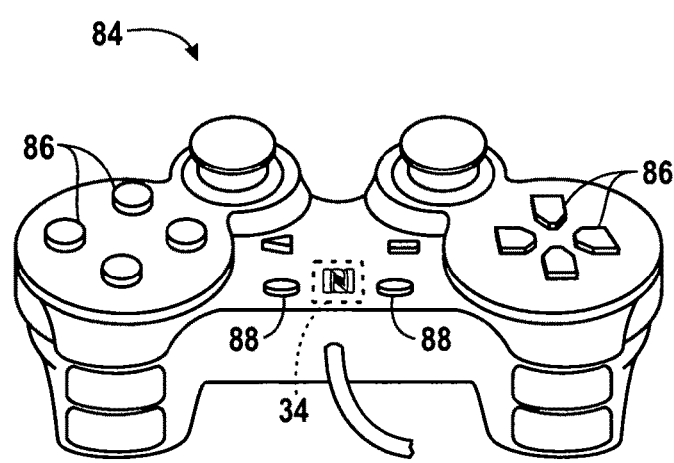
FIG. 6 is a schematic of a video game controller for the standalone media player of FIG. 4 or a video game system.

FIG. 6 illustrates a game controller 84 for use with a video gaming system, the computer 62, or the standalone media player 68. The game controller 84 may represent another embodiment of the electronic device 10 of FIG. 1 configured to perform the simplified resource-sharing techniques described below. The game controller 84 may provide a manner of interfacing with a game running on another electronic device 10, such as the standalone media player 68. An enclosure 85 of the game controller 84 may protect the internal components of the remote control 74 from physical damage or extraneous electromagnetic radiation. Internal components protected by the enclosure 85 may include, for example, the CPU 12, the main memory 14, the nonvolatile storage 16, or the wireless network interfaces 26 of the PAN interface 28 or the LAN interface 30. The internal components may permit the game controller 84 to store and transfer user data (e.g., game save data, digital photos, or music) using the simplified data transfer techniques discussed below.

To interface with the video gaming system, the computer 62, or the standalone media player 68, the game controller 84 may include various control buttons 86, such as a directional pad or other selection buttons. Indicator lights 88 may indicate to a user, among other things, when the game controller 84 is on, off, or communicating with another electronic device 10.

The game controller 84 may also include the NFC interface 34. With the NFC interface 34, the game controller 84 may communicate with another electronic device 10 having another NFC interface 34. Using NFC communication via the NFC interface 34, the game controller 84 and the other electronic device 10 may initiate a simplified resource-sharing procedure to or from the game controller 84 according to techniques described in greater detail below.

Figure 7:
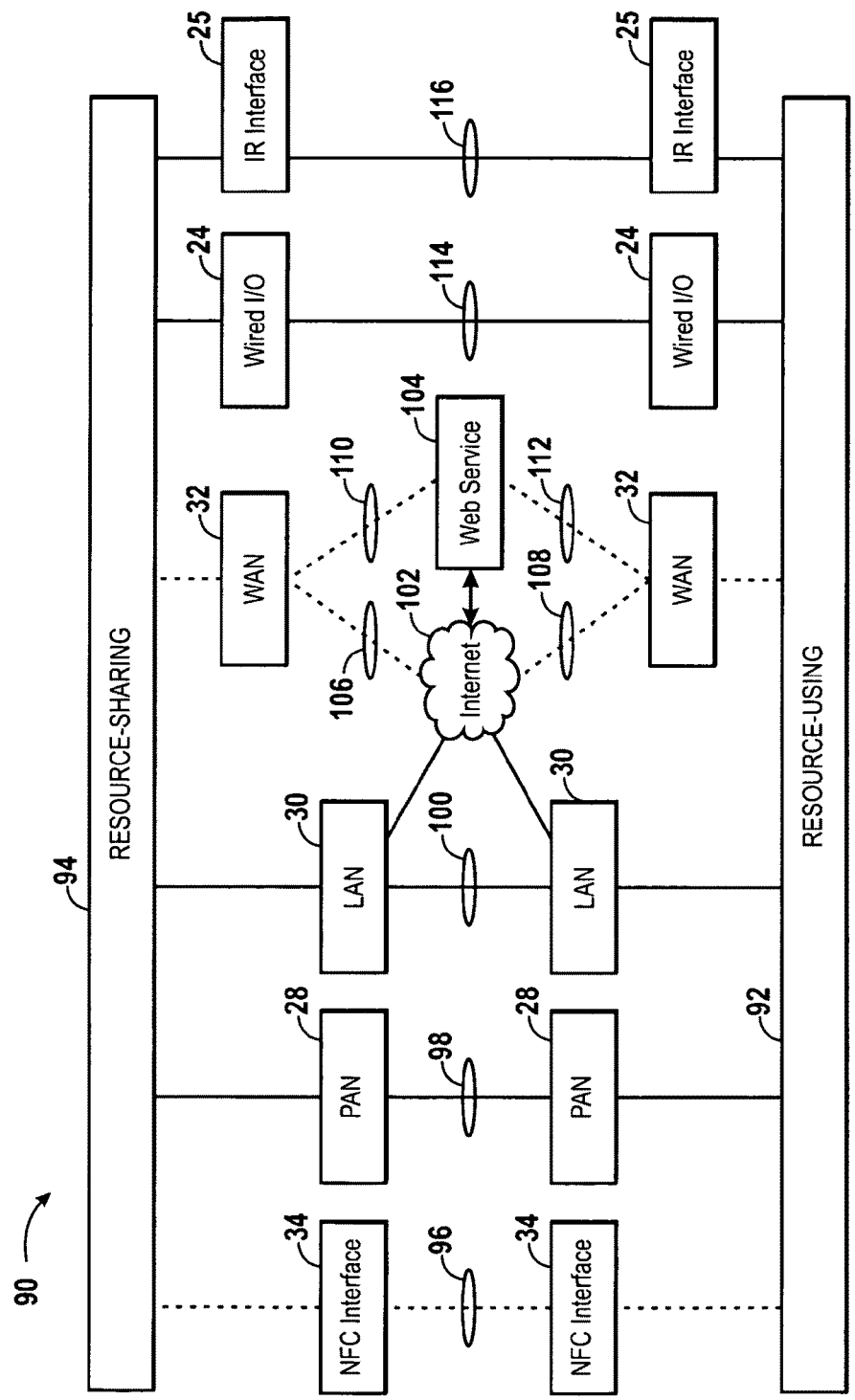
FIG. 7 is a block diagram representing communication channels that may be established between a resource-using electronic device and a resource-sharing electronic device.

FIG. 7 is a block diagram of potential communication channels 90 over which communication between two electronic devices 10, denoted as a resource-using device 92 and a resource-sharing device 94, may take place during a simplified resource-sharing procedure. It should be appreciated that the communication channels 90 of FIG. 7 may be formed between any two electronic devices 10. Each communication channel 90 shared between the resource-using device 92 and the resource-sharing device 94 may be used for any data transfer that may take place between the two devices, and may include, for example, a transfer of resource-sharing information indicating how the resource-sharing device 94 may share resources, a transfer of a resource-sharing software plug-in for using the resources of the resource-sharing device 94, or various intercommunication that may take place in a resource-sharing stream for using the resources of the resource-sharing device 94 with the resource-using device 92.

Discussing each of the communication channels 90 in turn, a near field communication (NFC) communication channel 96 may be employed for data transfer between the resource-sharing device 94 and the resource-using device 92. The NFC communication channel 96 may arise if both the resource-using device 92 and the resource-sharing device 94 have NFC interfaces 34 that are placed in close proximity, such as may occur when the devices are tapped together. It should be appreciated that the NFC communication channel 96 may generally remain open for a relatively short period of time and may operate at a lower bandwidth. As such, the NFC communication channel 96 may generally accommodate a relatively small amount of initial data transfer; a follow-up data transfer may generally take place via another of the communication channels 90 described below.

As noted above, the resource-using device 92 and the resource-sharing device 94 may additionally be connected through any of the communication channels 90 other than the NFC communication channel 96. Particularly, if either device lacks the NFC interface 34, data transfer instead may take place over the other of the communication channels 90. As noted below, such a data transfer may begin when a user initiates a transfer using the resource-sharing application on the resource-using device 92. In some embodiments, although the resource-using device 92 and the resource-sharing device 94 may both include the NFC interface 34, a user may elect to have the data transfer take place over another one of the communication channels 90.

Among the possible communication channels 90 other than the NFC communication channel 96 is a personal area network (PAN) communication channel 98, connected through the PAN interfaces 28 of each device. By way of example, the PAN communication channel 98 may represent a peer-to-peer Bluetooth® connection, an IEEE 802.15.4 (e.g., ZigBee) network, or an ultra wideband network (UWB) between the resource-using device 92 and the resource-sharing device 94.

The resource-using device 92 and the resource-sharing device 94 may additionally or alternatively be connected via a local area network (LAN) communication channel 100. The respective LAN interfaces 30 of the resource-using device 92 and the resource-sharing device 94 may share a peer-to-peer connection directly to one another via the LAN communication channel 100, or may connect to one another via a router or a network controller along the LAN communication channel 100. The LAN communication channel 100 may represent a wired connection, such as an Ethernet connection, but may also represent a wireless connection, such as an IEEE standard 802.11.x wireless network, or Wi-Fi.

It should be appreciated that the resource-using device 92 and the resource-sharing device 94 may establish the PAN communication channel 98 or the LAN communication channel 100 using a device identification networking protocol. By way of example, the device identification networking protocol may be Bonjour® by Apple Inc. Each of the resource-using device 92 and the resource-sharing device 94 may broadcast using internet protocol (IP) their identifications and services, programs, and/or communication capabilities that each device may have. The resource-using device 92 or the resource-sharing device 94 may receive information via the device identification networking protocol so as to open peer-to-peer connections via the PAN communication channel 98 or the LAN communication channel 100. As should be appreciated, more than one electronic device 10 may be broadcasting information using the device identification networking protocol. As such, the handheld device 40 may select based on preferences with which electronic device 10 to connect.

While the resource-using device 92 or the resource-sharing device 94 may be connected via the PAN communication channel 98 or the LAN communication channel 100, the devices may also be connected by way of the Internet 102. By connecting to one another via the Internet 102, the resource-using device 92 and the resource-sharing device 94 may remain physically remote from one another while the data transfer occurs. Connecting via the Internet 102 may also allow the resource-using device 92 and the resource-sharing device 94 to retain communicative capabilities if a local or peer-to-peer connection via the communication channel 98 or 100 is disrupted or lost.

To locate one another over the Internet 102, the resource-using device 92 or the resource-sharing device 94 may first query a web service 104 to obtain an internet protocol (IP) address of the other. The web service 104 may represent a dynamic domain name system (DNS) service, which may maintain the current IP address of each device by communicating with a plugin associated with the simplified data transfer application residing on each device. By way of example, the web service 104 may be a function of the Back to My Mac® service from Apple, Inc.

With further reference to FIG. 7, the resource-sharing device 94 may reach the Internet 102 via its LAN interface 30 or via a wide-area network (WAN) communication channel 106, which may represent, for example, a cellular data network such as EDGE or a 3G network. Similarly, the resource-using device 92 may connect to the Internet 102 via its LAN interface 30 or its WAN interface 32. If the resource-using device 92 connects to the Internet via the WAN interface 32, it may do so via a wide area network (WAN) communication channel 108, which may also represent, for example, a cellular data network such as EDGE or a 3G network.

It should be appreciated that the resource-using device 92 and the resource-sharing device 94 may also establish a connection directly to the web service 104 directly via the respective WAN interfaces 32 of the devices. The resource-sharing device 94 may connect to the web service 104 via a wide area network (WAN) communication channel 110, which may represent, for example, a cellular data network such as EDGE or a 3G network. Similarly, the resource-using device 92 may connect to the web service 104 via a wide area network (WAN) communication channel 112, which may also represent, for example, a cellular data network such as EDGE or a 3G network.

The resource-using device 92 and the resource-sharing device 94 may also be connected to one another via a wired input/output (I/O) communication channel 114. The wired I/O communication channel 114 may generally permit an exceptionally rapid transfer of data between the resource-using device 92 and the resource-sharing device 94. As discussed below, any of the potential communication channels 90 may provide a manner of communicating during an initial data transfer or a subsequent data transfer involving a simplified resource-sharing procedure.

Figure 8:
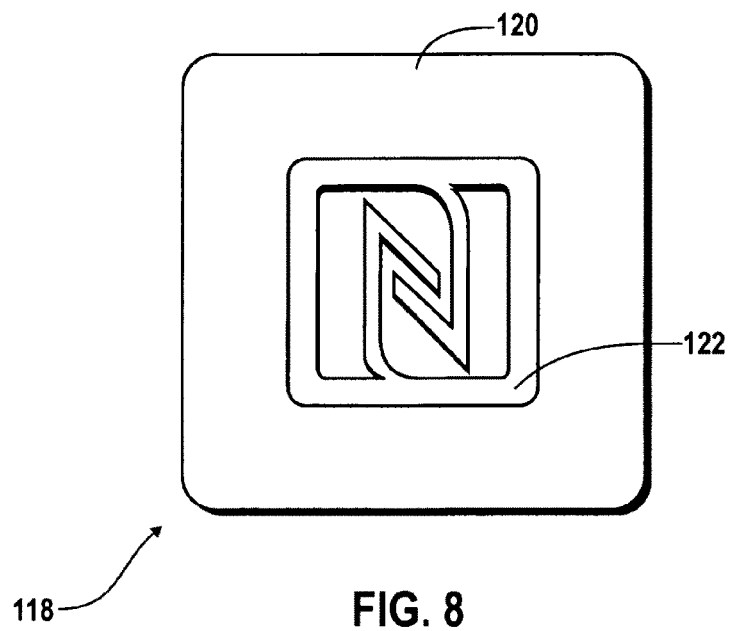
FIG. 8 is a schematic of an RFID tag configured to provide resource-sharing information regarding a resource-sharing electronic device to a resource-using electronic device.

FIG. 8 illustrates an RFID tag 118 that may be associated with the resource-sharing device 94. The RFID tag 118 may adhere to the resource-sharing device 94, and may provide certain resource-sharing information to the resource-using device 92 that may be used to use a resource of the resource-sharing device 94. By way of example, the RFID tag 118 may instruct the resource-using device 92 where software for using the resources of the resource-sharing device 94 may be obtained and/or how to locate the resource-sharing device 94 over a network. Thus, the RFID tag 118 may be particularly effective when the resource-sharing device 94 lacks an NFC interface 34. Components of the RFID tag 118 may include, for example, an adhesive portion 120 and an RFID microchip 122.

The RFID microchip 122 may passively or actively transfer certain data related to resources available to share from the resource-sharing device 94 when the NFC interface 34 of the resource-using device 92 is placed nearby (e.g., within 2-4 cm). Accordingly, the RFID microchip 122 may comply with such standards as ISO 14443 or ISO 15693 for proximity or vicinity RFID. To enable the resource-using device 92 to use a resource of the resource-sharing device 94, the RFID microchip 122 may include certain resource-sharing information. The information stored on the RFID microchip 122 may include, among other things, a serial number and/or an XML message having various information identifying the resource-sharing device 94. For example, the serial number may enable the resource-using device 92 to search a database at the web service 104. Based on the serial number from the RFID microchip 122, the web service 104 may provide information identifying the type of device, an internet protocol (IP) address of the resource-sharing device 94, a location where a resource-sharing software plug-in for using the resources of the resource-sharing device 94 may be obtained, and/or the resource-sharing software plug-in. The XML message may provide similar information, such as the serial number, the type of device, and/or a location where the resource-sharing software plug-in may be obtained.

Figure 9:
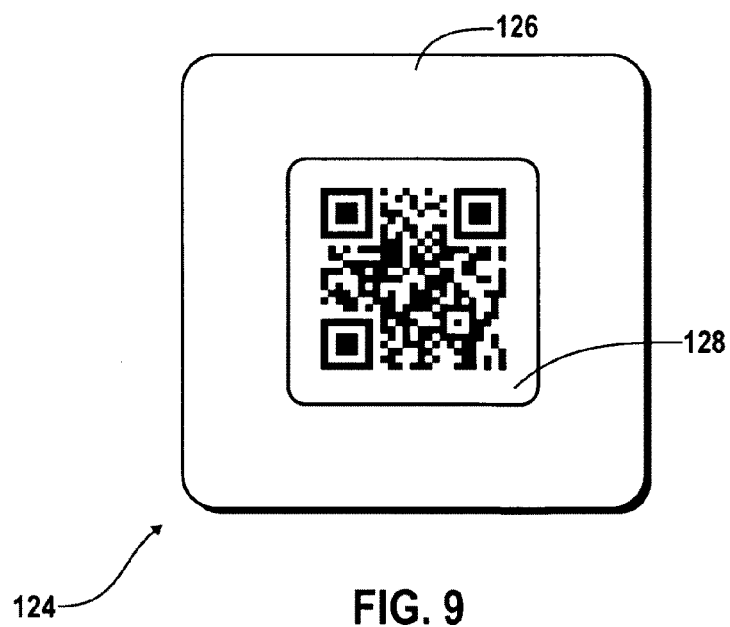
FIG. 9 is a matrix barcode configured to provide resource-sharing information regarding a resource-sharing electronic device to a resource-using electronic device.

FIG. 9 illustrates a matrix barcode tag 124 that may be associated with the resource-sharing device 94. In the manner of the RFID tag 118 of FIG. 8, the matrix barcode tag 124 may be placed on the resource-sharing device 94 to provide resource-sharing information to the resource-using device 92 that may be used to use a resource of the resource-sharing device 94. By way of example, the matrix barcode tag 124 may instruct the resource-using device 92 where software for using the resources of the resource-sharing device 94 may be obtained and/or how to locate the resource-sharing device 94 over a network. Thus, the matrix barcode tag 124 may be particularly effective when placed on a resource-sharing device 94 that lacks an NFC interface 34. The matrix barcode tag 124 may include an adhesive 126 with a printed matrix barcode 128.

The matrix barcode 128 may be any 2-D matrix code capable of encoding a serial number or other data pertaining to the resource-sharing device 94 with which it may be associated. By way of example, the matrix barcode 128 may be a QR code, an Aztec Code, or a Data Matrix code. The matrix barcode 128 may be read by a camera 36 or a matrix barcode reader associated with the resource-using device 94, as described below. To enable the resource-using device 94 to use a resource of the resource-sharing device 94, the matrix barcode 128 may encode certain resource-sharing information. Like the resource-sharing information of the RFID microchip 122, the resource-sharing information encoded in the matrix barcode 128 may include a serial number and/or an XML message having information identifying the resource-sharing device 94. For example, the serial number may enable the resource-using device 92 to search a database at the web service 104. Based on the serial number from the matrix barcode 128, the web service 104 may provide information identifying the type of device, an internet protocol (IP) address of the resource-sharing device 94, a location where a resource-sharing software plug-in for using the resources of the resource-sharing device 94 may be obtained, and/or the resource-sharing software plug-in. The XML message may provide similar information, such as the serial number, the type of device, and/or a location where the resource-sharing software plug-in may be obtained.

Figure 10:
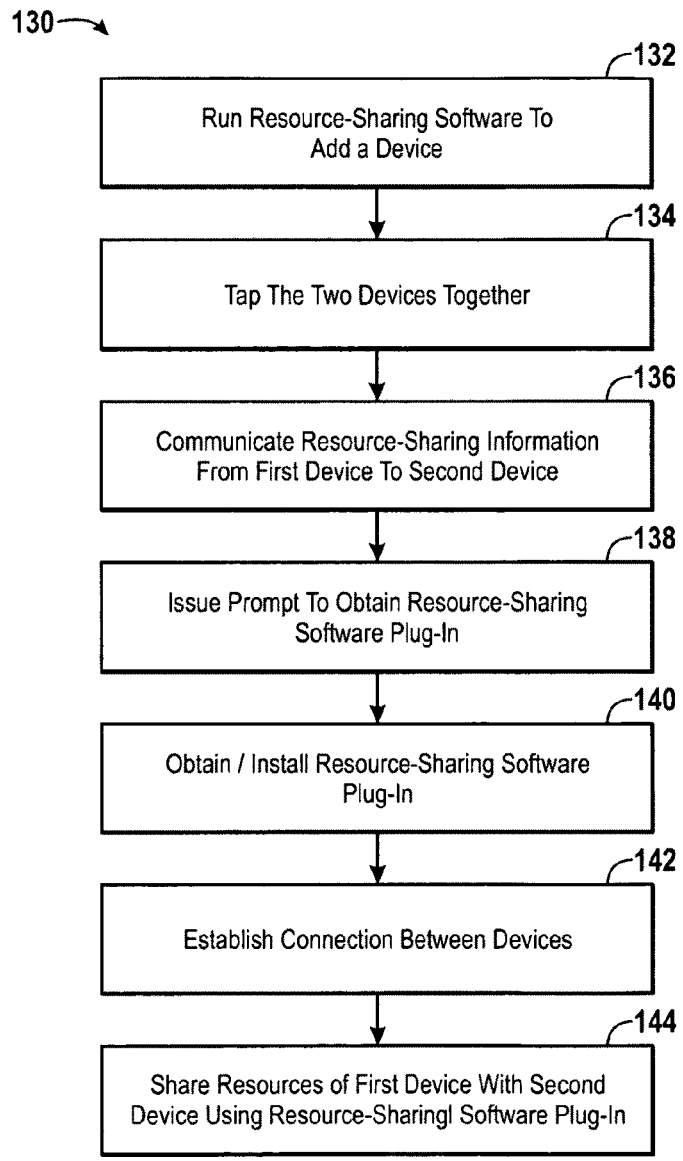
FIG. 10 is a flowchart describing a method for establishing resource-sharing with a resource-sharing electronic device using a resource-using electronic device.

Turning to FIG. 10, a flowchart 130 may describe a technique for using the resource-using device 92 to use a resource of the resource-sharing device 94. Particularly, the technique described in the flowchart 130 may be employed when both the resource-using device 92 and the resource-sharing device 94 include NFC interfaces 34. In a first step 132, a user may launch resource-sharing software on the resource-using device 92. Such resource-sharing software may be, for example, the resource-sharing application described above with reference to FIG. 2 above. The resource-sharing software may prepare the resource-using device 92 for using the resources of the resource-sharing electronic device 94 by placing the NFC interface 34 of the resource-using device 92 into a "host mode," the significance of which is described below with reference to FIGS. 12-13.

In step 134, the user may tap the NFC interface 34 of the resource-using device 92 to the NFC interface 34 of the resource-sharing device 94, causing the two devices to establish the NFC communication channel 96. In step 136, resource-sharing information may be communicated to the resource-using device 92 over the NFC communication channel 96. The resource-sharing information may provide information sufficient to enable the resource-using device 92 to use a resource of the resource-sharing device 94. By way of example, the resource-sharing information may include a serial number and/or an XML message having information identifying the resource-sharing device 94. The serial number may enable the resource-using device 92 to search a database at the web service 104. Based on the serial number, the web service 104 may provide information identifying the type of device, an internet protocol (IP) address of the resource-sharing device 94, a location where a resource-sharing software plug-in for using the resources of the resource-sharing device 94 may be obtained, and/or the resource-sharing software plug-in. If the resource-sharing information includes an XML message, the XML message may provide similar information, such as the serial number, the type of device, and/or a location where the resource-sharing software plug-in may be obtained.

Turning to step 138, either the resource-using device 92 or the resource-sharing device 94 may issue a prompt to the user to obtain the resource-sharing software plug-in described in the resource-sharing information, which may be used by the resource-using device 92 to use a resource of the resource-sharing device 94. Once the user elects to obtain the resource-sharing software plug-in, the resource-using device 92 may obtain the resource-sharing software plug-in from any number of possible sources in step 140. For example, the resource-using device 92 may contact the web service 104 to obtain an appropriate resource-sharing software plug-in for the resource-sharing device 94 based on the resource-sharing information, or the resource-using device 92 may communicate directly with the resource-sharing device 94 to obtain the resource-sharing software plug-in. After obtaining the resource-sharing software plug-in, the resource-using device 92 may install the resource-sharing software plug-in for use with the resource-sharing application. It should be appreciated that if the resource-sharing software plug-in indicated by the resource-sharing information already exists on the resource-using device 92, step 140 may be omitted.

Having obtained and installed the resource-sharing software plug-in, the user may choose to begin to use a resource of the resource-sharing device 94 from the resource-using device 92. Accordingly, in step 142, a connection may be established between the devices. The connection may take place over any of the communication channels 90, as illustrated in FIG. 7. In step 144, the resource-using device 92 may use resources the resource-sharing device 94 in a resource-sharing stream of data between the devices, based on the resource-sharing software plug-in obtained in step 138. FIGS. 11-17 that follow may illustrate an embodiment of the technique described in the flowchart 130.

FIGS. 11A-E illustrate screens that may be displayed on the resource-using device 92 while performing step 132 of the flowchart 130 of FIG. 10. Particularly, FIGS. 11A-E may depict screens for display on the resource-using device 92 when the resource-using device 92 is the handheld device 40; accordingly, in the following examples, the resource-using device 92 is discussed as the handheld device 40. However, it should be understood that the resource-using device 92 may be any electronic device 10, and thus the screens depicted in FIGS. 11A-E may be adapted for any resource-using device 92 having the display 18.

Turning first to FIG. 11A, a screen 146 may represent a home screen on the handheld device 40, which may represent the resource-using device 92. The screen 146 may include, among other things, the resource-sharing application icon 44. As noted above, the resource-sharing application icon 44 may be labeled "Share" to indicate that the resource-sharing application may allow a user to share resources with other electronic devices. Upon selection of the resource-sharing application icon 44, a resource-sharing application may begin to run on the handheld device 40.

FIG. 11B illustrates a screen 148 that may be displayed when the resource-sharing application begins to run on the handheld device 40. The screen 148 may include a title bar 150 indicating the name of the application, "Share," which may assist with navigation through the application. Additionally, the screen 148 may include several user-selectable buttons 152-156. The button 152 may be labeled "Device List," and may provide access to a list of resource-sharing devices 94 for which the handheld device 40 has software capabilities to use a resource of; the button 154 may be labeled "Add Device," and may enable a user to install appropriate software to use a resource of another resource-sharing device 94; and the button 156 may be labeled "Cancel," and may enable the user to exit the application, returning the user to the screen 146 of FIG. 11A.

When the button 152 of FIG. 11B is selected, a screen 158 may be displayed, as illustrated by FIG. 11C. If the appropriate software to use a resource of a resource-sharing device 94 has not been installed on the handheld device 40, no devices may be listed as capable of sharing resources with the handheld device 40. Thus, the screen 158 may list an option to add a device with which to use shared resources, as shown by a button 160, labeled "Add Device."

Turning to FIG. 11D, if a user selects the button 160 of FIG. 11C or the button 154 of FIG. 11B, a screen 162 may be displayed. The screen 162 may enable a user to add the capability to use a resource of a given resource-sharing device 94 with a variety of techniques, as indicated by buttons 164-170. As depicted in FIG. 11D, the button 164 may be labeled "Tap Device," the button 166 may be labeled "Tap Tag," the button 168 may be labeled "Scan Code," and the button 170 may be labeled "Discover Wirelessly."

Selecting each of the buttons 164-170 may enable the user to add capabilities to use a resource of resource-sharing devices 94 according to different techniques. Particularly, selecting the button 164 may enable the user to add a resource-sharing device 94 by tapping the NFC interface 34 of the resource-sharing device 94, as described with reference to FIGS. 11E-21. Selecting the button 166 may enable the user to add a resource-sharing device 94 by tapping an RFID tag 118 located on the resource-sharing device 94, as described with reference to FIGS. 22-27. Selecting the button 168 may enable the user to add a resource-sharing device 94 by scanning a matrix barcode tag 124 located on the resource-sharing device 94, as described with reference to FIGS. 28-31. Selecting the button 170 may enable the user to add a resource-sharing device 94 by locating the resource-sharing device 94 wirelessly, as described with reference to FIGS. 32-33.

It should be appreciated that although the "Back," "Menu," and "Cancel" buttons are not labeled with numerals in FIG. 11D or subsequent figures below, the buttons may function in the manners described above. As such, the "Back" button may navigate a user to a prior screen, the "Menu" button may navigate a user to the main screen 148 of the resource-sharing application, and the "Cancel" button may cancel a pending transaction or return a user to a prior screen.

Figure 11E:
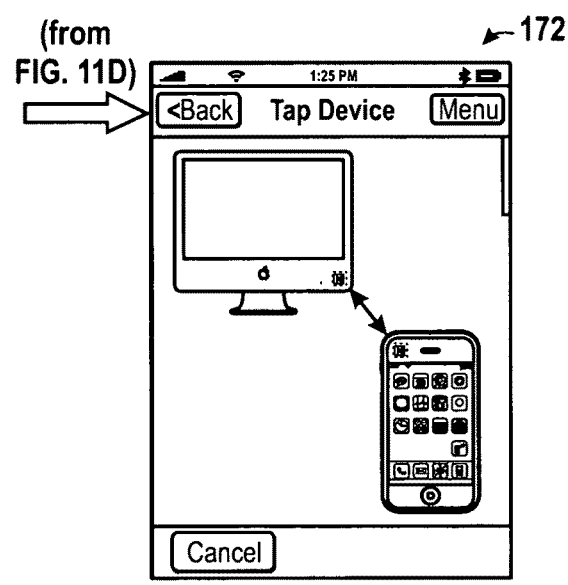

To add a device by tapping the devices together, a user may select the button 164, labeled "Tap Device." When the button 164 is selected, the handheld device 40 may display a screen 172, as illustrated in FIG. 11E. The screen 172 may place the NFC interface 34 of the handheld device 40 into a "host mode," the significance of which is described below, and may instruct the user to tap the NFC interfaces of the two devices together to add the device.

Figure 12:
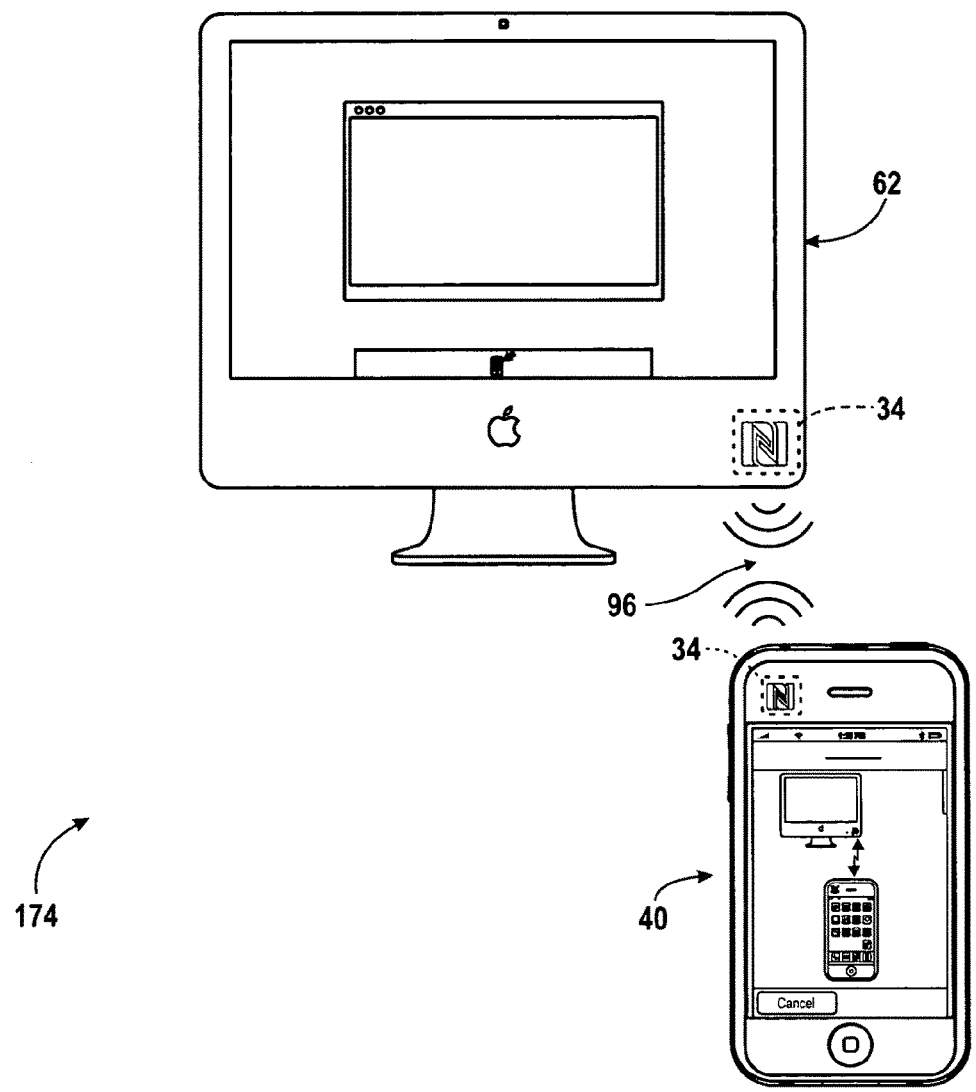
FIG. 12 is a schematic of a resource-sharing operation for establishing resource-sharing with a resource-using electronic device.

Turning to FIG. 12, a resource-sharing operation 174 represents a manner of obtaining resource-sharing with a resource-sharing device 94 using the NFC communication channel 96. For exemplary purposes, the resource-sharing operation 174 depicts the handheld device 40 as the resource-using device 92 and the computer 62 as the resource-sharing device 94. However, it should be understood that any other electronic devices 10 having NFC interfaces 34 may take the place of the handheld device 40 or the computer 62 in the resource-sharing operation 174. The resource-sharing operation 174 may represent, among other things, step 134 of the flowchart 130.

As shown in FIG. 12, the NFC interface 34 of the handheld device 40 may be placed in close proximity to the NFC interface 34 of the computer 62. As such, the NFC communication channel 96 may become established between the two devices. Thereafter, the handheld device 40 and the computer 62 may communicate information relevant to sharing one or more resources of the computer 62 over the NFC communication channel 96, as illustrated further below.

Figure 13:
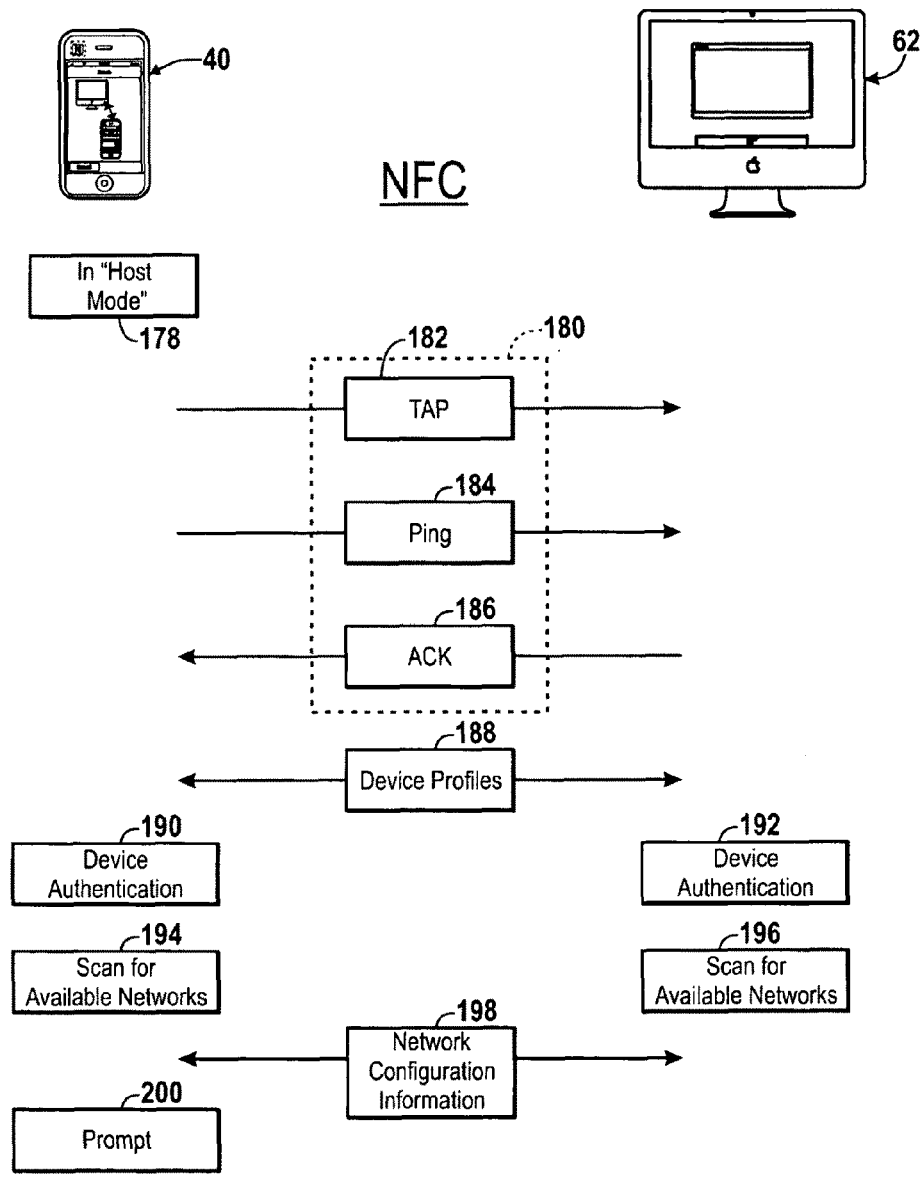
FIG. 13 is a block diagram representing communication that may take place during the resource-sharing operation of FIG. 12.

Turning to FIG. 13, a communication diagram 176 may illustrate an embodiment of communication that may take place between the handheld device 40 and the computer 62. Though the communication diagram 176 of FIG. 13 illustratively depicts communication between the computer 62 and the handheld device 40, it should be understood that the communication diagram 176 may apply to communication between any NFC-enabled electronic devices 10 following the resource-sharing operation 174 of FIG. 12. Further, it should be understood that the communication of the communication diagram 176 may be represented by the steps 136 and 138 of the flowchart 130 of FIG. 10.

The communication diagram 176 may begin when the NFC interface 34 of the handheld device 40 is placed in a "host mode," as indicated by block 354. The NFC interface 34 of the handheld device 40 may enter the "host mode" when the button 164 of the screen 162 of FIG. 11D is selected by the user. An NFC handshake 180 may next take place between the handheld device 40 and the computer 62 over the NFC communication channel 96. To begin the NFC handshake 180, a user may tap the NFC interfaces 34 of the handheld device 40 and the computer 62, as indicated by block 182. Because the handheld device 40 may be operating in the "host mode," as discussed above, the handheld device 40 may emit periodic NFC pings. One of the NFC pings may be transmitted to the computer 62, as indicated by block 184. After receiving the NFC ping of the block 184, the computer 62 may reply with an NFC acknowledgement packet, as indicated by a block 186, labeled "ACK."

With NFC communication established between the devices, the handheld device 40 and the computer 62 may exchange device profiles, as shown by the block 188. The device profiles may include a variety of information regarding the capabilities of the handheld device 40 and the computer 62. For example, the device profiles may include messages of any form, including extensible markup language (XML), which may denote the device name, serial number, owner name, type of device, as well as other identifying information. The other identifying information may include, for example, a hash of the user's account for a web service, such as iTunes®, or a public or private encryption key. The device profiles may further denote capabilities of the handheld device 40 or the computer 62 by indicating which applications, drivers, or services may be installed on each device.

The device profiles exchanged in block 188 may additionally indicate whether either device may share resources and, if so, may include relevant resource-sharing information. The resource-sharing information may provide information sufficient to enable the handheld device 40 to use a resource of the computer 62. For example, the resource-sharing information may include a serial number identifying the computer 62. The serial number may enable the handheld device 40 to search a database at the web service 104. Based on the serial number, the web service 104 may provide information identifying the type of device, an internet protocol (IP) address of the computer 62, a location where a resource-sharing software plug-in for using the resources of the computer 62 may be obtained, and/or the resource-sharing software plug-in. Alternatively, the resource-sharing information may include an XML message, which may provide similar information, such as the serial number, the type of device, and/or a location where the resource-sharing software plug-in may be obtained. As should be appreciated, the resource-sharing information that may be exchanged in the device profiles may be employed at a later time to obtain an appropriate resource-sharing software plug-in for using the resources of the computer 62 with the handheld device 40.

Subsequently, the handheld device 40 and the computer 62 may authenticate one another based at least in part on the information from the device profiles. The authentication procedures of blocks 190 and 192 of FIG. 13 may involve, for example, verifying that the owner of the handheld device 40 and the computer 62 are the same. Authentication may rely on a private key known to both the computer 62 and the handheld device 40, which may have been exchanged prior to communication or, additionally or alternatively, a combination of a public key and a private key. Under the latter scheme, the computer 62 and the handheld device 40 may each exchange public keys associated with one another prior to or during the authentication procedure of blocks 190 and 192, or may obtain public keys from another source. The computer 62 and the handheld device 40 may verify the public keys with a certificate authority over the Internet or via a web of trust. In certain variations, the web service 104 may represent the certificate authority. If there is any link broken in the chain of trust, the authentication procedure of blocks 190 and 192 may be terminated.

Following-device authentication, the handheld device 40 and the computer 62 may scan for available network communication channels 90 for the other to join for further communication, as indicated by blocks 194 and 196. After scanning for the available network communication channels 90, the handheld device 40 and the computer 62 may exchange network configuration information, as shown by block 198. The network configuration information of block 198 may include, for example, XML messages denoting lists of network communication channels 90 accessible via the computer 62 or the handheld device 40. Among other things, the network configuration information of block 198 may include known authorization keys and service set identifier (SSID). By way of example, the network configuration information may include PAN interface 28 configuration information, such as a Bluetooth serial number, MAC address, and an associated password, and/or LAN interface 30 configuration information, such as a WiFi IP address, a WiFi MAC address, and a WiFi SSID. The network configuration information may be stored for use at a later time to permit the handheld device 40 and the computer 62 to establish a higher bandwidth connection.

A final block 200 of the communication diagram 176 of FIG. 13 may represent a prompt that may issue on the handheld device 40 or, alternatively, on the computer 62. Based on the resource-sharing information transmitted with the device profiles of block 188, the prompt may request the attainment and installation of an appropriate resource-sharing software plug-in to enable the handheld device 40 to use a resource of the computer 62. The prompt of the block 200 may represent step 138 of the flowchart 130 of FIG. 10.

Figures 14A, 14B:
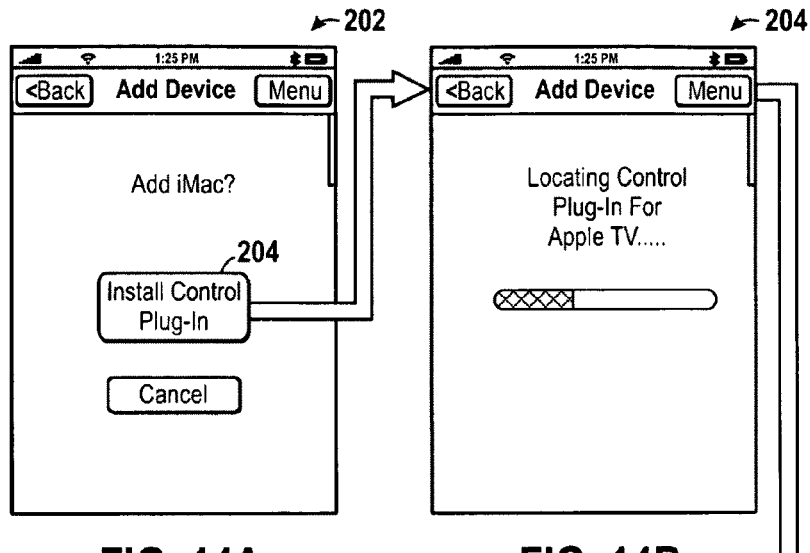
FIGS. 14A-E are schematics of screens that may be displayed on the resource-using electronic device for obtaining and installing resource-sharing software.

FIGS. 14A-E represent steps 138 and 140 of the flowchart 130 of FIG. 10. Turning first to FIG. 14A, a screen 202 may be displayed on the handheld device 40 as the prompt represented above in block 200 of FIG. 13. The screen 202 may represent step 138 of the flowchart 130, and may prompt the user to choose to add the standalone media player as a device that may share resources by the handheld device 40 by obtaining and installing an appropriate resource-sharing software plug-in. A button 204, labeled "Install Resource-Sharing Plug-In," may enable the user to initiate a process of obtaining and installing the resource-sharing software plug-in for using the resources of the computer 62.

Figure 15:
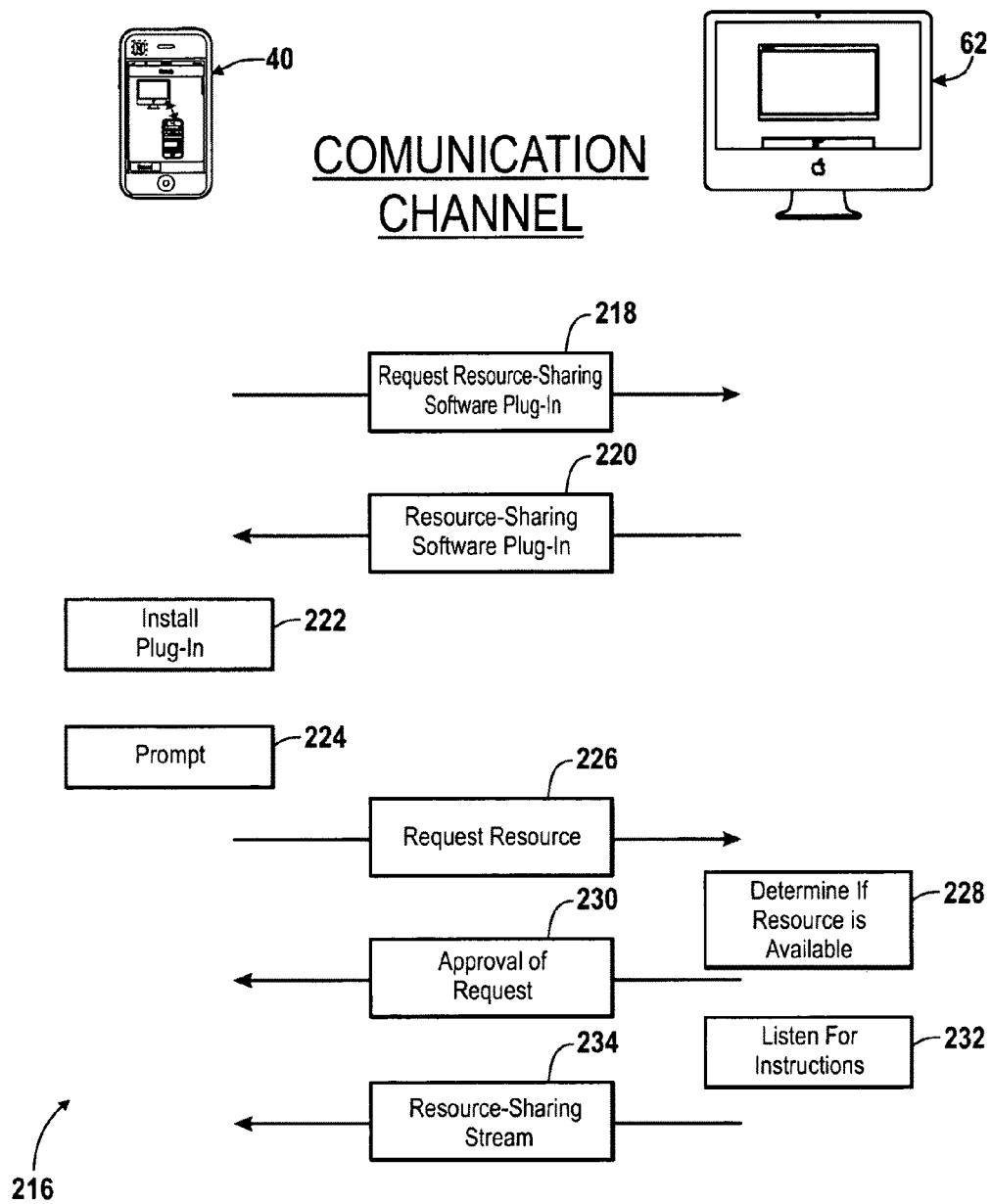
FIG. 15 is a block diagram representing communication that may take place during the installation procedures of FIGS. 14A-E.
Figure 16:
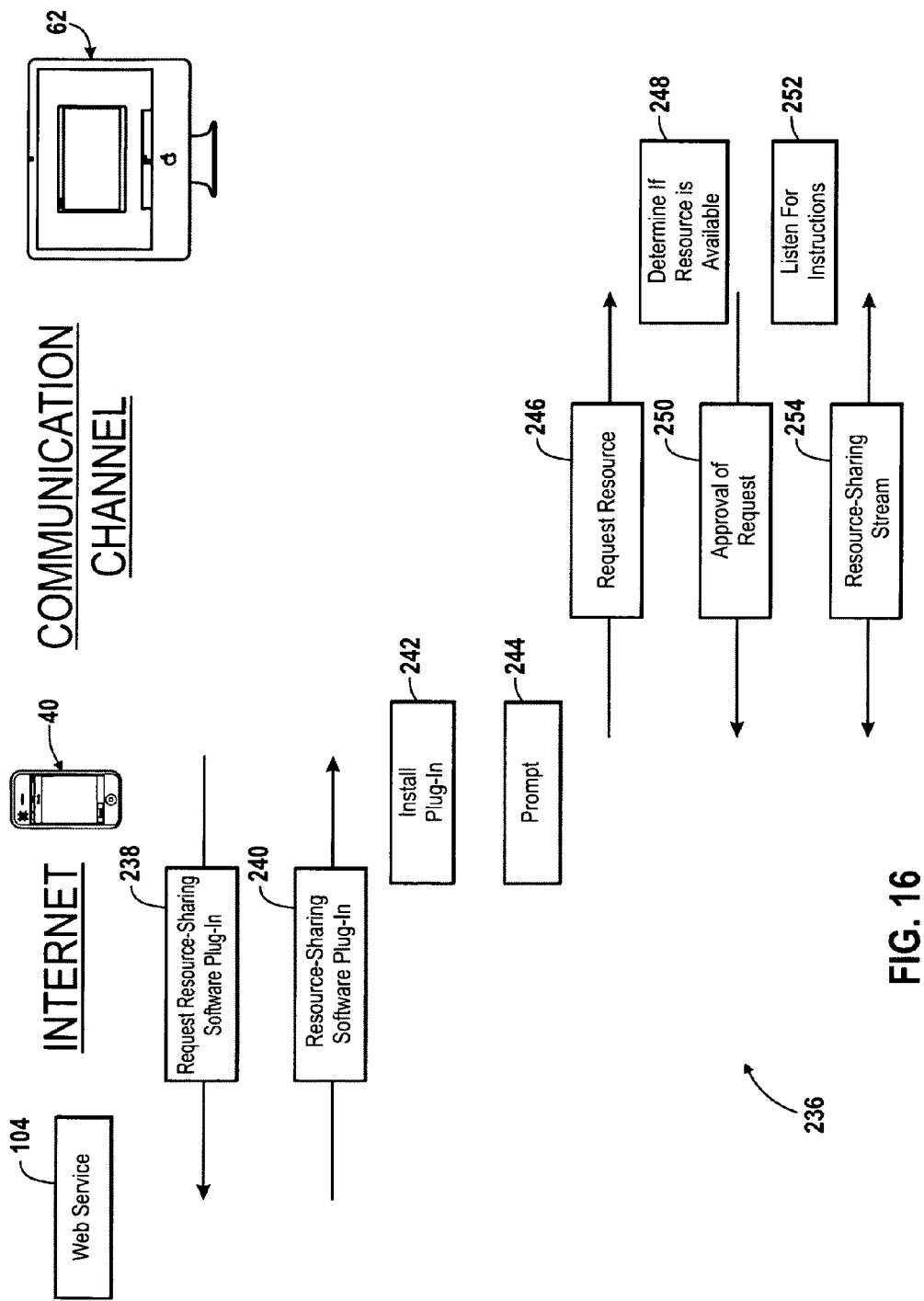
FIG. 16 is a block diagram representing alternative communication that may take place during the installation procedure of FIGS. 14A-E.

Turning to FIG. 14B, which may represent step 140 of the flowchart 130 of FIG. 10, a screen 204 may be displayed on the handheld device 40 when the button 204 of screen 202 is selected and the handheld device 40 may begin to obtain and install the resource-sharing software plug-in. The screen 204 may indicate to the user that the resource-sharing software plug-in is being located. As illustrated in FIGS. 15 and 16 below, the resource-sharing software plug-in may be obtained from one of many possible locations.

Figures 14C, 14D:
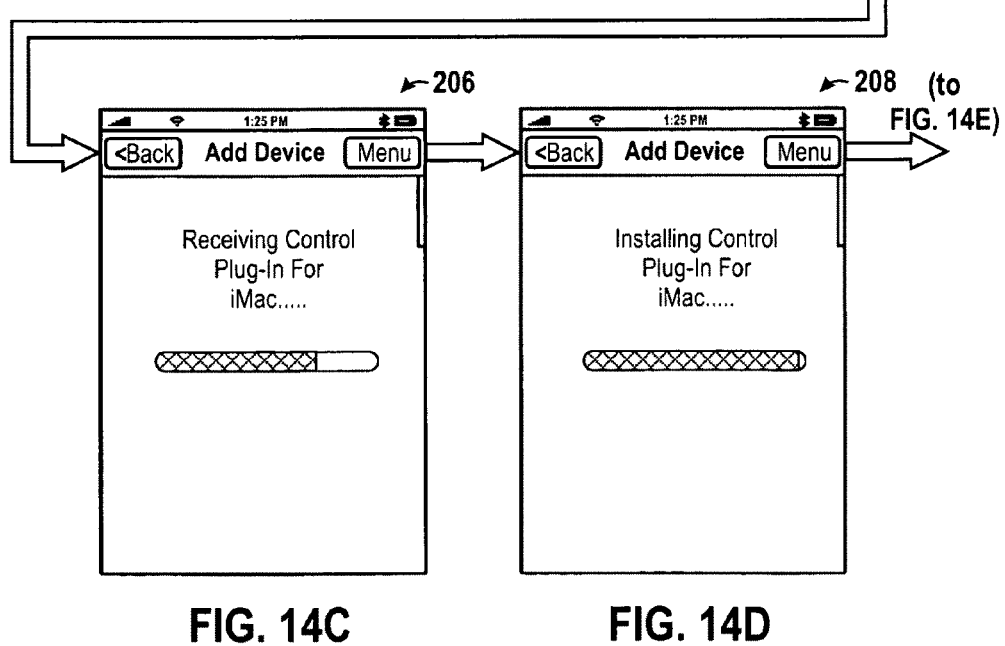
Figure 14E:
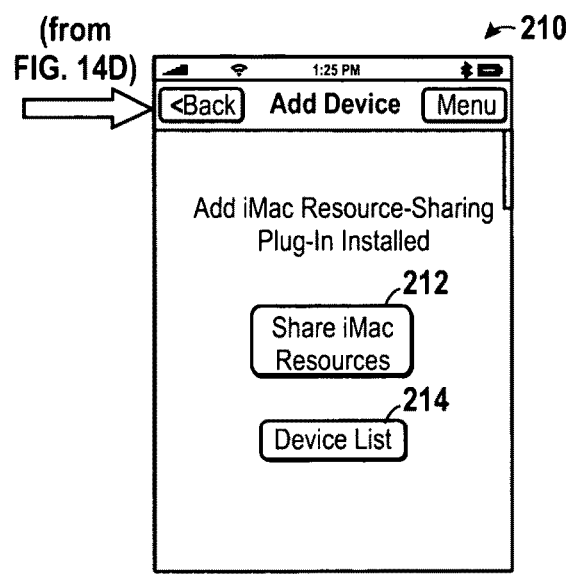

Turning next to FIG. 14C, a screen 206 may be displayed on the handheld device 40 when the handheld device 40 begins to receive the resource-sharing software plug-in needed to use a resource of the computer 62. When the resource-sharing software plug-in has been received and is being installed, a screen 208 may be displayed, as shown by FIG. 14D. Finally, as shown in FIG. 14E, when the resource-sharing software plug-in has been installed, enabling the handheld device 40 to use a resource of the computer 62, a screen 210 may be displayed on the handheld device 40. The screen 210 may indicate that the resource-sharing software plug-in has been installed on the handheld device 40 for using the resources of the computer 62, and may include a button 212, labeled "Share iMac Resources," and/or a button 214 labeled "Device List." If the user selects the button 212, the user may launch the resource-sharing software and may be able to use a resource of the computer 62 from the handheld device 40. By way of example, an available resource of the computer 62 may include an integrated video monitor which may be used to display video information from the handheld device 40, as described further below. If the user selects the button 214, the user may return to a list of devices that may be capable of sharing resources from the handheld device 40.

FIG. 15 depicts a communication diagram 216, which illustrates communication that may take place when the resource-sharing software plug-in for using the resources of the computer 62 from the handheld device 40 may be obtained and installed. The communication diagram 216 may represent communication corresponding to FIGS. 14A-E and steps 140-144 of the flowchart 130 of FIG. 10.

As indicated by the communication diagram 216, communication between the handheld device 40 and the computer 62 may continue over a communication channel 90 other than the NFC communication channel 96. Based on the network configuration information exchanged in the block 198 of FIG. 13, the handheld device 40 and the computer 62 may establish communication via another communication channel 90, as shown above with reference to FIG. 7. At the start of the communication diagram 216, the handheld device 40 may issue a request to the computer 62 to obtain the resource-sharing software plug-in for using the resources of the computer 62, as shown in block 218. The handheld device 40 may contact the computer 62 for such information based on information contained in the device profiles indicating that the computer 62 has the resource-sharing software plug-in available for transfer. After the request for the resource-sharing software plug-in has been issued to the computer 62, the computer 62 may reply by sending the resource-sharing software plug-in to the handheld device 40 over the communication channel 90, as illustrated in block 220. In a subsequent block 222, the handheld device 40 may install the resource-sharing software plug-in and, as illustrated in block 224, the handheld device 40 may thereafter issue a prompt enabling the user to begin to use a resource of the computer 62. The prompt of the block 224 may correspond with the prompt of the screen 210 of FIG. 14E.

When the user responds to the prompt of block 224 by selecting the button 212 of the screen 210, thereby electing to use a resource of the computer 62, a resource-sharing sequence may begin, as illustrated by blocks 226-234 of FIG. 15. In block 226, the handheld device 40 may transmit a message requesting a given resource, such as a video monitor, of the computer 62. As illustrated by block 228, the computer 62 may determine whether a requested resource is available. In block 230, the computer 62 may approve the request of block 226 by transmitting a message to the handheld device 40. The computer 62 may listen for instructions over the communication channel 90 from the handheld device 40, as shown in block 232. The handheld device 40 may thereafter share the requested resource from the computer 62 with a resource-sharing stream of data, which is depicted generally by a block 234. As should be appreciated, the precise data exchanged in the resource-sharing stream may be defined by the resource-sharing software plug-in that is employed to use the resource of the computer 62.

FIG. 16 represents another communication diagram 236, which may represent an alternative manner of obtaining the resource-sharing software plug-in for using the resources of the computer 62 from the handheld device 40. Thus, the communication diagram 236 may also represent communication corresponding to FIGS. 14A-E and steps 140-144 of the flowchart 130 of FIG. 10.

The communication diagram 236 may begin when the handheld device 40 may issue a request for the appropriate resource-sharing software plug-in to use a resource of the computer 62 over the Internet 102 to the web service 104, as illustrated in block 238. The request may be based on resource-sharing information received in the exchange of device profiles of block 188 of FIG. 13, as described above. The web service 104 may respond by sending the appropriate resource-sharing software plug-in to the handheld device 40.

In the same manner described above with reference to FIG. 15, the handheld device 40 may, in block 242, install the resource-sharing software plug-in. Further, as illustrated in block 244, the handheld device 40 may issue a prompt enabling the user to begin to use a resource of the computer 62. The prompt of the block 244 may correspond with the prompt of the screen 210 of FIG. 14E.

When the user responds to the prompt of block 244 by selecting the button 212 of the screen 210, thereby electing to use a resource of the computer 62, a resource-sharing sequence may begin, as illustrated by blocks 246-254 of FIG. 15. In block 246, the handheld device 40 may transmit a message requesting a given resource of the computer 62. As illustrated by block 248, the computer 62 may determine if the resource is available. In block 250, the computer 62 may approve the request of block 246 by transmitting a message to the handheld device 40. The computer 62 may listen for instructions over the communication channel 90 from the handheld device 40, as shown in block 252. The handheld device 40 may thereafter share the requested resource of the computer 62 with a resource-sharing stream of data, which is depicted generally by a block 254. As should be appreciated, the precise data exchanged in the resource-sharing stream may be defined by the resource-sharing software plug-in that is employed to use the resource of the computer 62.

Figure 17:
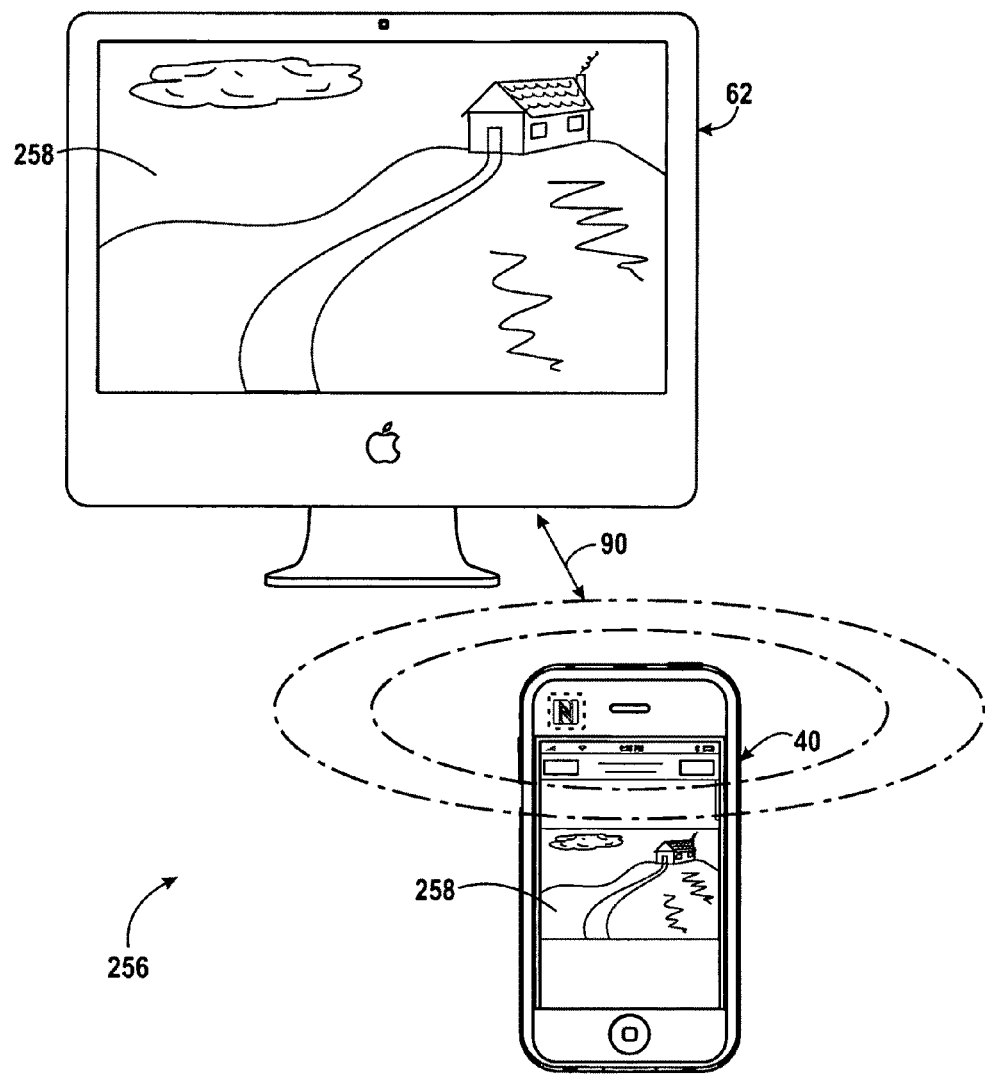
FIG. 17 is a schematic of a resource-sharing operation for using the resources of the standalone media player of FIG. 5 from the handheld device of FIG. 2.

FIG. 17 depicts a resource-sharing operation 256, which may represent step 144 of the flowchart 130 of FIG. 10. The resource-sharing operation 256 illustrates an exemplary manner in which a user may use resources from the computer 62 on the handheld device 40. If the resource being shared from the resource-sharing device 94 is a video monitor, the resource-sharing software plug-in of the resource-sharing software may enable a screen 258, displayed on the handheld device 40, to be displayed on the display 18 of the computer 62. As should be appreciated, the handheld device 40 may transmit the resource-sharing stream to use the video monitor resource of the computer 62 by way of a communication channel 90 to the computer 62.

Figure 18:
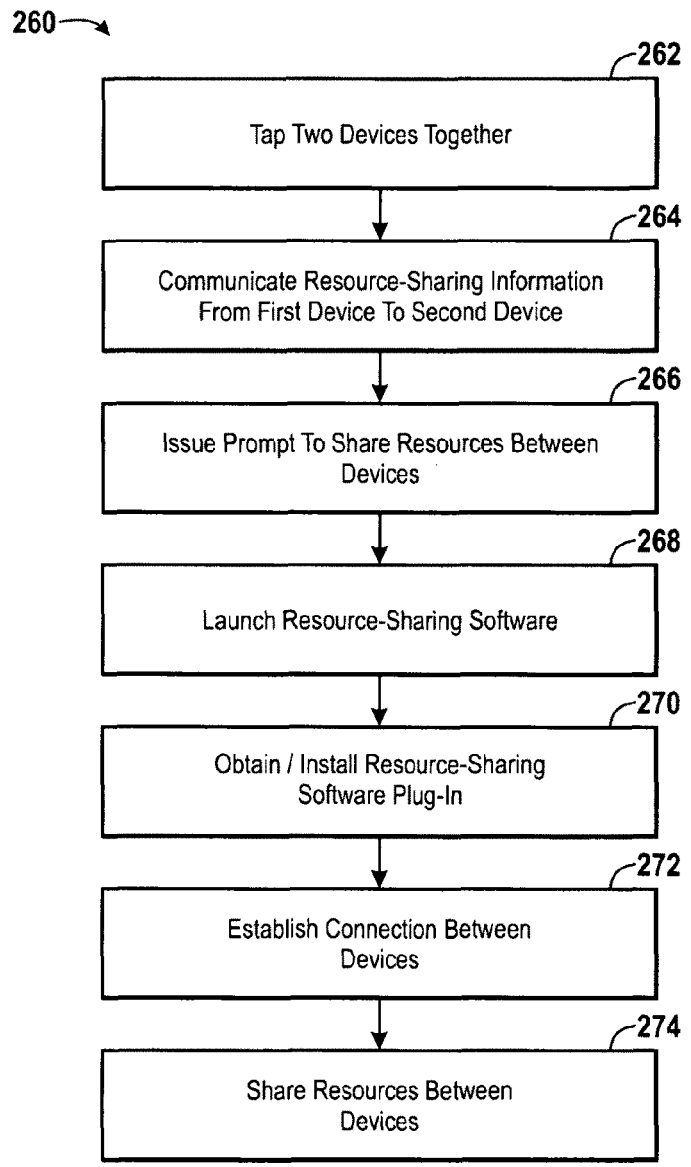
FIG. 18 is a flowchart describing a method for establishing resource-sharing with a resource-sharing electronic device.

Turning to FIG. 18, a flowchart 260 describes another technique for using the resources of the resource-sharing device 94 with the resource-using device 92. Particularly, the technique described in the flowchart 260 may be employed when both the resource-using device 92 and the resource-sharing device 94 include NFC interfaces 34. In a first step 262, a user may tap the NFC interface 34 of the resource-using device 92 to the NFC interface 34 of the resource-sharing device 94, causing the two devices to establish the NFC communication channel 96. In step 264, resource-sharing information may be communicated to the resource-using device 94 over the NFC communication channel 96. The resource-sharing information may provide information sufficient to enable the resource-using device 92 to use a resource of the resource-sharing device 94. By way of example, the resource-sharing information may include a serial number and/or an XML message having information identifying the resource-sharing device 94. The serial number may enable the resource-using device 92 to search a database at the web service 104. Based on the serial number, the web service 104 may provide information identifying the type of device, an internet protocol (IP) address of the resource-sharing device 94, a location where a resource-sharing software plug-in for using the resources of the resource-sharing device 94 may be obtained, and/or the resource-sharing software plug-in. If the resource-sharing information includes an XML message, the XML message may provide similar information, such as the serial number, the type of device, and/or a location where the resource-sharing software plug-in may be obtained.

Turning to step 266, the resource-using device 92 may issue a prompt to the user to launch the resource-sharing application on the resource-using device 92. Upon election by the user, the resource-using device 92 may launch the resource-sharing application in step 268. Thereafter, in step 270, the resource-using device may obtain the resource-sharing software plug-in from any number of possible sources in step 270. For example, the resource-using device 92 may contact the web service 104 to obtain the appropriate resource-sharing software plug-in for the resource-sharing device 94 based on the resource-sharing information, or the resource-using device 92 may communicate directly with the resource-sharing device 94 to obtain the resource-sharing software plug-in. After obtaining the resource-sharing software plug-in, the resource-using device 92 may install the resource-sharing software plug-in for use with the resource-sharing application. It should be appreciated that if the resource-sharing software plug-in indicated by the resource-sharing information already exists on the resource-using device 92, step 270 may be omitted.

Figure 19:
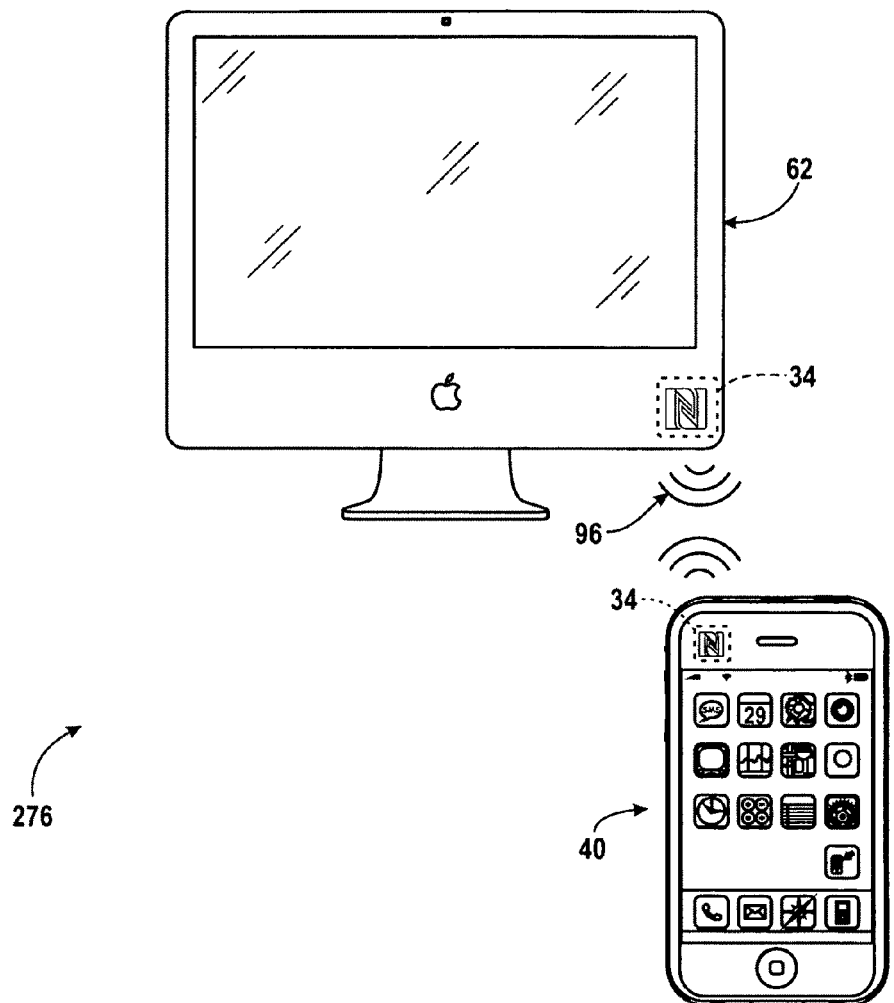
FIG. 19 is a schematic of a resource-sharing operation for establishing resource-sharing with a resource-sharing electronic device.
Figure 20:
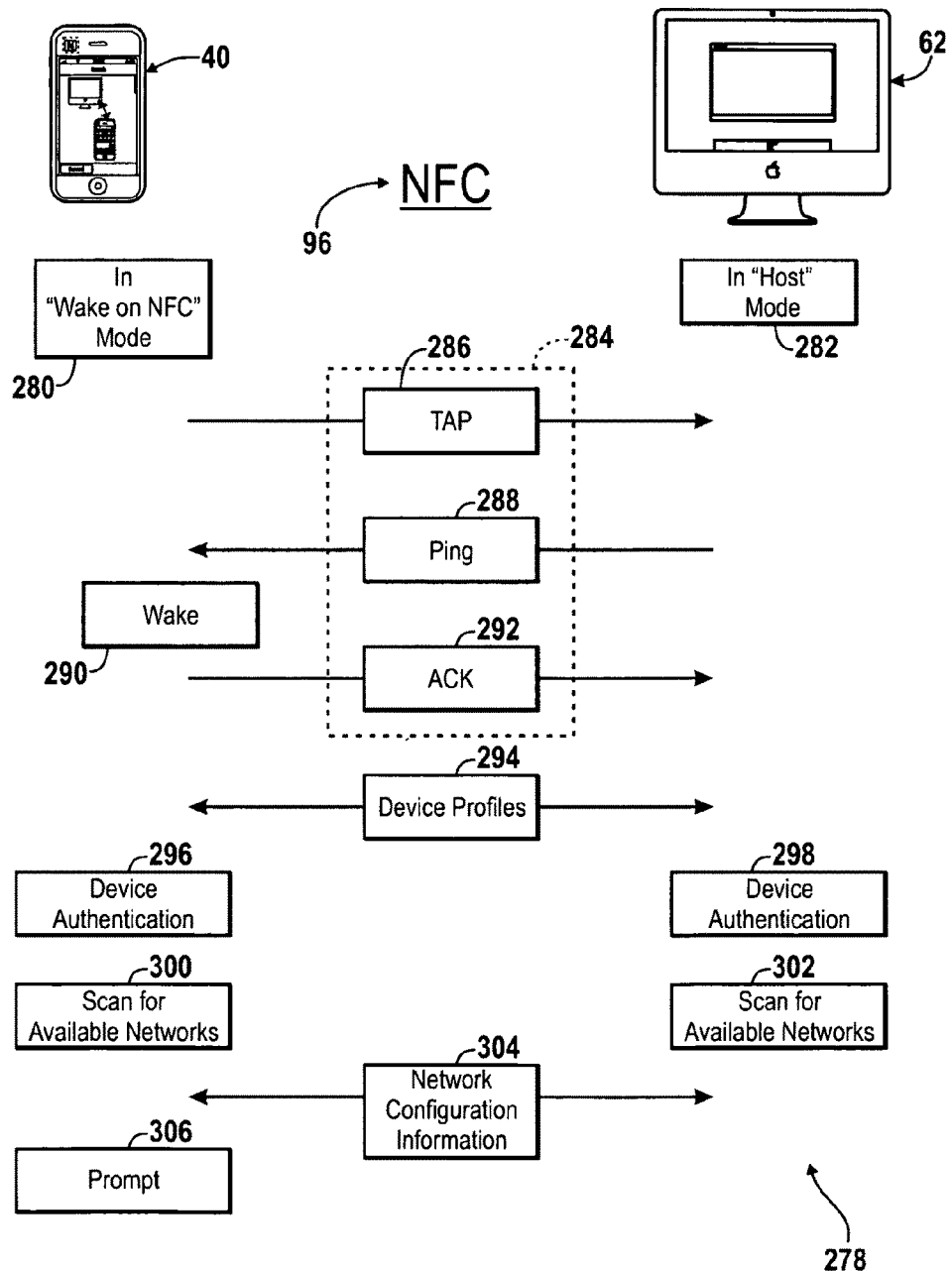
FIG. 20 is a block diagram representing communication that may take place during the resource-sharing operation of FIG. 19.
Figure 21:
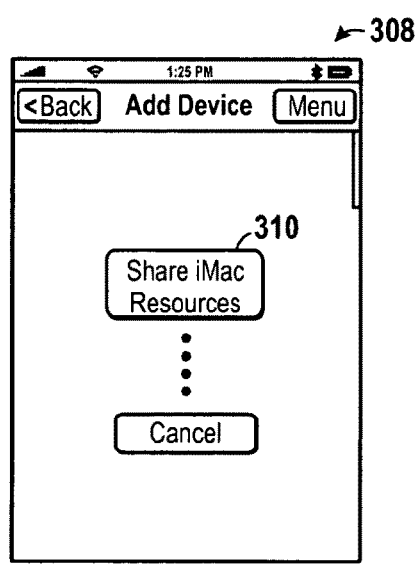
FIG. 21 is a schematic of a screen that may be displayed on a resource-using electronic device as a prompt to initiate resource-sharing.

Having obtained and installed the resource-sharing software plug-in, the user may choose to begin to use a resource of the resource-sharing device 94 from the resource-using device 92. Accordingly, in step 272, a connection may be established between the devices. The connection may take place over any of the communication channels 90, as illustrated in FIG. 7. In step 274, the resource-using device 92 may use resources the resource-sharing device 94 in a resource-sharing stream of data between the devices, based on the resource-sharing software plug-in obtained in step 270. FIGS. 19-21, which follow, may illustrate an embodiment of the technique described in the flowchart 130.

FIG. 19 illustrates a resource-sharing operation 276, which represents a manner of obtaining resource-sharing with a resource-sharing device 40 via the NFC communication channel 96. For exemplary purposes, the resource-sharing operation 276 depicts the handheld device 40 as the resource-using device 92 and the computer 62 as the resource-sharing device 94. However, it should be understood that any other electronic devices 10 having NFC interfaces 34 may take the place of the handheld device 40 or the computer 62 in the resource-sharing operation 276. The resource-sharing operation 276 may represent, among other things, step 262 of the flowchart 260.

As shown in FIG. 19, the NFC interface 34 of the handheld device 40 may be placed in close proximity to the NFC interface 34 of the computer 62. It should be noted that the handheld device 40 may not currently be running the resource-sharing application, in contrast to the resource-sharing operation 174 of FIG. 12. As such, the NFC communication channel 96 may become established between the two devices if the NFC interface 34 of the computer 62 is operating in a "host mode." Having established the NFC communication channel 96, the handheld device 40 and the computer 62 may communicate information relevant to the resource-sharing of the computer 62 over the NFC communication channel 96, as illustrated further below.

Figure 30:
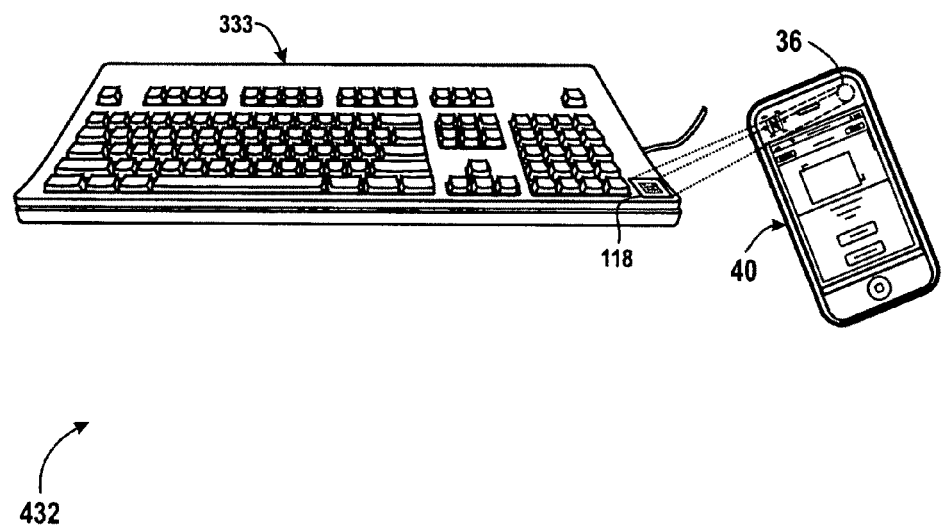
FIG. 30 is a schematic of a resource-sharing operation for establishing resource-sharing with a resource-sharing electronic device according to the method of the flowchart of FIG. 28.

Turning to FIG. 20, a communication diagram 278 may illustrate communication that may take place during the resource-sharing operation 276 of FIG. 30. At the start of the communication diagram 278, the NFC interface 34 of the handheld device 40 may initially remain in a "wake on NFC" mode as indicated by block 280. The "wake on NFC" mode may be the default mode for the NFC interface 34. By contrast, the NFC interface 34 of the computer 62 may operate in a "host mode," as indicated by block 282.

Communication between the handheld device 40 and the computer 62 may become established in an NFC handshake 284. To begin the NFC handshake 284, the user may tap the NFC interfaces 34 of the handheld device 40 and the computer 62, as indicated by the block 286. Because the computer 62, rather than the handheld device 40, may be operating in the "host mode," the computer 62 may emit periodic NFC pings. One of the NFC pings may be transmitted from the computer 62 to the handheld device 40, as indicated by block 288. Receiving the NFC ping may cause the NFC interface 34 of the handheld device 40 to awaken, as noted by block 290, and the handheld device 40 may reply with an NFC acknowledgement packet, as noted by block 292, labeled "ACK."

With NFC communication established between the devices, the handheld device 40 and the computer 62 may exchange device profiles, as shown by block 294. As noted above, the device profiles may include a variety of information regarding the capabilities of the handheld device 40 and the computer 62. For example, the device profiles may include messages of any form, including extensible markup language (XML), which may denote the device name, serial number, owner name, type of device, as well as other identifying information. The other identifying information may include, for example, a hash of the user's account for a web service, such as iTunes®, or a public or private encryption key. The device profiles may further denote capabilities of the handheld device 40 or the computer 62 by indicating which applications, drivers, or services may be installed on each device.

The device profiles exchanged in block 294 may additionally indicate whether either device may share resources and, if so, may include relevant resource-sharing information. The resource-sharing information may provide information sufficient to enable the handheld device 40 to use a resource of the computer 62. For example, the resource-sharing information may include a serial number identifying the computer 62. The serial number may enable the handheld device 40 to search a database at the web service 104. Based on the serial number, the web service 104 may provide information identifying the type of device, an internet protocol (IP) address of the computer 62, a location where a resource-sharing software plug-in for using the resources of the computer 62 may be obtained, and/or the resource-sharing software plug-in. Alternatively, the resource-sharing information may include an XML message, which may provide similar information, such as the serial number, the type of device, and/or a location where the resource-sharing software plug-in may be obtained. As should be appreciated, the resource-sharing information that may be exchanged in the device profiles may be employed at a later time to obtain an appropriate resource-sharing software plug-in for using the resources of the computer 62 with the handheld device 40.

Subsequently, the handheld device 40 and the computer 62 may authenticate one another based at least in part on the information from the device profiles. The authentication procedures of blocks 296 and 298 of FIG. 20 may involve, as in the communication diagram 176 of FIG. 13, verifying that the owner of the handheld device 40 and the computer 62 are the same. Authentication may rely on a private key known to both the computer 62 and the handheld device 40, which may have been exchanged prior to communication or, additionally or alternatively, a combination of a public key and a private key. Under the latter scheme, the computer 62 and the handheld device 40 may each exchange public keys associated with one another prior to or during the authentication procedure of blocks 296 and 298, or may obtain public keys from another source. The computer 62 and the handheld device 40 may verify the public keys with a certificate authority over the Internet or via a web of trust. In certain variations, the web service 104 may represent the certificate authority. If there is any link broken in the chain 60. of trust, the authentication procedure of blocks 296 and 298 may be terminated.

Following device authentication, the handheld device 40 and the computer 62 may scan for available network communication channels 90 for the other to join for further communication, as indicated by blocks 300 and 302. After scanning for the available network communication channels 90, the handheld device 40 and the computer 62 may exchange network configuration information, as shown by block 304. The network configuration information of block 304 may include, for example, XML messages denoting lists of network communication channels 90 accessible via the computer 62 or the handheld device 40. Among other things, the network configuration information of block 304 may include known authorization keys and service set identifier (SSID). By way of example, the network configuration information may include PAN interface 28 configuration information, such as a Bluetooth serial number, MAC address, and an associated password, and/or LAN interface 30 configuration information, such as a WiFi IP address, a WiFi MAC address, and a WiFi SSID. The network configuration information may be stored for use at a later time to permit the handheld device 40 and the computer 62 to establish a higher bandwidth connection.

A final block 306 of the communication diagram 278 of FIG. 20 may represent a prompt that may issue on the handheld device 40 or, alternatively, on the computer 62. Based on information from the device profiles exchanged in block 294, the prompt of block 306 may request that a user choose a course of action regarding the computer 62. For example, the handheld device 40 may recognize that the computer 62 is a resource-sharing device 94 based on the resource-sharing information transmitted among the device profiles, and thus the prompt may include an option to launch the resource-sharing application. Accordingly, the prompt of the block 306 may represent step 266 of the flowchart 260 of FIG. 18.

FIG. 21 illustrates a screen 308 that may represent the prompt of the block 306 described above, and thus may also represent step 266 of the flowchart 260 of FIG. 18. As noted above, the prompt represented by the screen 308 may be displayed after the handheld device 40 recognizes, based on information from the exchange of device profiles, that the computer 62 may share resources by the handheld device 40. As a result, among the options that the screen 308 may provide may include, for example, an option to use a resource of the computer 62, as illustrated by a button 310, labeled "Share iMac Resources." Depending on other information from the device profiles, the screen 308 may additionally provide such options as to control, transfer media with, etc. the computer 62.

When the button 310 is selected by a user, the handheld device 40 may launch the resource-sharing application. After the resource-sharing application begins to run, the handheld device 40 may undertake to obtain and install the appropriate resource-sharing software plug-in, such as may be described by the resource-sharing information obtained during the prior exchange of device profiles. As should be appreciated, the handheld device 40 may obtain and install the resource-sharing software plug-in the manner described above with reference to FIGS. 14-16. Further, the handheld device 40 may thereafter be used to use a resource of the computer 62 in the manner described above with reference to FIG. 17.

Figure 22:
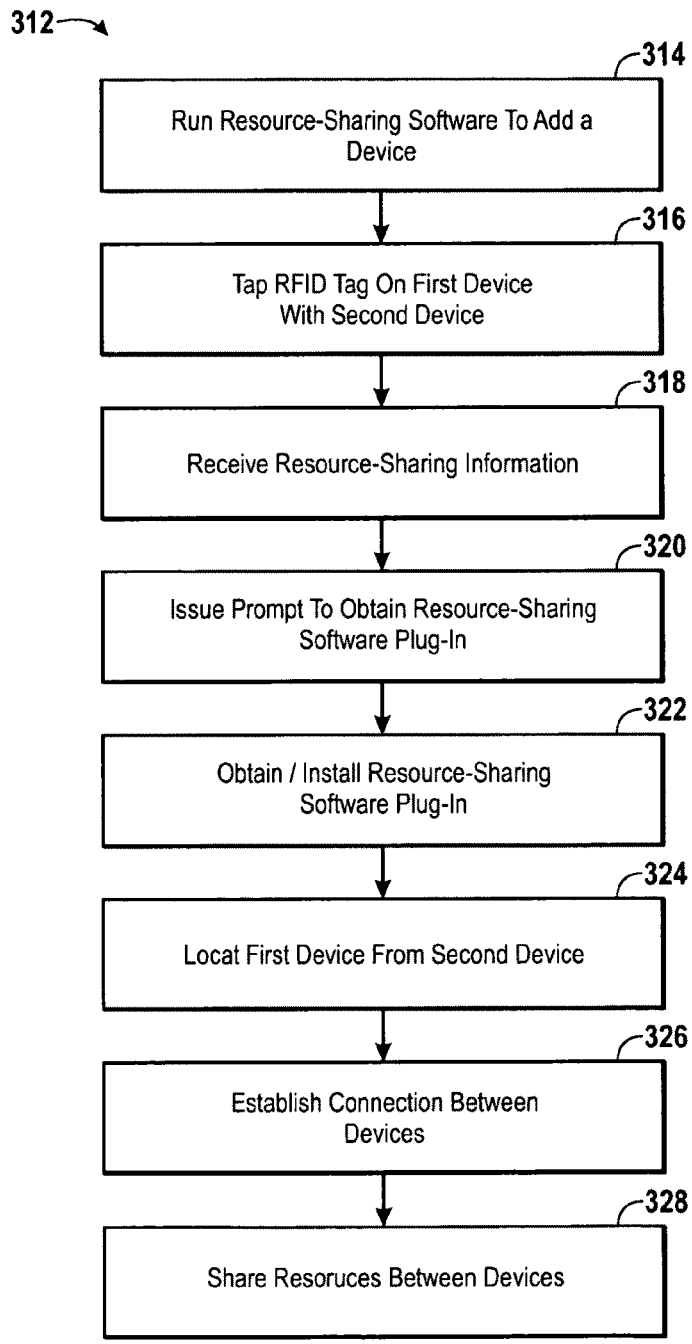
FIG. 22 is a flowchart describing a alternative method of establishing resource-sharing with a resource-sharing electronic device.

FIG. 22 is a flowchart 312 that may describe another manner of obtaining resource-sharing software to use a resource of a resource-sharing device 94 from a resource-using device 92. Particularly, the technique described in the flowchart 312 may be employed when the resource-using device 92 includes the NFC interface 34 and the resource-sharing device 94 includes an RFID tag 118. To place the resource-using device 92 in condition for extracting resource-sharing information from the RFID tag 118, which may be located on or associated with the resource-sharing device 94, a user may launch resource-sharing software on the resource-using device 92 in a first step 314. Such resource-sharing software may be, for example, the resource-sharing application described above with reference to FIG. 2 above. The resource-sharing software may prepare the resource-using device 92 for using the resources of the resource-sharing electronic device 94 by placing the NFC interface 34 of the resource-using device 92 into a "host mode," the significance of which is described below with reference to FIG. 25.

In step 316, the user may tap the NFC interface 34 of the resource-using device 92 to the RFID tag 118 associated with the resource-sharing device 94, causing the RFID tag 118 to become energized. Having become energized in step 316, the RFID tag 118 may communicate resource-sharing information to the resource-using device 92 via near field communication in step 318. The resource-sharing information may provide information sufficient to enable the resource-using device 92 to use a resource of the resource-sharing device 94. By way of example, the resource-sharing information may include a serial number and/or an XML message having information identifying the resource-sharing device 94. The serial number may enable the resource-using device 92 to search a database at the web service 104. Based on the serial number, the web service 104 may provide information identifying the type of device, an internet protocol (IP) address of the resource-sharing device 94, a location where a resource-sharing software plug-in for using the resources of the resource-sharing device 94 may be obtained, and/or the resource-sharing software plug-in. If the resource-sharing information includes an XML message, the XML message may provide similar information, such as the serial number, the type of device, and/or a location where the resource-sharing software plug-in may be obtained.

Turning to step 320, either the resource-using device 92 or the resource-sharing device 94 may issue a prompt to the user to obtain the resource-sharing software plug-in described in the resource-sharing information, which may be used by the resource-using device 92 to use a resource of the resource-sharing device 94. Once the user elects to obtain the resource-sharing software plug-in, the resource-using device 92 may obtain the resource-sharing software plug-in from any number of possible sources in step 322. For example, the resource-using device 92 may contact the web service 104 to obtain an appropriate resource-sharing software plug-in for the resource-sharing device 94 based on the resource-sharing information, or the resource-using device 92 may communicate directly with the resource-sharing device 94 to obtain the resource-sharing software plug-in. After obtaining the resource-sharing software plug-in, the resource-using device 92 may install the resource-sharing software plug-in for use with the resource-sharing application. It should be appreciated that if the resource-sharing software plug-in indicated by the resource-sharing information already exists on the resource-using device 92, step 322 may be omitted.

Having obtained and installed the resource-sharing software plug-in in step 322, the user may choose to begin to use a resource of the resource-sharing device 94 from the resource-using device 92. Accordingly, in step 324, the resource-using device 92 may locate the resource-sharing device 94. The resource-using device 92 may locate the resource-sharing device 94 using the resource-sharing information obtained from the RFID tag 118 directly or indirectly. For example, the resource-sharing information may list a MAC address and/or password for the resource-sharing device 94; the resource-using device 92 may search local networks for the MAC address listed in the resource-sharing information to locate the resource-sharing device 94. Alternatively, the resource-using device 92 may contact the web service 104 to obtain an IP address registered for the resource-sharing device 94. After locating the resource-sharing device 94, the resource-using device 92 may establish a connection with the resource-sharing device 94 in step 326. As should be appreciated, the connection may take place over any of the communication channels 90, as illustrated in FIG. 7. In step 328, the resource-using device 92 may thereafter share one or more resources of the resource-sharing device 94 in a resource-sharing stream of data between the devices, based on the resource-sharing software plug-in obtained in step 322. FIGS. 23-27 that follow may illustrate an embodiment of the technique described in the flowchart 312.

Figures 23A, 23B:
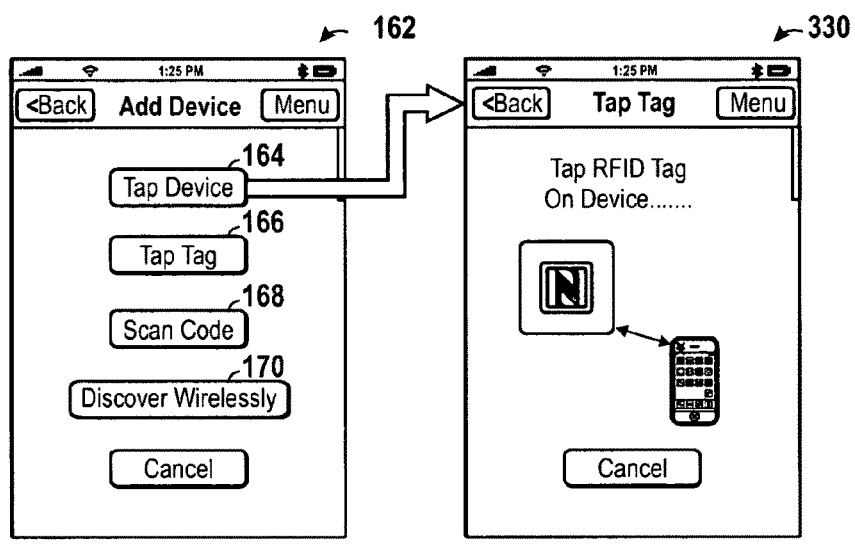
FIGS. 23A-B are schematics of screens that may be displayed on a resource-using electronic device for establishing resource-sharing with a resource-sharing electronic device.

FIGS. 23A-B represent screens that may be displayed on the handheld device 40 for performing the alternative method described in the flowchart 312, and may particularly represent step 314 of the flowchart 312. Though the following examples employ the handheld device 40 as the resource-using device 92 and the computer 62 as the resource-sharing device 94 for exemplary purposes, it should be understood that the resource-using device 92 or the resource-sharing device 94 may be any electronic device 10. Turning first to FIG. 23A, the button 166, labeled "Tap Tag," may be selected from the screen 162 to enable a user to add a resource-sharing device 94 by tapping an RFID tag 118 associated with the resource-sharing device 94. When the button 166 is selected, the handheld device 40 may display a screen 330, as shown in FIG. 23B. The screen 330 may instruct the user to tap the RFID tag 118, and may simultaneously place the NFC interface 34 of the handheld device 40 into a "host mode."

Figure 24:
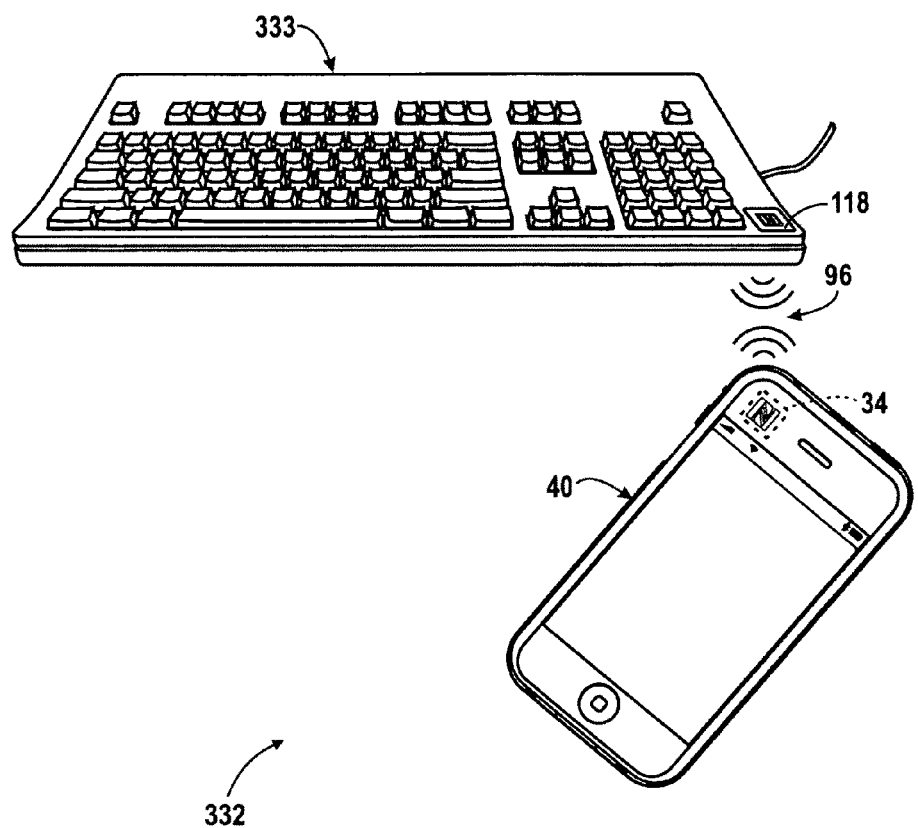
FIG. 24 is a schematic of a resource-sharing operation for establishing resource-sharing With a resource-sharing electronic device.

Turning to FIG. 24, a resource-sharing operation 332 represents a manner of initiating resource-sharing with a resource-sharing device 94 having an RFID tag 118. The resource-sharing operation 332 depicts the handheld device 40 as the resource-using device 92 and the computer 62, via an operably coupled keyboard 333, as the resource-sharing device 94 for exemplary purposes. However, it should be understood that any other electronic devices 10 having NFC interfaces 34 may take the place of the handheld device 40 or the computer 62 in the resource-sharing operation 332. The resource-sharing operation 332 may represent, among other things, step 316 of the flowchart 312 of FIG. 22.

To perform the resource-sharing operation 332, the NFC interface 34 of the handheld device 40 may be placed in close proximity to the RFID tag 118 associated with the computer 62. The RFID tag 118 may be located on the computer 62 itself or, as shown in FIG. 24, may be located on the associated keyboard 333. Alternatively, the RFID tag 118 may be located on any other materials that may be associated with the computer 62, such as a product manual. When the NFC interface 34 of the handheld device 40 approaches the RFID tag 118, the RFID tag 118 may become energized. Thereafter, the RFID tag 118 may communicate information relevant to the resource-sharing of the computer 62 via near field communication to the handheld device 40, as illustrated further below.

Figure 25:
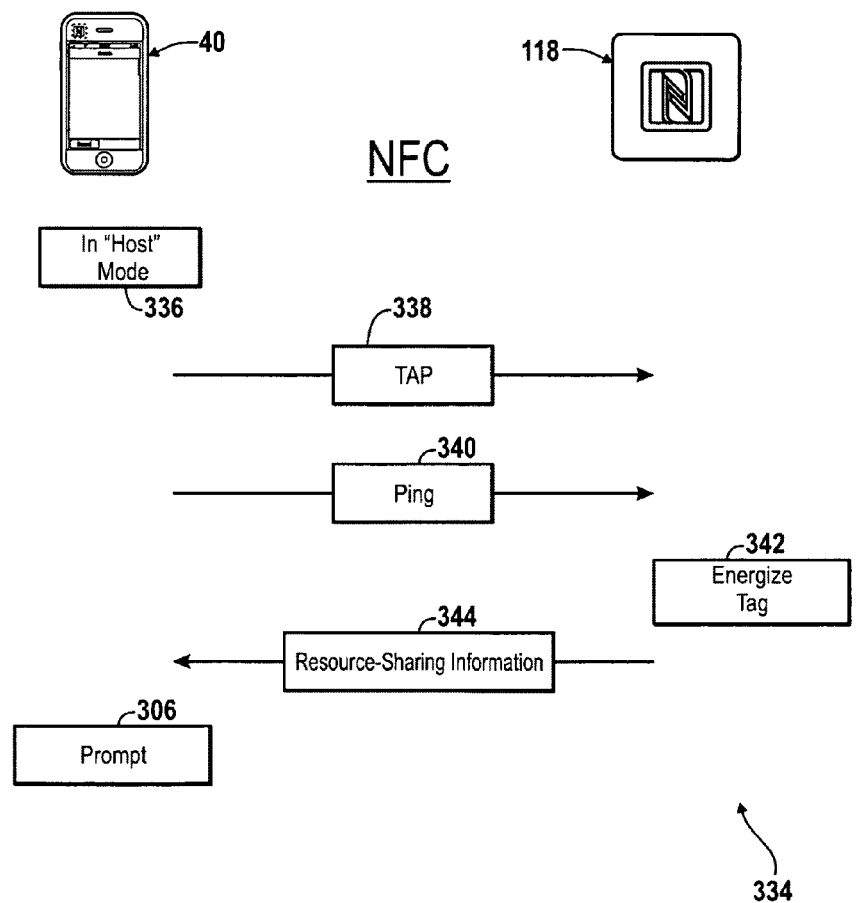
FIG. 25 is a block diagram representing communication that may take place during the resource-sharing operation of FIG. 24.

Turning to FIG. 25, a communication diagram 334 may describe communication that may take place during the resource-sharing operation 332 above, and may further represent steps 316-322 of the flowchart 312 of FIG. 22. The communication diagram 334 may begin when the NFC interface 34 of the handheld device 40 is in a "host mode," as shown in block 336. The NFC interface 34 of the handheld device 40 may enter the "host mode" of block 336 when the screen 330 is displayed on the handheld device 40, as discussed above with reference to FIG. 23B. Turning to block 338, as illustrated by the resource-sharing operation 332 of FIG. 24, the user may tap the handheld device 40 to the RFID tag 118. Because the NFC interface 34 of the handheld device 40 may be operating in a host mode, the NFC interface 34 of the handheld device 40 may periodically transmit NFC pings, as shown in block 340. The NFC ping of the block 340 may energize the RFID tag 118, as illustrated by block 342. The energized RFID tag 118 may thereafter transmit resource-sharing information, as shown in block 344.

The resource-sharing information may provide information sufficient to enable the handheld device 40 to use a resource of the computer 62. For example, the resource-sharing information may include a serial number identifying the computer 62 or the associated keyboard 333. The serial number may enable the handheld device 40 to search a database at the web service 104. Based on the serial number, the web service 104 may provide information identifying the type of device, an internet protocol (IP) address of the computer 62 to which the keyboard 333 is connected, a location where a resource-sharing software plug-in for using the resources of the computer 62 may be obtained, and/or the resource-sharing software plug-in. Alternatively, the resource-sharing information may include an XML message, which may provide similar information, such as the serial number, the type of device, and/or a location where the resource-sharing software plug-in may be obtained. As should be appreciated, the resource-sharing information that may be exchanged in the device profiles may be employed at a later time to obtain an appropriate resource-sharing software plug-in for using the resources of the computer 62 with the handheld device 40.

When the handheld device 40 has received the resource-sharing information of the block 344, the handheld device 40 may issue a prompt, as shown by block 346. The prompt may represent, for example, a screen displayed on the handheld device 40 prompting the user to decide whether to obtain and install a resource-sharing software plug-in for the purpose of using one or more resources of the resource-sharing device 94. Thus, the prompt of block 346 may be represented by the screen 202 of FIG. 14A above.

Figure 26:
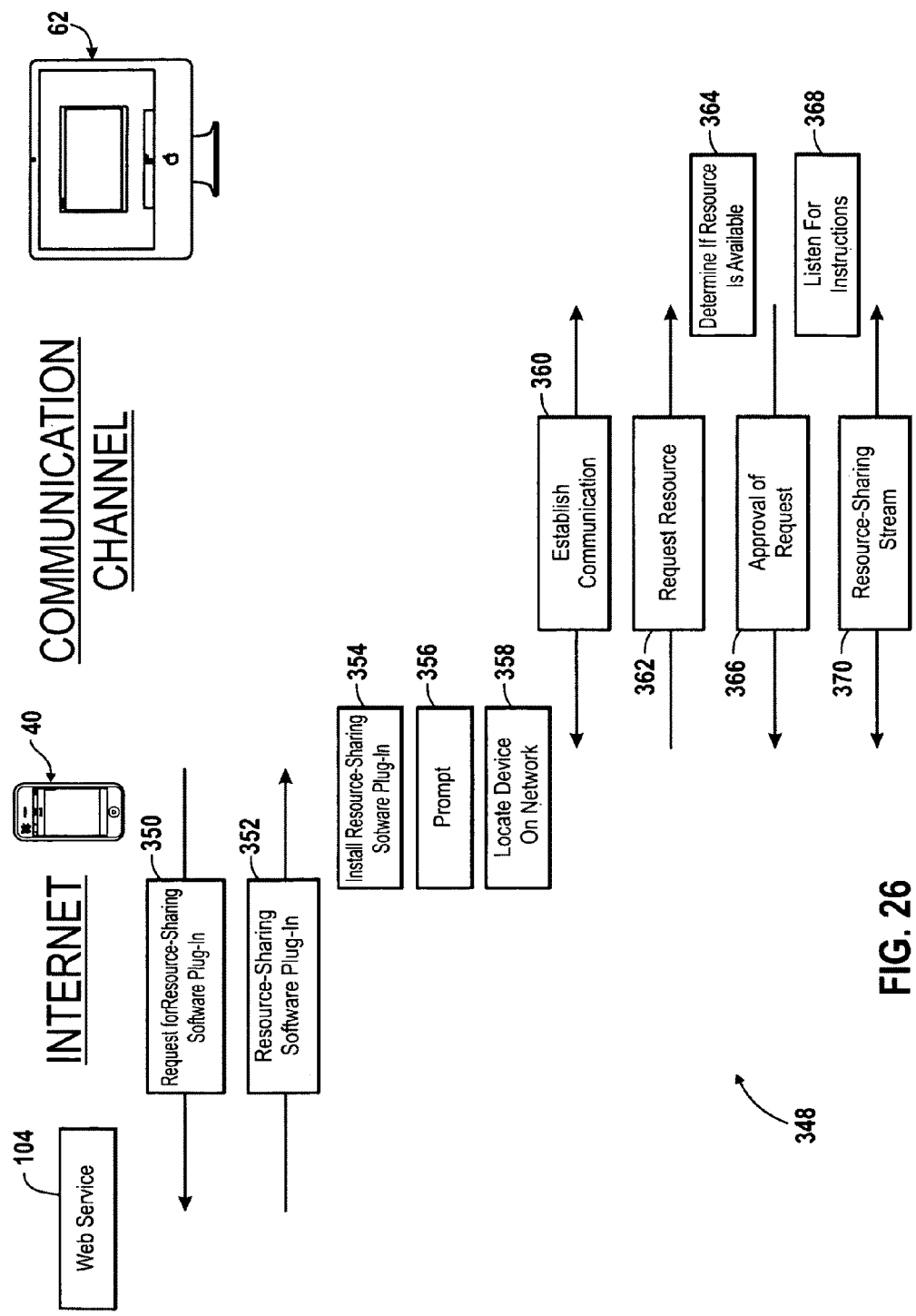
FIG. 26 is a block diagram representing communication that may take place following the resource-sharing operation of FIG. 24.

FIG. 26 represents another communication diagram 348, which may represent a manner of obtaining the resource-sharing software plug-in for using the resources of the computer 62 from the handheld device 40, and may represent communication corresponding to steps 322-328 of the flowchart 312 of FIG. 22. The communication diagram 348 may begin when the user responds to the prompt of the block 346 of FIG. 25 by choosing to obtain and install the resource-sharing software plug-in.

At the start of the communication diagram 348, the handheld device 40 may issue a request for the appropriate resource-sharing software plug-in to use a resource of the computer 62 over the Internet 102 to the web service 104, as illustrated in block 350. The request may be based on the resource-sharing information of block 344 of FIG. 25, as described above. The web service 104 may respond, as illustrated by block 352, by sending the appropriate resource-sharing software plug-in to the handheld device 40.

In the same manner described above with reference to FIG. 15, the handheld device 40 may, in block 354, install the resource-sharing software plug-in. Further, as illustrated in block 356, the handheld device 40 may issue a prompt enabling the user to begin to use a resource of the computer 62. The prompt of the block 356 may correspond with the prompt of the screen 210 of FIG. 14E. When the user responds to the prompt of block 356 by selecting the button 212 of the screen 210, thereby electing to use a resource of the computer 62, the handheld device 40 may attempt to locate the computer 62. In the communication diagram 348, the handheld device 40 may search locally available networks for the computer 62 based on the resource-sharing information of block 344 of FIG. 25, as shown by block 358. After locating the computer 62, the handheld device 40 may establish communication with the computer 62 over any communication channel 90 in block 360.

A resource-sharing sequence, as illustrated by blocks 362-370, may begin. In block 362, the handheld device 40 may transmit a message requesting resource-sharing with the computer 62. As illustrated by block 364, the computer 62 may determine if a requested resource is available. In block 366, the computer 62 may approve the request of block 362 by transmitting a message to the handheld device 40. The computer 62 may then listen for instructions over the communication channel 90 from the handheld device 40, as shown in block 368. The handheld device 40 may thereafter use the requested resource of the computer 62 with a resource-sharing stream of data, which is depicted generally by block 370. As should be appreciated, the precise data exchanged in the resource-sharing stream may be defined by the resource-sharing software plug-in that is employed to use a resource of the computer 62.

Figure 27:
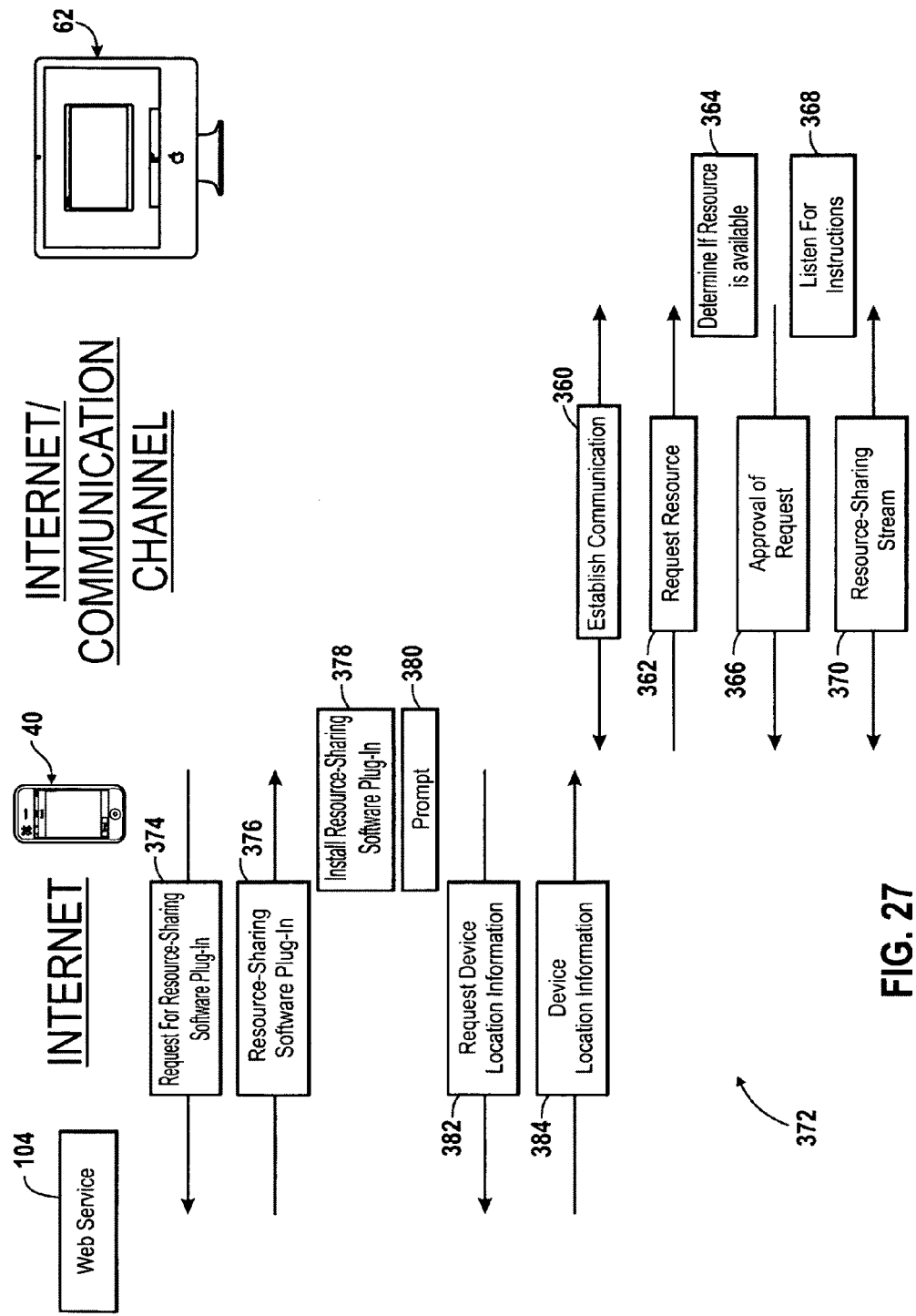
FIG. 27 is a block diagram representing alternative communication that may take place following the resource-sharing operation of FIG. 24.

FIG. 27 is an alternative communication diagram 372, which may represent a manner of obtaining the resource-sharing software plug-in for using the resources of the computer 62 from the handheld device 40, and may also represent communication corresponding to steps 322-328 of the flowchart 312 of FIG. 22. The communication diagram 372 of FIG. 27 remains essentially unchanged from the communication diagram 348 of FIG. 26, with one exception. Specifically, blocks 374-380 and 386-396 of FIG. 27 correspond with blocks 350-356 and 360-370 of FIG. 26. However, as noted by blocks 382 and 384 of the communication diagram 372 of FIG. 27, the handheld device 40 may determine the location of the computer 62 by requesting such information from the web service 104. The web service 104 may track the IP address and/or local network connection information of the computer 62. After receiving the request for the location of the computer 62 in block 382, the computer 62 may reply with various location information, as shown in block 384. In block 386, the handheld device 40 may establish communication with the computer 62 either by connecting to an IP address corresponding to the computer 62 over the Internet, or using the techniques described above with reference to blocks 358 and 360 of FIG. 26.

Figure 28:
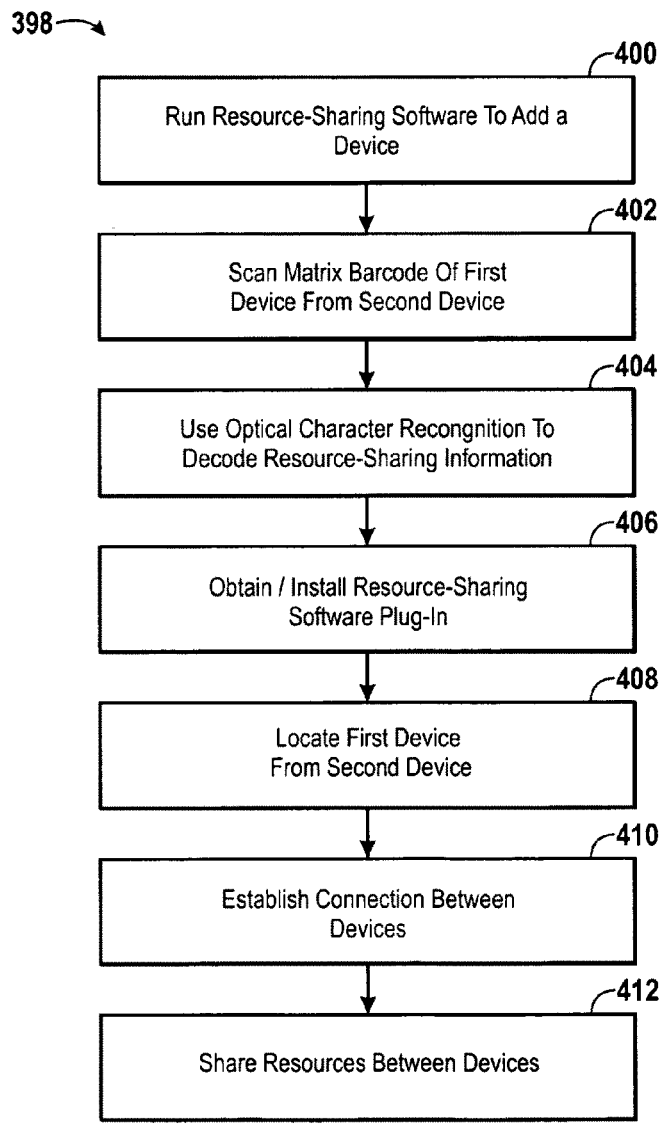
FIG. 28 is a block diagram describing an alternative method for establishing resource-sharing with a resource-sharing electronic device.

FIG. 28 is a flowchart 398 that may describe another manner of obtaining resource-sharing software to use a resource of a resource-sharing device 94 from a resource-using device 92. Particularly, the technique described in the flowchart 398 may be employed when the resource-using device 92 includes the camera 36 or another peripheral capable of reading a barcode or matrix barcode and the resource-sharing device 94 includes a matrix barcode tag 124. To place the resource-using device 92 in condition to extract resource-sharing information from the matrix barcode tag 124, which may be located on or associated with the resource-sharing device 94, a user may launch resource-sharing software on the resource-using device 92 in a first step 400. Such resource-sharing software may be, for example, the resource-sharing application described above with reference to FIG. 2 above. The resource-sharing software may prepare the resource-using device 92 for using the resources of the resource-sharing electronic device 94 by activating the camera 36 for scanning the matrix barcode tag 124, which is described below with reference to FIGS. 29-30.

In step 402, the user may scan the matrix barcode tag 124 associated with the resource-sharing device 94 by acquiring an image of the matrix barcode tag 124. In a next step 404, the handheld device 40 may decode the matrix barcode tag 124 using matrix-barcode-reading software or optical character recognition software to obtain resource-sharing information, which may provide information sufficient to enable the resource-using device 92 to use a resource of the resource-sharing device 94. By way of example, the resource-sharing information may include a serial number and/or an XML message having information identifying the resource-sharing device 94. The serial number may enable the resource-using device 92 to search a database at the web service 104. Based on the serial number, the web service 104 may provide information identifying the type of device, an internet protocol (IP) address of the resource-sharing device 94, a location where a resource-sharing software plug-in for using the resources of the resource-sharing device 94 may be obtained, and/or the resource-sharing software plug-in. If the resource-sharing information includes an XML message, the XML message may provide similar information, such as the serial number, the type of device, and/or a location where the resource-sharing software plug-in may be obtained.

Once the user elects to obtain the resource-sharing software plug-in, the resource-using device 92 may obtain the resource-sharing software plug-in from any number of possible sources in step 406. For example, the resource-using device 92 may contact the web service 104 to obtain an appropriate resource-sharing software plug-in for the resource-sharing device 94 based on the resource-sharing information, or the resource-using device 92 may communicate directly with the resource-sharing device 94 to obtain the resource-sharing software plug-in. After obtaining the resource-sharing software plug-in, the resource-using device 92 may install the resource-sharing software plug-in for use with the resource-sharing application. It should be appreciated that if the resource-sharing software plug-in indicated by the resource-sharing information already exists on the resource-using device 92, step 406 may be omitted.

Figure 31:
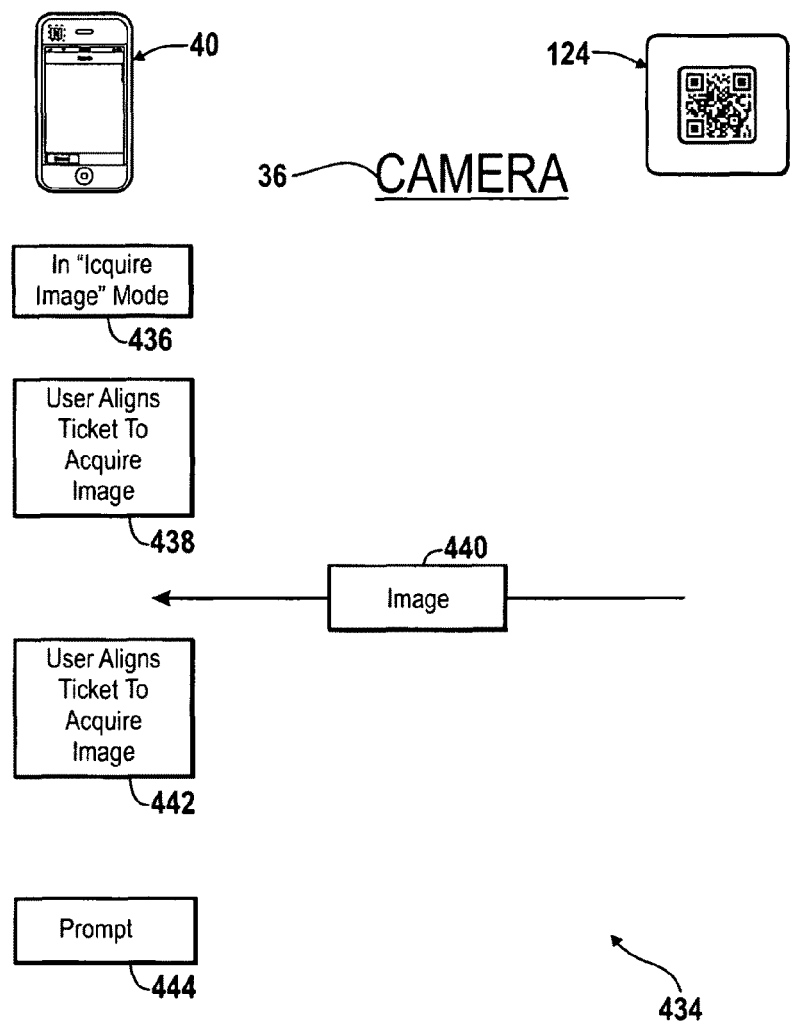
FIG. 31 is a block diagram representing communication that may take place during the resource-sharing operation of FIG. 30.

Having obtained and installed the resource-sharing software plug-in in step 322, the user may choose to begin to use a resource of the resource-sharing device 94 from the resource-using device 92. Accordingly, in step 408, the resource-using device 92 may locate the resource-sharing device 94. The resource-using device 92 may locate the resource-sharing device 94 using the resource-sharing information obtained from the matrix barcode tag 124 directly or indirectly. For example, the resource-sharing information may list a MAC address and/or password for the resource-sharing device 94; the resource-using device 92 may search local networks for the MAC address listed in the resource-sharing information to locate the resource-sharing device 94. Alternatively, the resource-using device 92 may contact the web service 104 to obtain an IP address registered for the resource-sharing device 94. After locating the resource-sharing device 94, the resource-using device 92 may establish a connection with the resource-sharing device 94 in step 410. As should be appreciated, the connection may take place over any of the communication channels 90, as illustrated in FIG. 7. In step 412, the resource-using device 92 may thereafter use one or more resources of the resource-sharing device 94 in a resource-sharing stream of data between the devices, based on the resource-sharing software plug-in obtained in step 406. FIGS. 29-31 that follow may illustrate an embodiment of the technique described in the flowchart 398.

Figures 29A, 29B:
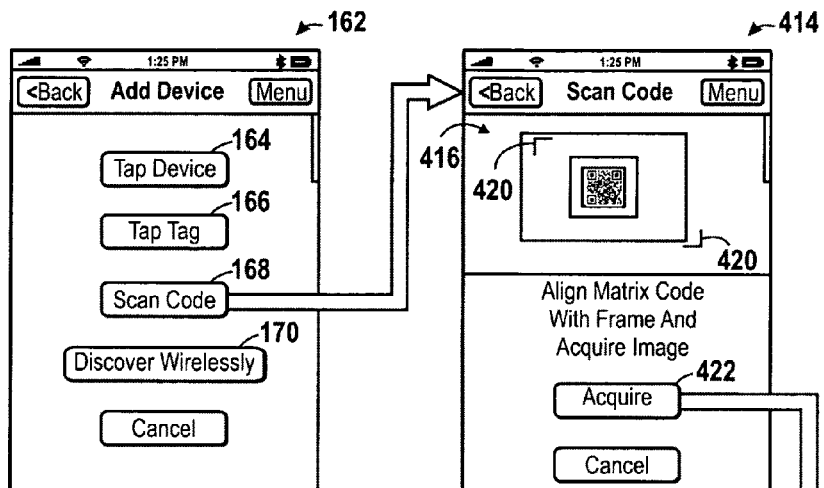
FIGS. 29A-C are schematics of screens that may be displayed for the alternative manner of establishing resource-sharing of the flowchart of FIG. 28.
Figure 29C:
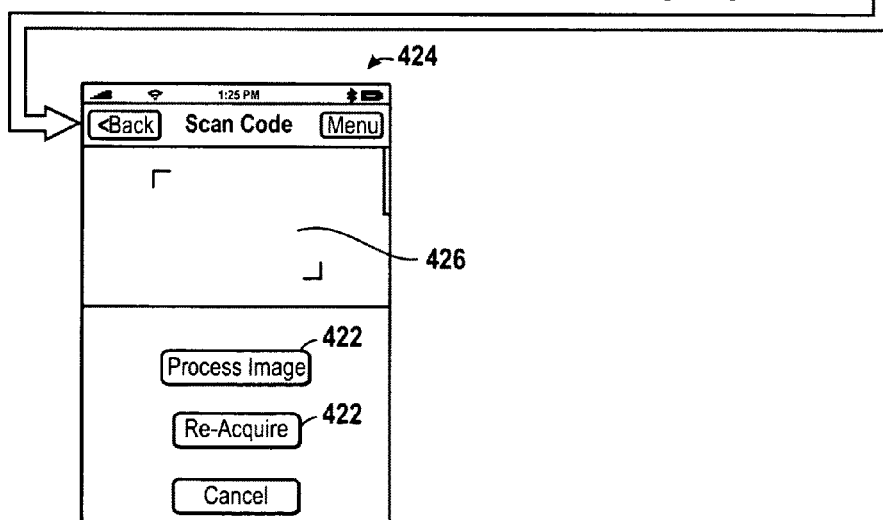

FIGS. 29A-C represents steps 402 and 404 of the flowchart 398 of FIG. 28 above. Turning first to FIG. 29A, the screen 162 may present the user with the button 168 labeled "Scan Code." Selecting the user selectable button 168 may cause the handheld device 40 to display a screen 414, as illustrated in FIG. 29B. The screen 246 may include a camera window 416 and a user selection prompt 418. The camera window 416 may present video images from the camera 36 of the handheld device 40. As noted in FIG. 29B, the user selection prompt 418 may instruct the user to align the matrix barcode tag 124 on the camera screen 416 to acquire an image. Image boundaries 420 may indicate the portion of the camera window 416 that may be saved as an image; selecting a user selectable button 422 labeled "Acquire" may cause the image of the matrix barcode tag 124 currently within the image boundaries 420 to be acquired.

A screen 424, shown in FIG. 29C, may be displayed when the button 422 is selected. A still image 426 may represent the image acquired by the camera 36. Two buttons 428 and 430 may be labeled "Process Image" and "Re-Acquire," respectively. The button 428 may allow a user to proceed with the still image 426, while the button 430 may allow the user to acquire another image of the matrix barcode 124 by returning to the screen 414 of FIG. 29B.

FIG. 30 depicts a resource-sharing operation 432 that may take place in conjunction with the screens of FIGS. 29A-C, which may also represent steps 402 and 404 of the flowchart 398 of FIG. 28. As illustrated in FIGS. 29A-C above, a user may scan the matrix barcode tag 124 that may be located on or associated with the electronic device 10 with which to use shared resources. In the example of FIG. 30, the camera 36 of the handheld device 40 may acquire an image of the matrix barcode tag 124 that may be located on the keyboard 333, which may be operably coupled to the computer 62. The handheld device 40, using optical character recognition and/or matrix-barcode-reading software, may obtain resource-sharing information from the matrix barcode tag 124. As should be appreciated, the resource-sharing information encoded in the matrix barcode tag 124 may be used by the handheld device 40 to acquire the appropriate resource-sharing software plug-in to use a resource of the computer 62.

Turning to FIG. 31, a communication diagram 434 represents communication that may take place in the resource-sharing operation 432 of FIG. 30 and/or steps 402-404 of the flowchart 398 of FIG. 28. At the outset of the communication diagram 434, the handheld device 40 may enter an "acquire image" mode, as indicated by block 436. The "acquire image" mode of the handheld device 40 may be represented by the screen 414 shown in FIG. 29B. As noted by block 438, the user may next align the matrix barcode tag 124 in the camera to acquire an image of the matrix barcode 128.

As illustrated by block 440, the image 426 may be acquired. The image 426 may be represented on the screen 424 of FIG. 29C above. When the user selects the button 428 of the screen 424, the handheld device 40 may process the image 426 using optical character recognition or matrix-barcode-reading software to obtain resource-sharing information encoded on the matrix barcode tag 124, as shown in block 442. After obtaining the resource-sharing information, the handheld device 40 may issue a prompt, such as that of the screen 202 of FIG. 14A, which may prompt the user to obtain and/or install the appropriate resource-sharing software plug-in. It should be understood that the resource-sharing software plug-in may be obtained and installed using the techniques described above with reference to FIGS. 26-27, and that the handheld device 40 may thereafter use one or more resources of the computer 62 in the manner described above with reference to FIG. 17.

Figure 32:
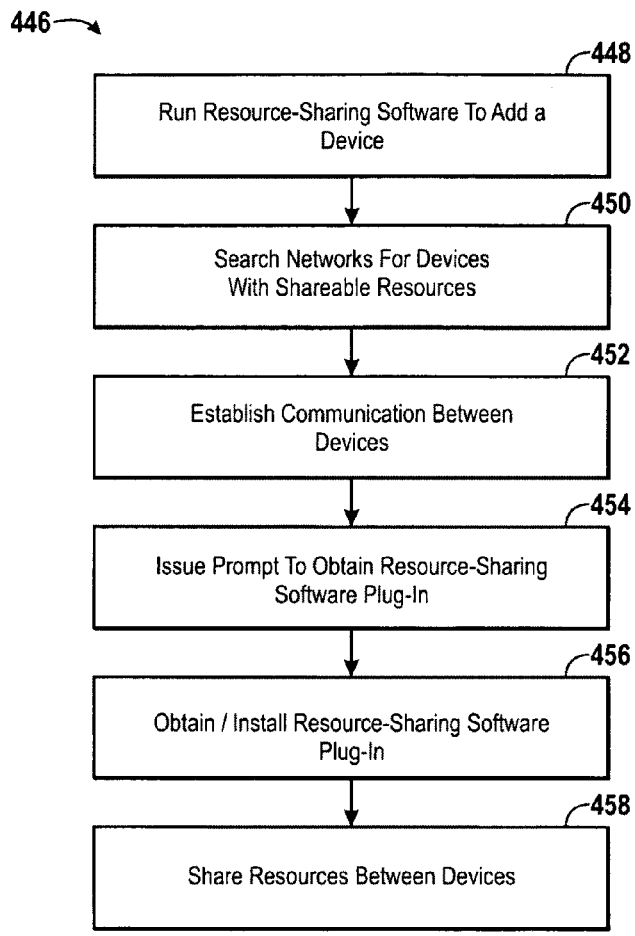
FIG. 32 is a flowchart describing an alternative method of establishing resource-sharing with a resource-sharing electronic device.

FIG. 32 represents a flowchart 446 that may describe another manner of obtaining resource-sharing software to use a resource of a resource-sharing device 94 from a resource-using device 92. Particularly, the technique described in the flowchart 312 may be employed when the resource-using device 92 and the resource-sharing device 94 include the PAN or LAN network interfaces 28 or 30. The flowchart 446 may begin when a user may launch resource-sharing software on the resource-using device 92 in a first step 314. Such resource-sharing software may be, for example, the resource-sharing application described above with reference to FIG. 2 above. The resource-sharing software may prepare the resource-using device 92 by enabling the resource-using device 94 to search available networks for resource-sharing devices 94.

In step 450, the resource-using device 92 may search available networks for resource-sharing devices 94 that have not yet been added. To discover the resource-sharing devices 94, the resource-using device 92 may seek device identification broadcast protocol messages, such as Bonjour® messages, that may indicate which networked devices are resource-sharing devices 94. After identifying at least one resource-sharing device 94 from a device identification broadcast protocol message, the resource-using device 92 may establish communication with a selected resource-sharing device 94 in step 452. Establishing communication with the resource-sharing device 94 may allow the resource-using device 92 to obtain resource-sharing information from the resource-sharing device 94. Alternatively, in lieu of establishing communication with the resource-sharing device 94 to obtain the resource-sharing information in step 452, the resource-using device 92 may instead obtain the resource-sharing information from the device identification broadcast protocol message, if such resource-sharing information is present in the message.

It should be appreciated that the resource-sharing information may provide information sufficient to enable the resource-using device 92 to use a resource of the resource-sharing device 94. By way of example, the resource-sharing information may include a serial number and/or an XML message having information identifying the resource-sharing device 94. The serial number may enable the resource-using device 92 to search a database at the web service 104. Based on the serial number, the web service 104 may provide information identifying the type of device, an internet protocol (IP) address of the resource-sharing device 94, a location where a resource-sharing software plug-in for using the resources of the resource-sharing device 94 may be obtained, and/or the resource-sharing software plug-in. If the resource-sharing information includes an XML message, the XML message may provide similar information, such as the serial number, the type of device, and/or a location where the resource-sharing software plug-in may be obtained.

Turning to step 454, either the resource-using device 92 or the resource-sharing device 94 may issue a prompt to the user to obtain the resource-sharing software plug-in described in the resource-sharing information, which may be used by the resource-using device 92 to use a resource of the resource-sharing device 94. Once the user elects to obtain the resource-sharing software plug-in, the resource-using device 92 may obtain the resource-sharing software plug-in from any number of possible sources in step 456. For example, the resource-using device 92 may contact the web service 104 to obtain an appropriate resource-sharing software plug-in for the resource-sharing device 94 based on the resource-sharing information, or the resource-using device 92 may communicate directly with the resource-sharing device 94 to obtain the resource-sharing software plug-in. After obtaining the resource-sharing software plug-in, the resource-using device 92 may install the resource-sharing software plug-in for use with the resource-sharing application. It should be appreciated that if the resource-sharing software plug-in indicated by the resource-sharing information already exists on the resource-using device 92, step 456 may be omitted.

Having obtained and installed the resource-sharing software plug-in in step 456, the user may choose to begin to use a resource of the resource-sharing device 94 from the resource-using device 92. Accordingly, in step 458, the resource-using device 92 may establish a connection with the resource-sharing device 94. As should be appreciated, the connection may take place over any of the communication channels 90, as illustrated in FIG. 7. The resource-using device 92 may thereafter use one or more resources of the resource-sharing device 94 with a resource-sharing stream of data between the devices, based on the resource-sharing software plug-in obtained in step 456. FIG. 33 that follows may illustrate an embodiment of the technique described in the flowchart 446.

Figures 33A, 33B:
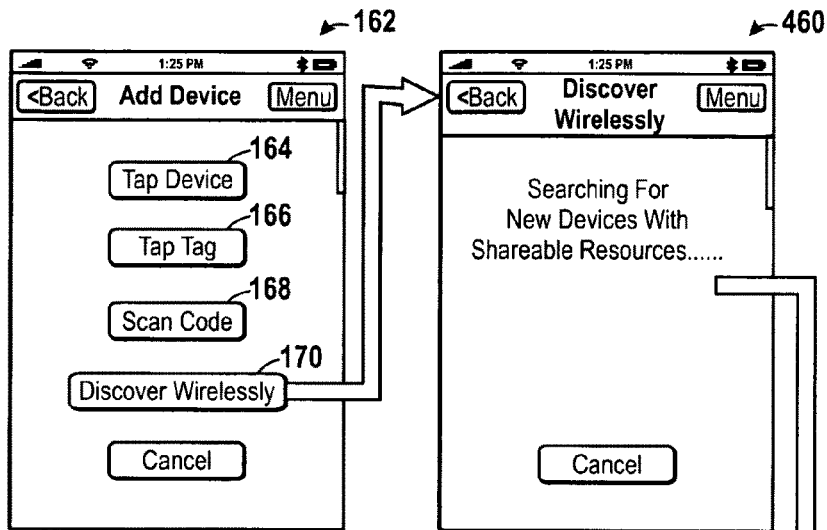
FIGS. 33A-E are schematics of screens that may be displayed in carrying out the method of the flowchart of FIG. 32.

Turning to FIG. 33A, a user may select the button 170, labeled "Discover Wirelessly," of the screen 162. Doing so may cause the handheld device 40 to display a screen 460, as illustrated in the block 33B. The screen 460 may indicate that the handheld device 40 is searching for new devices to use a resource of using its wireless capabilities. By way of example, the handheld device 40 may scan available networks in search of a broadcast identification protocol message, as may be provided by Bonjour® by Apple Inc.

Figures 33C, 33D:
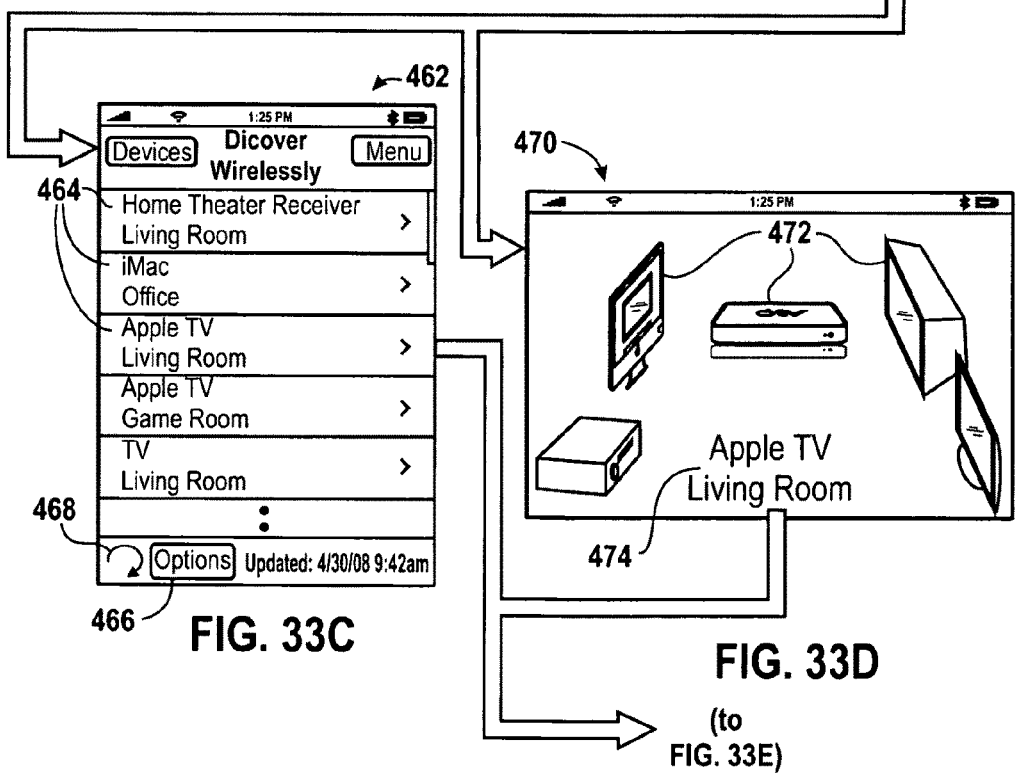
Figure 33E:
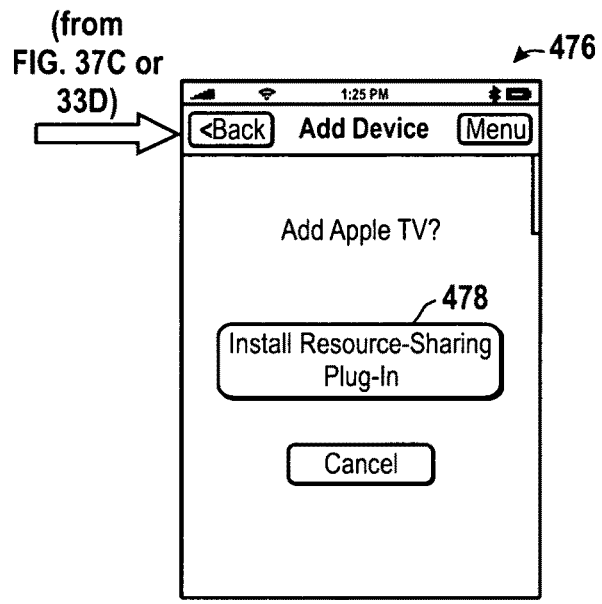

After searching available networks for resource-sharing devices 94, the handheld device 40 may display a screen 462, as illustrated in FIG. 33C. The screen 462 may display list items 464 having text and images related to any resource-sharing devices 94 that may be located over available networks. For example, the list items 464 may include a device name and general location describing where the device may be located. The screen 462 may additionally include a button 466, labeled "Options," which may vary the manner in which the list items 464 are displayed. By way of example, a user may vary the list items 464 such that the devices are listed by proximity, by most recently selected, by newly available, etc. A refresh button 468 may cause the handheld device 40 to search again for resource-sharing devices 94 and display any newly discovered devices.

FIG. 33D illustrates a visually descriptive screen 470 displaying the list items 464 of available resource-sharing devices 94. The screen 470 may be displayed when a user turns the handheld device 40 sideways, causing the accelerometers 38 to register a change in device orientation. The screen 470 may illustrate the list items 464 of available resource-sharing devices 94 in a format such as the Cover Flow format by Apple Inc. The available resource-sharing devices may be displayed visually with a series of descriptive images 472 and the name of a presently displayed device, as shown by text 474. By dragging a finger across the screen, a user may easily flip between devices. Turning the handheld device 40 upright may navigate the user back to the screen 462 of FIG. 33C.

Turning next to FIG. 32E, the handheld device 40 may display a screen 476 when the list item 464 labeled "Apple TV/Living Room" is selected. The screen 476 may prompt the user to add the standalone media player 68 to the list of devices that may share resources by the handheld device 40 with a button 478, labeled "Install Resource-sharing plug-in." As should be appreciated, selecting the button 478 may initiate the attainment and installation of the resource-sharing software plug-in related to the standalone media player 68. The handheld device 40 may obtain and install the resource-sharing software plug-in using the techniques described above.

Figure 34:
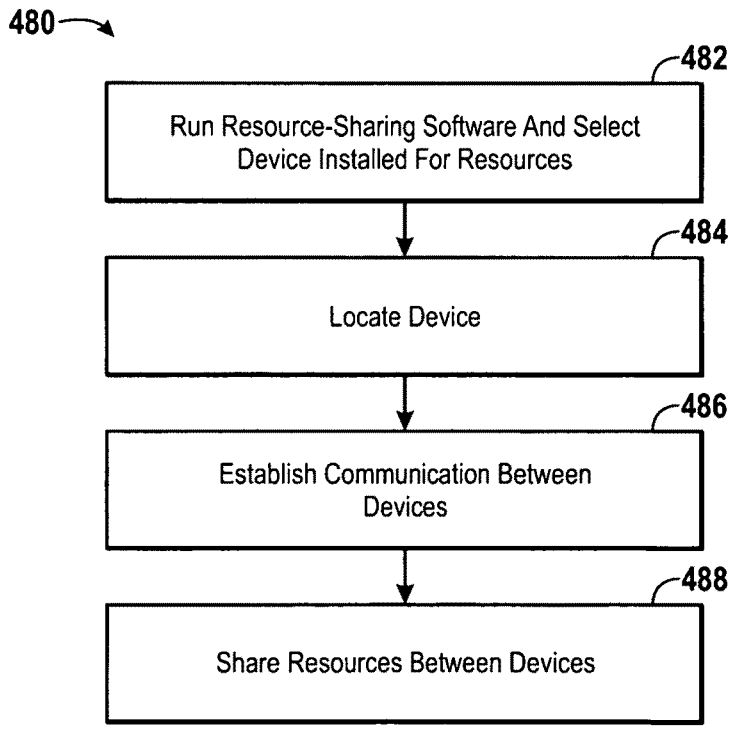
FIG. 34 is a flowchart describing a method of establishing resource-sharing with a resource-sharing electronic device.

FIG. 34 represents a flowchart 480, which may describe a technique for using the resources of a resource-sharing device 94 after an appropriate resource-sharing software plug-in has previously been obtained and installed on the resource-using device 92. In a first step 482, a user may begin to run resource-sharing software running on the resource-using device 92. Specifically, the user may select a particular resource-sharing device 94 from among a list of available devices. In a subsequent step 484, the resource-using device 92 may locate the resource-sharing device 94 over a local network or over the Internet. In step 486, the resource-using device may establish communication with the resource-sharing device 94 over one of the communication channels 90, and in step 488, the resource-using device 92 may begin to use a resource of the resource-sharing device 94.

FIGS. 35A-35E represent screens that may be displayed on the handheld device 40 when the handheld device 40 acts as the resource-using device 92 during step 482 of the flowchart 480 of FIG. 34. Turning first to FIG. 35A, a user may select the resource-sharing software application icon 44 to launch the resource-sharing application. As illustrated in FIG. 35B, the screen 148 may be displayed as a main menu screen for the resource-sharing software application. If a user chooses to select the button 152, labeled "Device List," the user may view a list of stored devices that may share resources from the handheld device 40.

Turning to FIG. 35C, a screen 490 may be displayed on the handheld device 40 when the button 152 is selected. The screen 490 may display various categories of devices that may be installed for resource-sharing on the handheld device 40. A series of category buttons 492 may include, for example, "Entertainment," "Home," "Office," and "Other." Additionally, a user may choose to list the devices by proximity rather than category, as indicated by a button 494 labeled, "List by Proximity." Selecting the button 494 may cause the handheld device 40 to list devices in terms of signal strength, proximity of GPS coordinates, or by the room in which the devices may be located.

By way of example, a user may select the button 492 labeled "Entertainment." The handheld device 40 may thereafter display a screen 496, as illustrated in FIG. 35D. The screen 496 may list various resource-sharing devices 94 associated with the category "Entertainment." The resource-sharing devices 94 may appear as list items 498, and may include various resource-sharing devices 94 that may have previously been installed for resource-sharing by the handheld device 40, in accordance with techniques described above. Alternatively, the handheld device 40 may have been preprogrammed with certain resource-sharing devices 94 without need to add the devices. For example, a manufacturer of a resource-sharing device 94 may purchase the right to pre-install an appropriate resource-sharing software plug-in on the handheld device 40, such that a user may be able to use a resource of the resource-sharing device 94 without first installing the device using the techniques described above.

FIG. 35E illustrates a visually descriptive screen 500 displaying the list items 498 of available resource-sharing devices 94. The screen 500 may be displayed when a user turns the handheld device 40 sideways, causing the accelerometers 38 to register a change in device orientation. The screen 500 may illustrate the list items 498 of available resource-sharing devices 94 in a format such as the Cover Flow format by Apple Inc. The available resource-sharing devices may be displayed visually with a series of descriptive images 502 and the name of a presently displayed device, as shown by text 504. By dragging a finger across the screen, a user may easily flip between devices. Turning the handheld device 40 upright may navigate the user back to the screen 462 of FIG. 35D.

Figure 36:
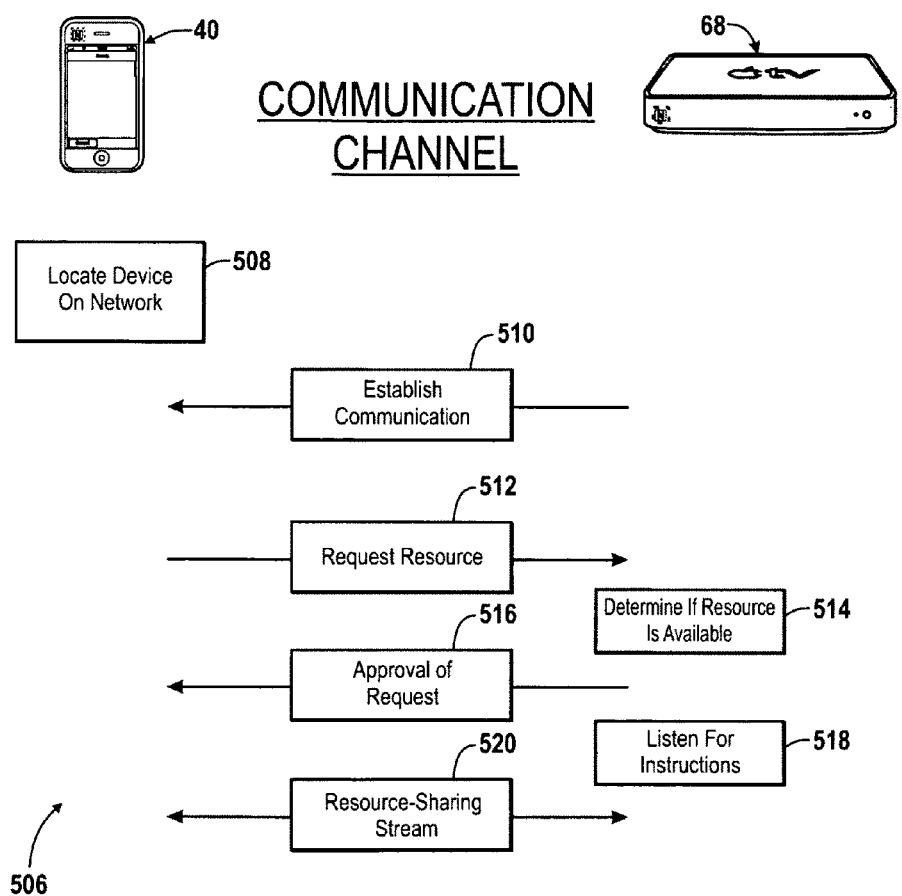
FIG. 36 is a block diagram representing communication that may take place in carrying out the method of the flowchart of FIG. 34.
Figure 37:
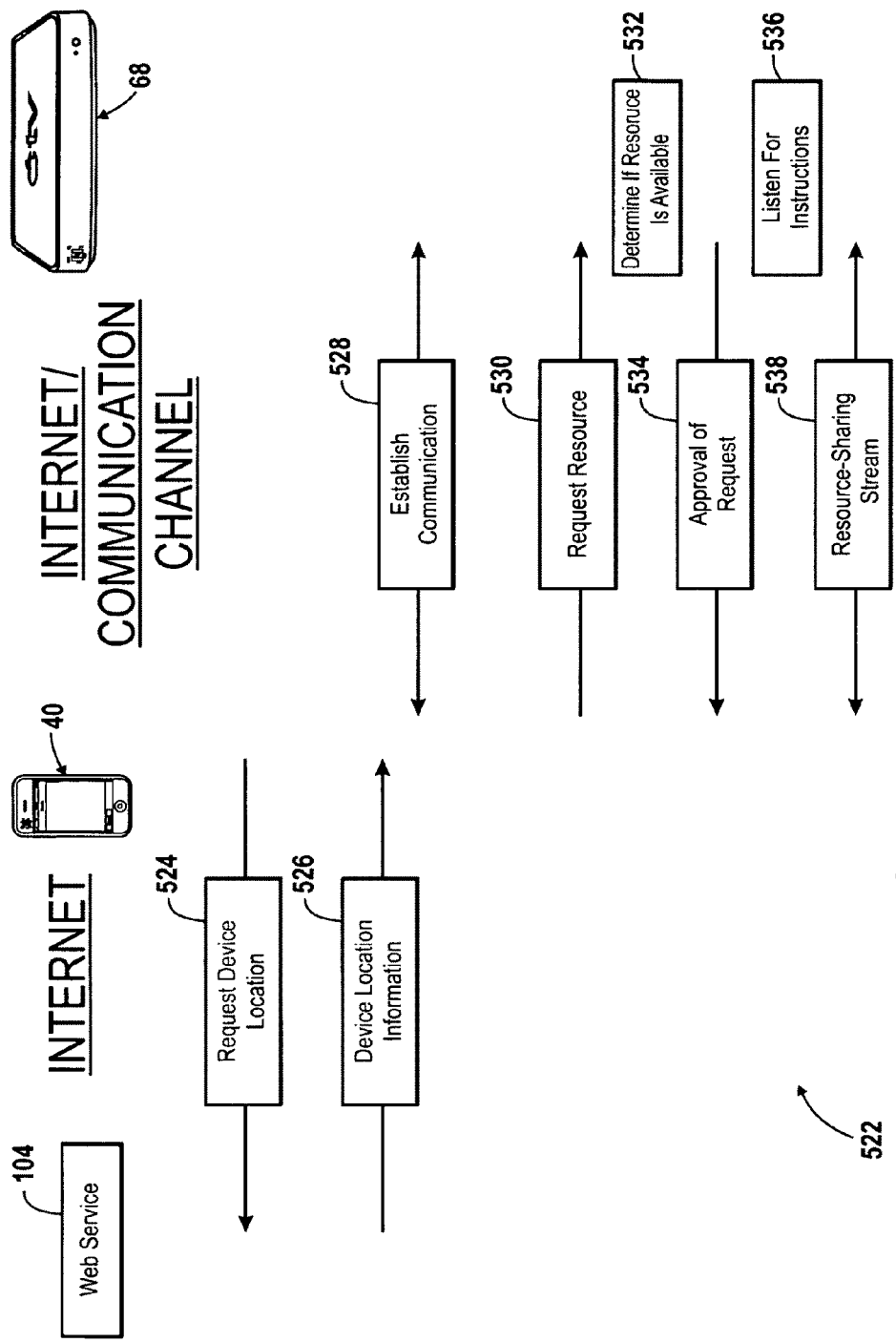
FIG. 37 is a block diagram representing alternative communication that may take place in carrying out the method of the flowchart of FIG. 34.

FIGS. 36-37 illustrate communication that may take place when the user selects the computer 62 as the resource-sharing device 94 from among the list items 498, and may represent steps 484-488 of the flowchart 480 of FIG. 34. Turning first to FIG. 36, a communication diagram 506 may describe communication between the handheld device 40 and the computer 62, which may occur in the manner described above with reference FIG. 26 above. Particularly, blocks 508-520 of the communication diagram 506 of FIG. 36 may correspond with blocks 358-370 of the communication diagram 348 of FIG. 26. Similarly, turning to FIG. 37, a communication diagram 522 may describe communication between the handheld device 40 and the computer 62 that may occur in the manner described with reference to FIG. 27 above. Particularly, blocks 524-538 of the communication diagram 522 of FIG. 37 may correspond with blocks 382-396 of the communication diagram 372 of FIG. 27.

Figure 38:
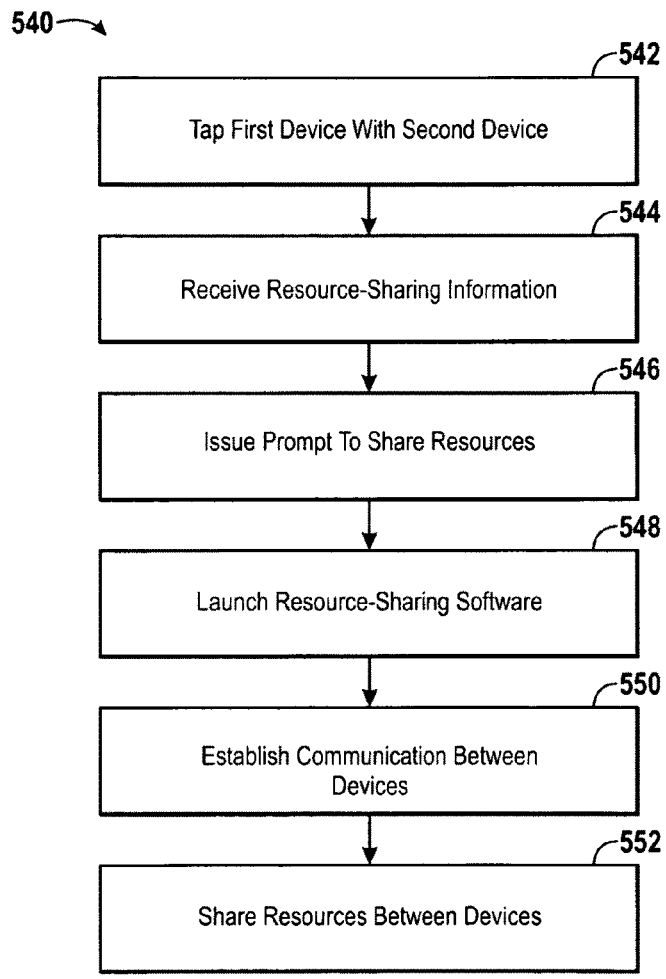
FIG. 38 is a flowchart describing an alternative method of establishing resource-sharing with a resource-sharing electronic device.

Turning to FIG. 38, a flowchart 540 represents another technique for using the resources of an electronic device 10. Particularly, the flowchart 540 of FIG. 38 may describe a technique for using the resources of the resource-sharing device 94 after the resource-sharing software plug-in associated with the resource-sharing device 94 has been installed on the resource-using device 92 using the techniques described above. In a first step 542, the NFC interface 34 of the resource-using device 92 may be tapped to the NFC interface 34 of the resource-sharing device 94.

In step 544, the resource-using device 92 may receive resource-sharing information from the NFC interface 34 of the resource-sharing device 94, in the manner described above with reference to FIG. 20. The resource-using device 92 may thereafter issue a prompt to use a resource of the resource-sharing device 94, as shown in the step 546. The prompt of step 546 may be, for example, the screen 308 of FIG. 21. In step 548, the resource-using device 92 may launch the resource-sharing application on the resource-using device 92. The resource-using device 92 may establish communication with the resource-sharing device 94 in a step 550, and in step 552, the resource-using device 92 may use resources the resource-sharing device 94 by transmitting a resource-sharing screen to the resource-sharing device 94.

Figure 39:
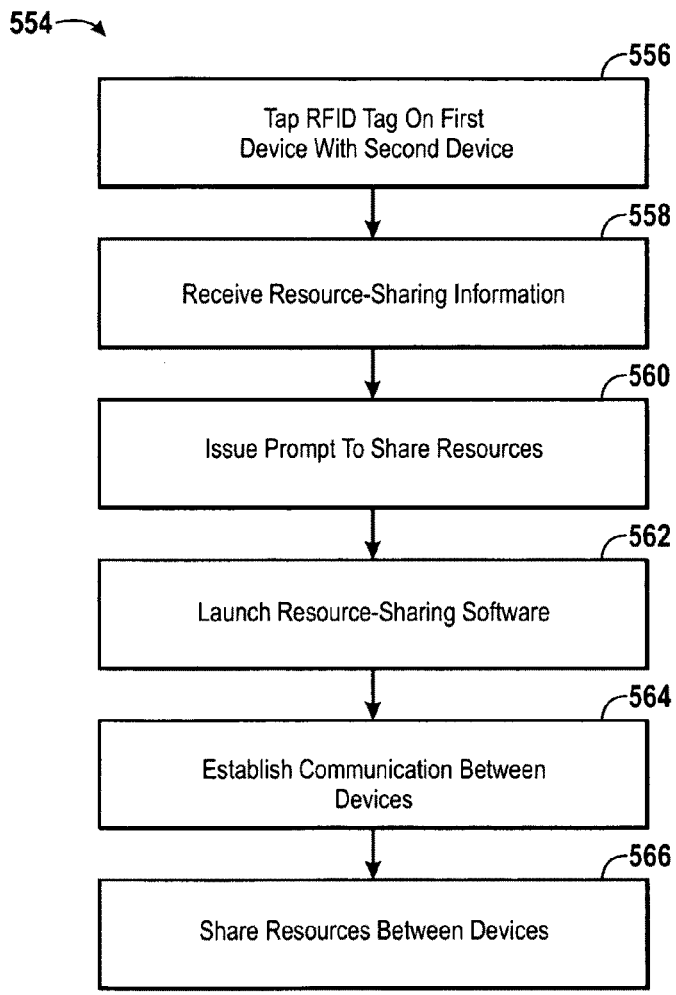
FIG. 39 is a flowchart describing an alternative method of establishing resource-sharing with a resource-sharing electronic device.

Turning to FIG. 39, a flowchart 554 represents an alternative manner of resource sharing among two or more electronic devices 10. Particularly, the flowchart 554 of FIG. 39 may describe a technique for using the resources of the resource-sharing device 94 after the resource-sharing software plug-in associated with the resource-sharing device 94 has been installed on the resource-using device 92 using the techniques described above. In a first step 556, the NFC interface 34 of the resource-using device 92 may be tapped to the RFID tag 118 associated with the resource-sharing device 94.

In step 558, the resource-using device 92 may receive resource-sharing information from the RFID tag 118, in the manner described above with reference to FIG. 25. The resource-using device 92 may thereafter issue a prompt to use a resource of the resource-sharing device 94, as shown in the step 560. The prompt of step 560 may be, for example, the screen 308 of FIG. 21. In step 562, the resource-using device 92 may launch the resource-sharing application on the resource-using device 92. The resource-using device 92 may establish communication with the resource-sharing device 94 in a step 564, and in step 566, the resource-using device 92 may use resources the resource-sharing device 94 by transmitting a resource-sharing screen to the resource-sharing device 94.

Figure 40:
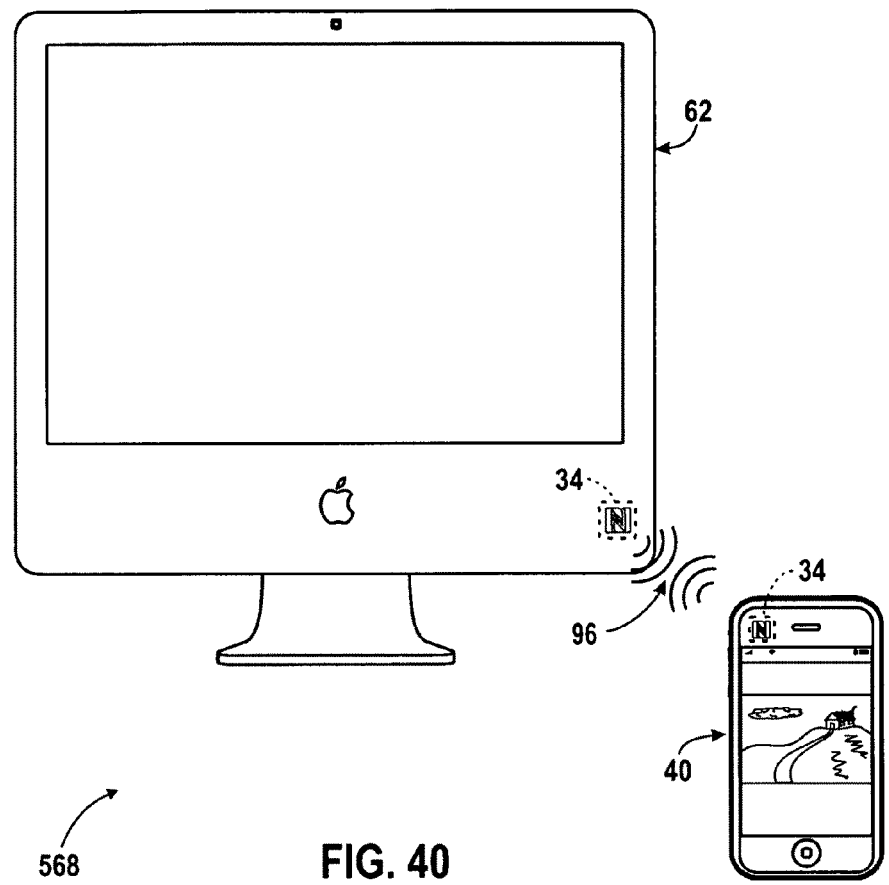
FIG. 40 is a resource-sharing operation for establishing resource-sharing with a resource-sharing electronic device when the resource-sharing electronic device is capable of playing digital media.
Figure 62:
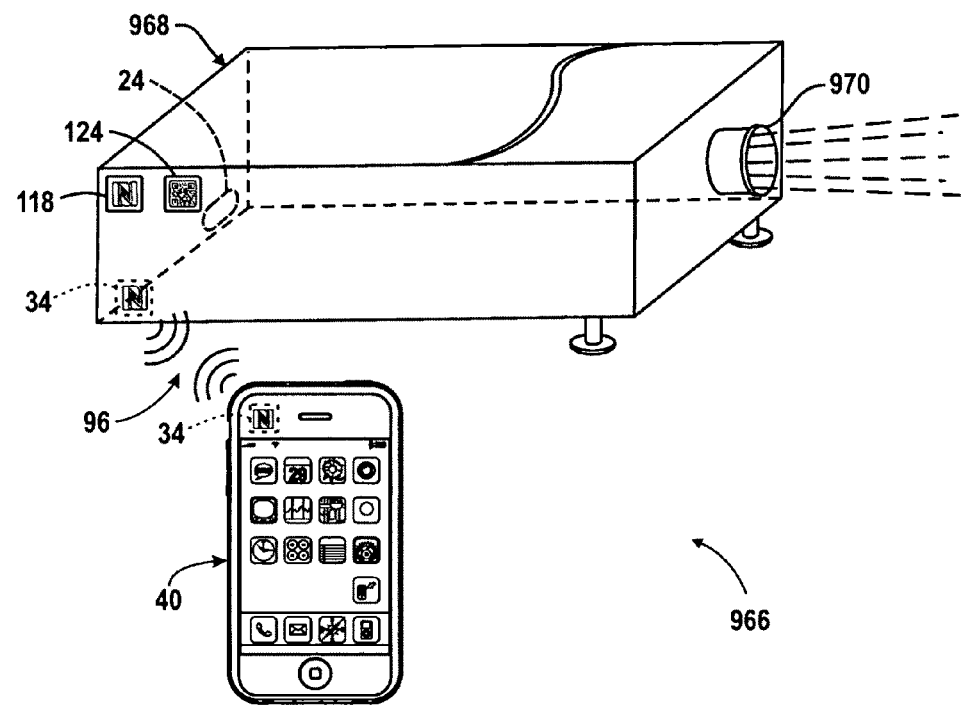
FIG. 62 is a schematic of a resource-sharing operation for establishing resource-sharing with a digital projector.

Using the techniques described above, a variety of different electronic devices 10 may share resources. FIGS. 40-65 illustrate many such examples in greater detail below. Particularly, FIGS. 40-42 illustrate using the above-described techniques for using the resources of various media-playing devices; FIGS. 43-44 and 51-52 illustrate using the above-described techniques for using the resources of a video game system; FIGS. 45-50 and 53-56 illustrate using the above-described techniques for using the resources of various consumer electronic devices frequently found in home theater or entertainment systems; FIGS. 57A-F illustrate using the above-described techniques for using the resources of software on a computer system; FIGS. 58-59 illustrate using the above-described techniques for using the resources of a handheld computer or portable phone such as the handheld device 40; FIGS. 60-61 illustrate using the above-described techniques for using the resources of a printer; FIGS. 62-63 illustrate using the above-described techniques for using the resources of a video projector; and FIGS. 64-65 describe using the above-described techniques for using the resources of a digital camera.

As should be appreciated, specific resource-sharing software plug-ins may be developed for each type of resource-sharing device 94. The specific resource-sharing software plug-ins may include one or more resource-sharing schemes to enable a particular manner of sharing a given resource. By way of example, a resource-sharing scheme for using the resources of a television may enable video information to be sent to and displayed on the display of the television. Thus, a manufacturer of a resource-sharing device 94 or another developer may develop a resource-sharing scheme specific to the resource-sharing device 94, and may include the resource-sharing scheme as part of a resource-sharing software plug-in associated therewith. In this way, the manufacturer or other developer may make resources from the resource-sharing device 94 function as if the resource belonged to the resource-using device 92. Alternatively, the manufacturer or other developer may include a resource-sharing scheme featuring additional functionality. For example, the resource-sharing scheme may enable certain software on the resource-using device 92 to interface with the resources of the resource-sharing device 94 in a novel way. By way of example, if the resource-using device 92 and the resource-sharing device 94 both have an integrated microphone, the resource-sharing scheme may enable both microphones to be used at the same time for stereo recording on the resource-using device 92.

The manufacturer of a resource-sharing device 94 or another developer may provide resource-sharing schemes or resource-sharing software plug-ins associated with the resource-sharing device 94 to the manufacturer of a resource-using device 92, such as the handheld device 40. The resource-sharing schemes or resource-sharing software plug-ins may be preinstalled on the resource-using device 92 or may be located to the web service 104 for distribution at a later time. Due to the availability of the techniques described above, the manufacturer of the resource-sharing device 94 may add marketable functionality to the resource-sharing device 94 and the resource-using device 92.

As discussed above, FIGS. 40-42 illustrate using the above-described techniques for using the resources of various media-playing devices, such as the computer 62 or the standalone media player 68. FIG. 40 depicts a resource-sharing operation 568 between a handheld device 40, representing the resource-using device 92, and a computer 62, representing the resource-sharing device 94. The computer 62 may be include an integrated or attached display 18 that may be available for use as a resource. The handheld device 40 may or may not be running an application which may particularly benefit from using a resource of the computer. As illustrated in the operation 568 of FIG. 40, the handheld device 40 may be running an application, such as a photo viewing application 570, that may particularly benefit by using the video display of the computer 62. Whether a particular application running on the handheld device 40 may benefit from a particular resource of the computer 62 may affect which prompts may be displayed on the handheld device 40 following the operation 568, as described below.

To initiate resource-sharing, a user may tap the NFC interface 34 of the handheld device 40 to the NFC interface 34 of the computer 62, which may cause the NFC communication channel 96 to become established between the two devices. Through the NFC communication channel 96, resource-sharing information may be exchanged, as described above. Accordingly, the handheld device 40 may determine that the computer 62 is capable of sharing resources and may issue a prompt for the user to use a resource of the computer 62.

Figures 41A, 41B:
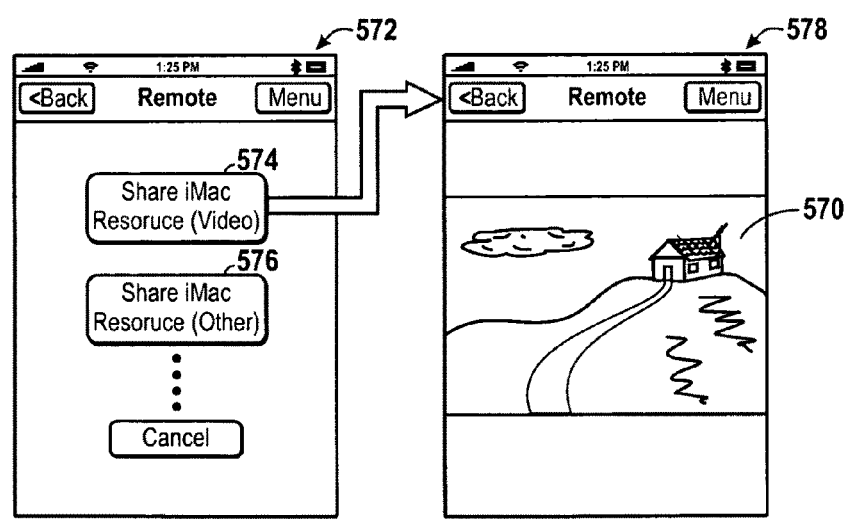
FIGS. 41A-B are schematics of screens that may be displayed following the resource-sharing operation of FIG. 40.
Figure 42:
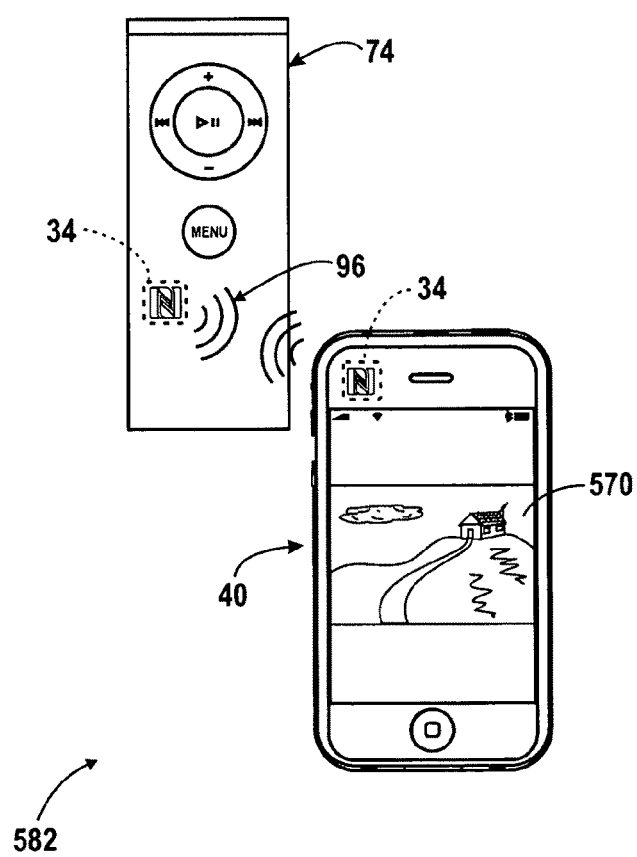
FIG. 42 is a schematic of a resource-sharing operation for establishing resource-sharing with a resource-sharing electronic device.

FIGS. 41A-B represent screens that may be displayed on the handheld device 40 in response to the operation 568 described above. Turning first to FIG. 41A, a screen 572 may represent a prompt that may be displayed when the handheld device 40 is tapped to the NFC interface 34 of the computer 62. The screen 572 may include user selectable buttons 574 and 576, labeled "Share iMac Resources (Video)," and "Share iMac Resources (Other)," respectively. The button 574 may appear first because the handheld device may be currently running an application that would benefit from sharing a video resource of the computer 62, such as the photo viewing application illustrated above in FIG. 40. If the user selects the button 574, a screen 578 may be displayed on the handheld device 40, as shown in FIG. 41B. The screen 578 may represent a screen from the photo viewing application 570, which may take advantages of the video resource of the computer 62 using the techniques described above. Accordingly, photos displayed on the photo viewing application 570 or any other video displayed on the handheld device 40 may displayed on the display 18 of the computer 62.

Turning to FIG. 42, a manner of sharing one or more resources of the standalone media player 68 may be illustrated by a resource-sharing operation 582. In the example of FIG. 42, the handheld device 40 may represent the resource-using device 92 and the standalone media player 68 may represent the resource-sharing device 92. The resource-sharing operation 582 may begin when the handheld device 40 is placed in close proximity to the NFC interface 34 of the remote control 74 associated with the standalone media player 68, which may establish the NFC communication channel 96, over which resource-sharing information may be exchanged in the manners described above. As should be appreciated, when the operation 582 is performed, the handheld device 40 may display a prompt to enable a user to use a resource of the standalone media player 68 according to the techniques described above. Because the handheld device 40 is currently running the photo viewing application 570, as in the operation 568 of FIG. 40 above, the handheld device 40 may primarily prompt the user to use a video resource of the standalone media player 68, as described above with reference to FIGS. 41A-B.

Figure 43:
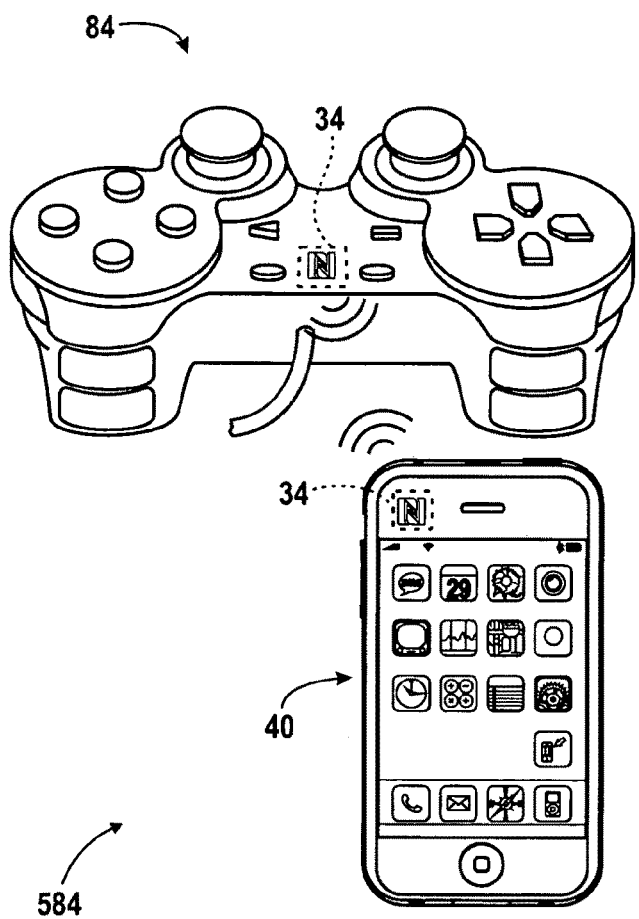
FIG. 43 is a schematic of a resource-sharing operation for using the resources of a video game system.

As noted above, FIGS. 43-44 illustrate using the above-described techniques for using the resources of a video game system. FIG. 43 depicts a resource-sharing operation 384 between a handheld device 40, representing the resource-using device 92, and a game controller 84, representing a controller associated with the resource-sharing device 94, which may be a video game system or the standalone media player 68. The video game system or the standalone media player 68 may be running a video game configured to interact with the handheld device 40.

The game controller 84 may or may not include the NFC interface 34. If the NFC 34 is present, a user may tap the handheld device 40 to the NFC interface 34 of the game controller 84 to create an NFC communication channel 96. Various resource-sharing information may be transferred across the NFC communication channel 96 according to the techniques described above. If the NFC interface 34 is not present, the game controller 84 may include an RFID tag 118 or a matrix barcode 124, either of which may be used by the handheld device 40 to initiate resource-sharing using the techniques described above.

Figures 44A, 44B:
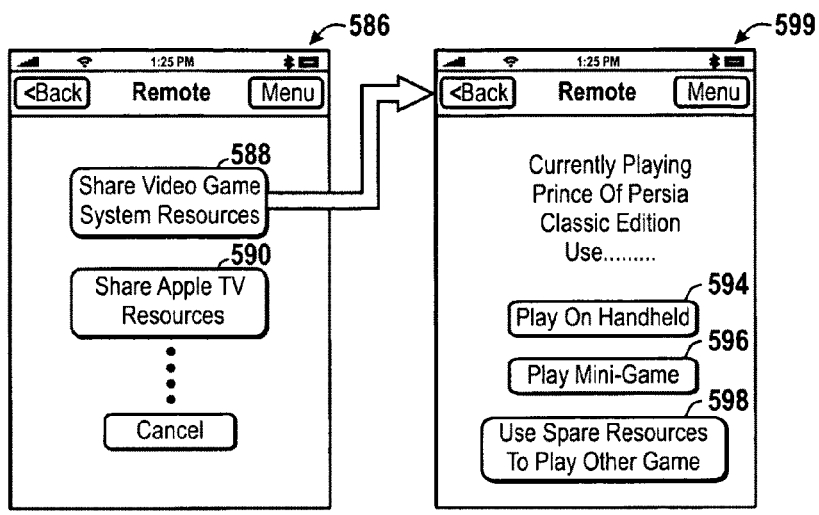
FIGS. 44A-B are schematics of screens that may be displayed for using the resources of a video game system.

FIGS. 44A-C represent screens that may be displayed on the handheld device 40 after the operation 584 of FIG. 43. Turning first to FIG. 44A, a screen 586 may be displayed on the handheld device 40, representing a prompt to use a resource of any devices to which the game controller 84 pertains. For example, a button 588, labeled "Share Video Game System Resources," may allow a user to use a resource of a video game system to which the video game controller 84 pertains. Alternatively, the video game controller 84 may also be used to use a resource of the standalone media player 68. Thus, a button 590, labeled "Share Apple TV Resources" may allow a user to use a resource of the standalone media player 68 using the techniques described above.

By selecting the button 588, a user may navigate to a screen 592, as illustrated in FIG. 44B. The screen 592 may generally indicate what game is being played on the video game system, and may provide various actions for using the handheld device 40 to use a resource of the game. For example, a button 594, labeled "Play on Handheld," may allow a user play the game from the handheld device 40, whereby the video game system may host the game and supply the necessary computing power for the game. A button 596, labeled "Play Mini-Game," may allow user to play a mini-game on the handheld device that may be associated with a game running on the video game system. A button 598, labeled "Use Spare Resources to Play Other Games," may allow a user to use excess computing power from the video game system to play a different game than may be playing on the video game system.

Figure 45:
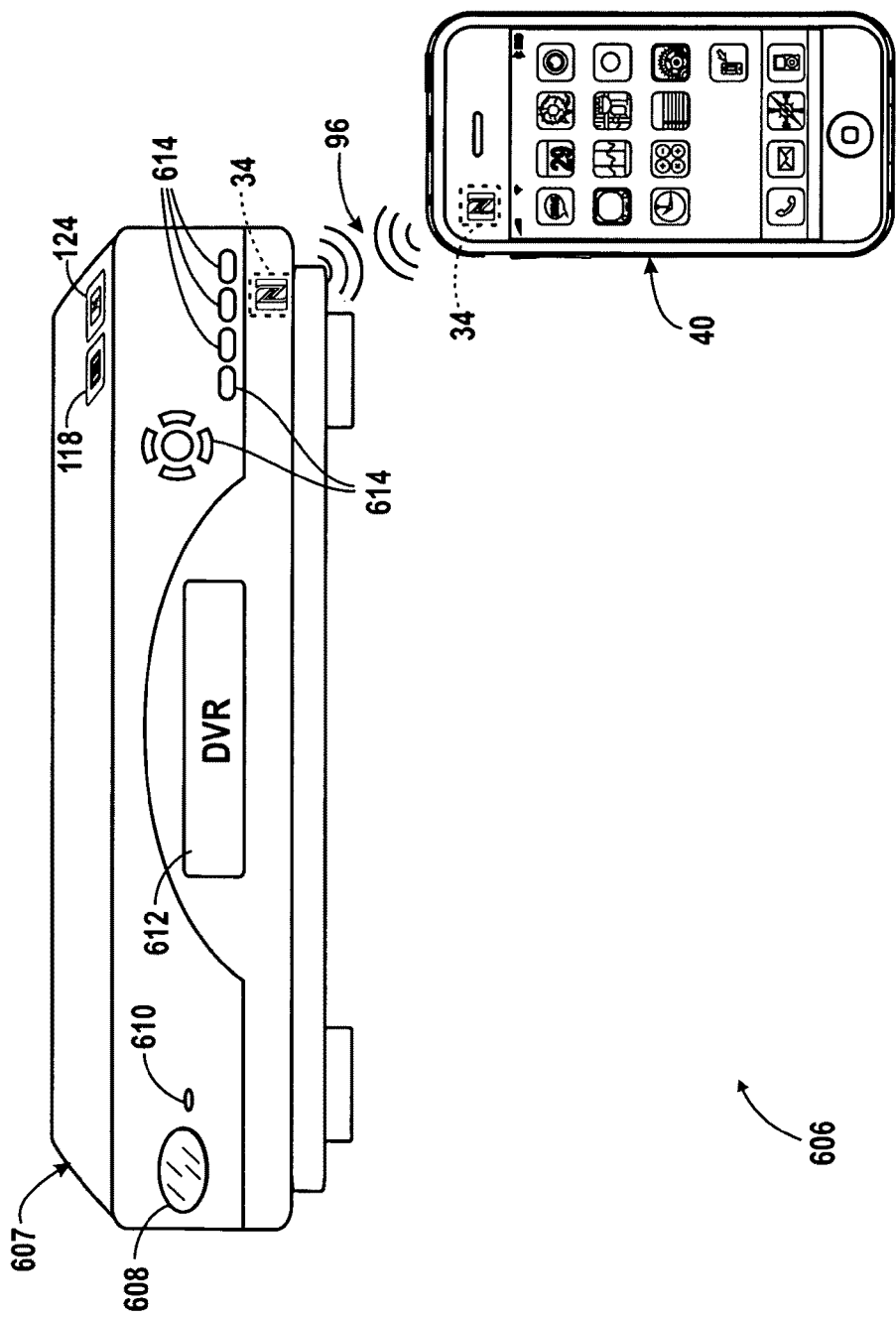
FIG. 45 is a schematic of a resource-sharing operation for establishing resource-sharing with a digital video recorder (DVR)

FIG. 45 illustrates a resource-sharing operation 606 between a handheld device 40 and a digital video recorder (DVR) 607. The DVR 607 may represent an embodiment of the electronic device 10, which may output video information to an analog or digital television. By way of example, the DVR 607 may represent a DVR by Motorola or Scientific Atlanta configured to provide resource-sharing information to and/or to share resources with another electronic device 10, such as the handheld device 40. Internal components of the DVR 607, such as non-volatile storage 16, may store digital video recordings of television programs, which may be replayed on the analog or digital television. As should be appreciated, the DVR 607 may be capable of interfacing with another electronic device 10, such as the handheld device 40, through such means as the infrared interface 25 or the network interfaces 26.

As indicated in FIG. 45, a button 608 may represent an on/off switch, and an indicator light 610 may indicate whether the DVR 607 is on or off, or recording or not recording. A display screen 612 may represent, for example, an LCD screen to provide indications of time, channel, or other related information. Various input buttons 614 may enable a user to change the channel, record a television program, or navigate a menu, for example. The DVR 607 may or may include the NFC interface 34. As should be appreciated, the NFC interface 34 may provide resource-sharing information to another electronic device 10 having an NFC interface 34. If the NFC interface 34 is not present, an RFID tag 118 or matrix barcode tag 124 may be located on or associated with the DVR 607. Using the techniques described above, the RFID tag 118 or the matrix barcode tag 124 may enable a user of another electronic device 10, such as the handheld device 40, to obtain resource-sharing information associated with the DVR 607.

With continued reference to FIG. 45, in the resource-sharing operation 606, a user may tap the handheld device 40 or another resource-using device 92 against the NFC interface 34 of the DVR 607. Tapping the NFC interfaces 34 together may cause the NFC communication channel 96 to become established between the two devices. Through the NFC communication channel 96, resource-sharing information may be exchanged in the manner described above. Accordingly, the handheld device 40 may determine that the DVR 607 may share resources and may issue a prompt for the user to initiate resource-sharing.

FIGS. 46A-C represent screens that may be displayed on the handheld device 40 following the operation 606 above. Turning first to FIG. 46A, a screen 616 may represent a prompt that may be displayed on the handheld device 40, providing a button 618 labeled, "Share DVR Resources." The screen 616 may thus prompt the user to launch the resource-sharing application for the purpose of sharing one or more resources of the DVR 607. It should be appreciated that the screens of FIGS. 47A-C presume that the DVR 607 has already been added as a device that may share resources from the handheld device 40, according to the techniques described above.

Turning to FIG. 46B, a screen 620 may be displayed on the handheld device 40 when the button 618, labeled "Share DVR Resources," is selected by the user. The screen 620 may include a variety of user-selectable buttons, each of which may enable the user to use a resource of the DVR 607 using a specific resource-sharing scheme. It should be appreciated that the resource-sharing schemes may be provided by the manufacturer of the DVR 607 in the manner described above. Particularly, the manufacturer or an associated developer may provide in the resource-sharing software plug-in an appropriate manner of enabling the user to use various resources of the DVR 607, as illustrated by a series of buttons 622-628.

The button 622, labeled "Watch on Handheld," may allow a user watch a recorded program from the DVR 607 on the handheld device. The button 624, labeled "Send to Other Device," may allow a user to transfer a resource of the DVR 607 to a resource of another device. A button 626, labeled "Select Other Stored Media," may enable a user to select stored media other than the media currently playing on the DVR 607. A button 628, labeled "Upload Media to DVR," may allow a user to upload media from another device or from the handheld device 40 to the DVR 607. A button 630, labeled "Options," may allow a user to vary certain options, such as whether to use a particular resource-sharing scheme provided by the manufacturer of the DVR 607 or by other developers, as well as whether to automatically update the resource-sharing software plug-in. Among other options available via the button 630 may be a preferred scheme which may be automatically loaded when the button 618 is selected or when the resource-sharing operation 606 is undertaken.

FIG. 46C represents a screen 632 that may be displayed when a user selects, for example, the button 624 labeled "Send to Other Device." The screen 632 may thus enable a user to send components of the recorded program currently playing, which may be a video component and an audio component, to other available resources of other resource-sharing devices 94. As illustrated in the screen 632, a drop-down menu 634 may enable a user to select a previously added resource-sharing device 94 to receive a stream of video data from the DVR 607. Similarly, a drop-down menu 636 may enable the user to select a previously added resource-sharing device 94 to receive a stream of audio data from the DVR 607. When the user has determined where the components of the DVR 607 resource may be sent, the user may save the settings by selecting a button 638, labeled "Save." If the handheld device 40 is capable of controlling the DVR 607, the user may select a button 640, labeled "Control DVR," to control the DVR 607.

Figure 47:
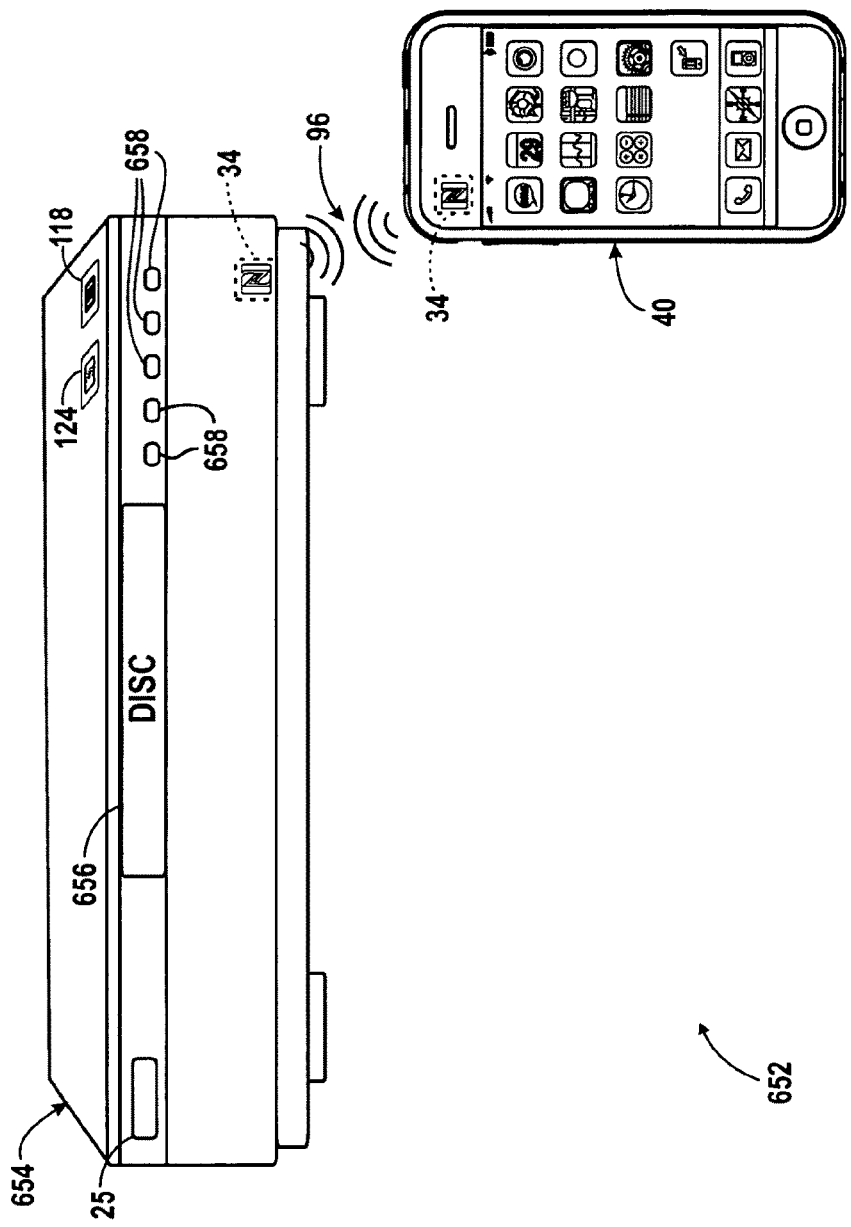
FIG. 47 is a schematic of a resource-sharing operation for establishing resource-sharing with an optical disc player.

FIGS. 47-48 relate to using a resource of an optical disc player from another electronic device 10 such as the handheld device 40. Turning first to FIG. 47, a resource-sharing operation 652 may take place between the handheld device 40 and an optical disc player 654, which may represent an embodiment of the electronic device 10 of FIG. 1. The optical disc player 654 may include an optical disc drive 656, which may be configured to read optical discs such as digital video discs (DVD) or Blu-Ray® discs, and may output the video obtained from the optical disc drive 656 to an analog or digital television or other display. Status indicator lights 658 may appear on the face of the optical disc player 654 to indicate, for example, whether the device is on or off or responding to a resource-sharing stream from a resource-using device 92. As should be appreciated, the optical disc player 654 may be capable of interfacing with another electronic device 10, such as the handheld device 40, through such means as the infrared interface 25 or the network interfaces 26.

The optical disc player 654 may or may not include the NFC interface 34. If the NFC 34 is present, a user may tap the handheld device 40 to the NFC interface 34 of the optical disc player 654 to create an NFC communication channel 96. Various resource-sharing information may be transferred across the NFC communication channel 96 according to the techniques described above. If the NFC interface 34 is not present, the optical disc player 654 may include an RFID tag 118 or a matrix barcode 124, either of which may be used by the handheld device 40 to initiate resource-sharing using the techniques described above.

Figures 48A, 48B:
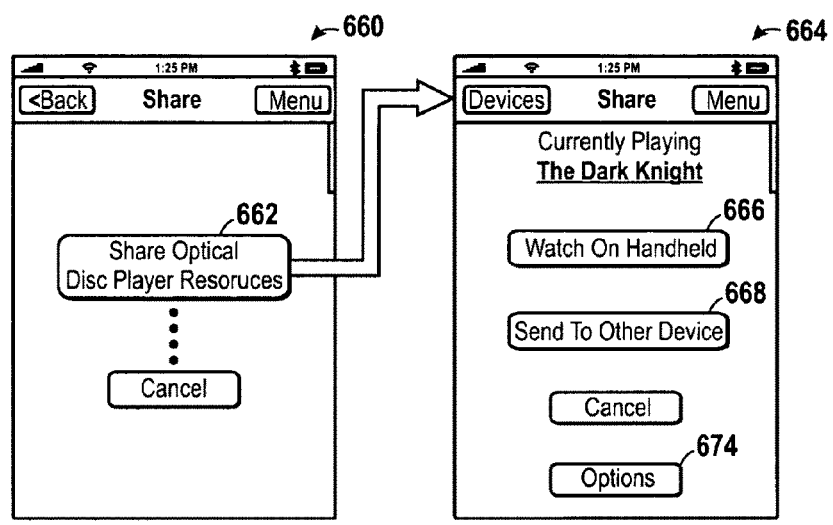
FIGS. 48A-B are schematics of screens that may be displayed for using the resources of the optical disc player.

FIGS. 48A-B represent screens that may be displayed on the handheld device 40 following the operation 652 above. Turning first to FIG. 48A, a screen 660 may represent a prompt that may be displayed on the handheld device 40, providing a button 662 labeled, "Share Optical Disc Player Resources." The screen 660 may thus prompt the user to launch the resource-sharing application for the purpose of sharing one or more resources of the optical disc player 654. It should be appreciated that the screens of FIGS. 48A-B presume that the optical disc player 654 has already been added as a device that may share resources from the handheld device 40, according to the techniques described above.

Turning to FIG. 48B, a screen 664 may be displayed on the handheld device 40 when the button 662, labeled "Share Optical Disc Player Resources," is selected by the user. The screen 664 may include a variety of user-selectable buttons, each of which may enable the user to use a resource of the optical disc player 654 using a specific resource-sharing scheme. The variety of user-selectable buttons of the screen 664 may enable the user to use a resource of the optical disc player 654 in much the same manner as the DVR 607. Particularly, a button 666, labeled "Watch on Handheld," may allow a user to watch a video played on the optical disc player 654 from the handheld device. A button 668, labeled "Send to Other Device," may allow a user to transfer a resource of the optical disc player 654 to a resource of another device in the manner described above with reference to FIG. 46C. A button 674, labeled "Options," may allow a user to vary certain options, such as whether to use a particular resource-sharing scheme provided by the manufacturer of the optical disc player 654 or by other developers, as well as whether to automatically update the resource-sharing software plug-in. Among other options available via the button 674 may be a preferred scheme which may be automatically loaded when the button 662 is selected or when the resource-sharing operation 652 is undertaken.

Figure 49:
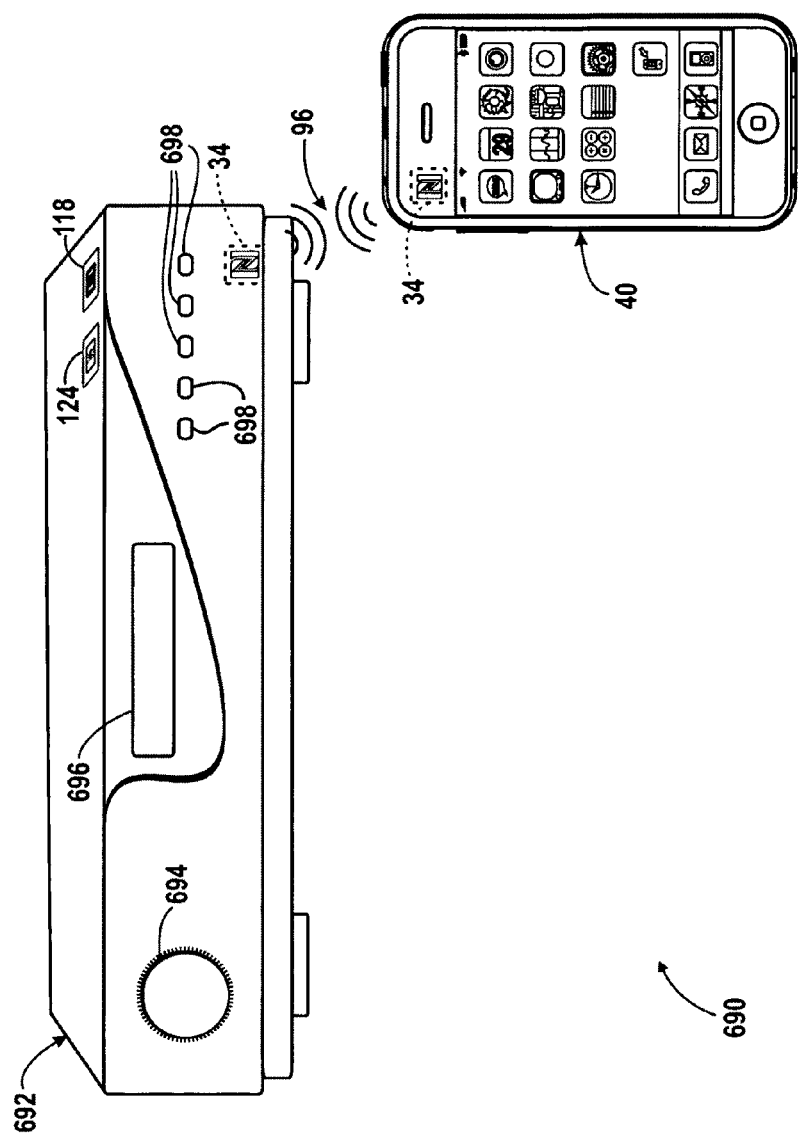
FIG. 49 is a schematic of a resource-sharing operation for establishing resource-sharing with a satellite television or cable television receiver.

FIGS. 49-50 relate to using resources of a cable or satellite TV receiver from another electronic device 10, such as the handheld device 40. Turning first to FIG. 49, a resource-sharing operation 690 may take place between the handheld device 40 and a cable or satellite TV receiver 692, which may represent an embodiment of the electronic device 10 of FIG. 1. The cable or satellite TV receiver 692 may include internal circuitry configured to decode a cable or satellite TV signal, and may output the audiovisual data obtained from the decoded signal to an analog or digital television or other display. A digital dial 694, display screen 696, and/or user-selectable buttons 698 may appear on the face of the cable or satellite TV receiver 692 to indicate, for example, whether the device is on or off or responding to a resource-sharing stream from a resource-using device 92 and to enable the user to manually select a channel, volume, menu, or other capabilities of the cable or satellite TV receiver 692. As should be appreciated, the cable or satellite TV receiver 692 may be capable of interfacing with another electronic device 10, such as the handheld device 40, through such means as the infrared interface 25 or the network interfaces 26.

The cable or satellite TV receiver 692 may or may not include the NFC interface 34. If the NFC 34 is present, a user may tap the handheld device 40 to the NFC interface 34 of the cable or satellite TV receiver 692 to create an NFC communication channel 96. Various resource-sharing information may be transferred across the NFC communication channel 96 according to the techniques described above. If the NFC interface 34 is not present, the cable or satellite TV receiver 692 may include an RFID tag 118 or a matrix barcode tag 124, either of which may be used by the handheld device 40 to initiate resource-sharing using the techniques described above.

Figures 50A, 50B:
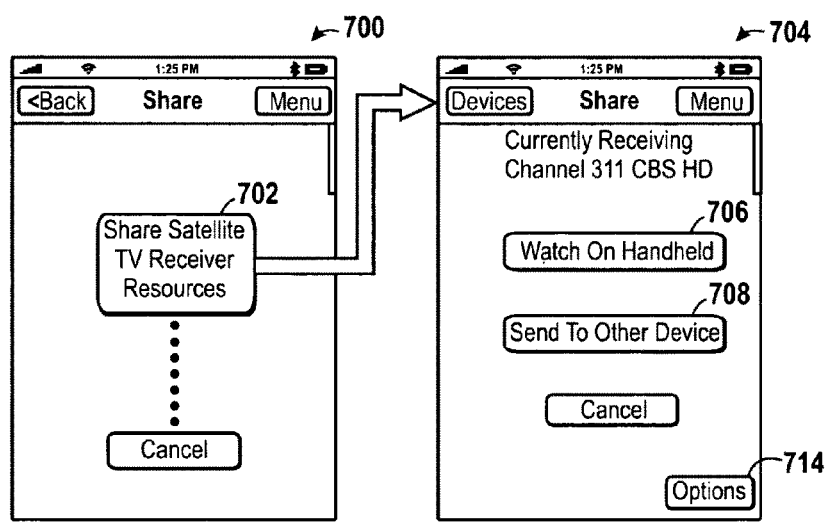
FIGS. 50A-B are schematic of screens that may be displayed for using the resources of the satellite television or cable television receiver of FIG. 49.

FIGS. 50A-B represent screens that may be displayed on the handheld device 40 following the operation 690 above. Turning first to FIG. 51A, a screen 700 may represent a prompt that may be displayed on the handheld device 40, providing a button 702 labeled, "Share Satellite Receiver Resources." The screen 700 may thus prompt the user to launch the resource-sharing application for the purpose of using one or more resources of the cable or satellite TV receiver 692. It should be appreciated that the screens of FIGS. 50A-B presume that the cable or satellite TV receiver 692 has already been added as a device that may share resources from the handheld device 40, according to the techniques described above.

Turning to FIG. 50B, a screen 704 may be displayed on the handheld device 40 when the button 702, labeled "Share Satellite Receiver Resources," is selected by the user. The screen 704 may include a variety of user-selectable buttons, each of which may enable the user to use a resource of the cable or satellite TV receiver 692 using a specific resource-sharing scheme. The variety of user-selectable buttons of the screen 704 may enable the user to use a resource of the cable or satellite TV receiver 692 in much the same manner as the DVR 607. Particularly, a button 706, labeled "Watch on Handheld," may allow a user watch television decoded by the cable or satellite TV receiver 692 from the handheld device 40. A button 708, labeled "Send to Other Device," may allow a user to transfer a resource of the cable or satellite TV receiver 692 to a resource of another device in the manner described above with reference to FIG. 46C. A button 714, labeled "Options," may allow a user to vary certain options, such as whether to use a particular resource-sharing scheme provided by the manufacturer of the cable or satellite TV receiver 692 or by other developers, as well as whether to automatically update the resource-sharing software plug-in. Among other options available via the button 714 may be a preferred scheme which may be automatically loaded when the button 702 is selected or when the resource-sharing operation 690 is undertaken.

Figure 51:
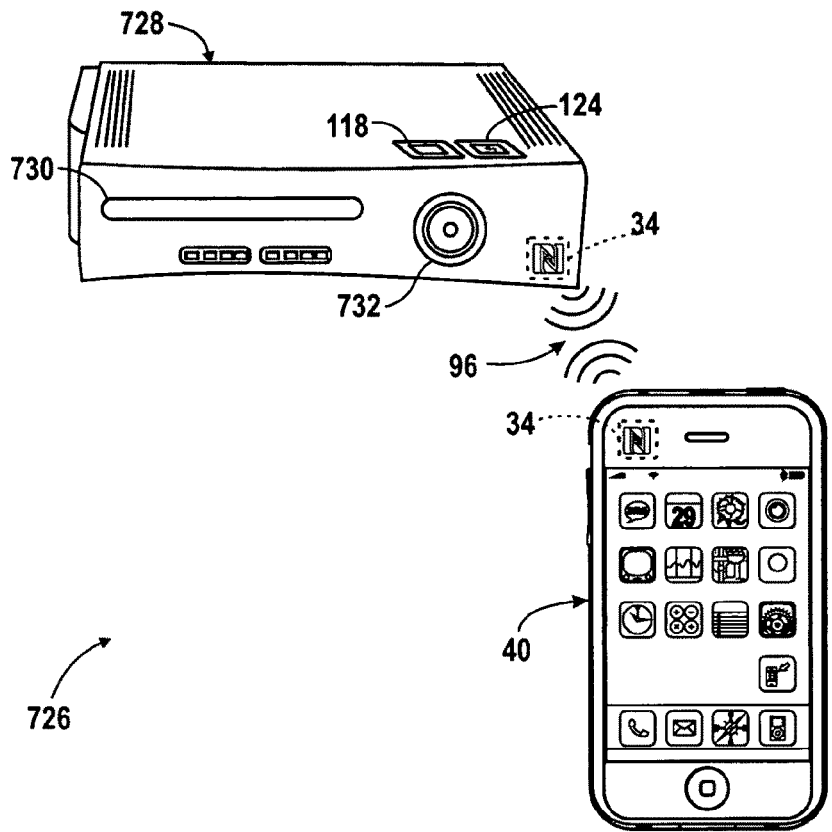
FIG. 51 is a schematic of a resource-sharing operation for establishing resource-sharing with a video game system.
Figure 52:
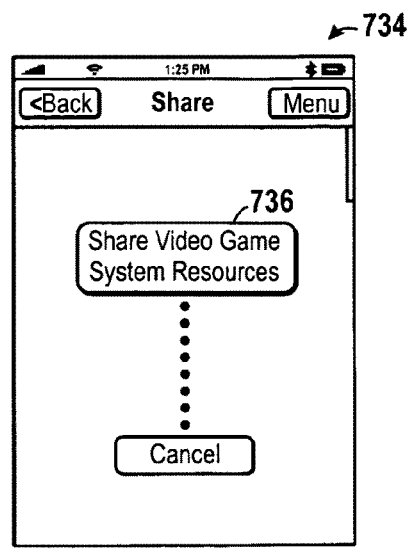
FIG. 52 is a schematic of a screen that may be displayed for using the resources of the video game system of FIG. 51.

FIGS. 51-52 relate to using a resource of a video game system from another electronic device 10, such as the handheld device 40. Turning first to FIG. 51, a resource-sharing operation 726 may take place between the handheld device 40 and a video game system 728, which may represent an embodiment of the electronic device 10 of FIG. 1. By way of example, the video game system 728 may be a PlayStation 3 by Sony or an Xbox360 by Microsoft configured to provide resource-sharing information to and/or to share resources with another electronic device 10 according to the techniques described herein. The video game system 728 may include an optical disc drive 730, which may be configured to read optical discs such as digital video discs (DVD) or Blu-ray® discs storing video game software, and may process and output the data obtained from the optical disc drive 656 to an analog or digital television or other display. Status indicator lights 732 may appear on the face of the video game system 728 to indicate, for example, whether the device is on or off or responding to a resource-sharing stream from a resource-using device 92. As should be appreciated, the video game system 728 may be capable of interfacing with another electronic device 10, such as the handheld device 40, through such means as the infrared interface 25 or the network interfaces 26.

The video game system 728 may or may not include the NFC interface 34. If the NFC interface 34 is present, a user may tap the handheld device 40 to the NFC interface 34 of the video game system 728 to create an NFC communication channel 96. Various resource-sharing information may be transferred across the NFC communication channel 96 according to the techniques described above. If the NFC interface 34 is not present, the video game system 728 may include an RFID tag 118 or a matrix barcode tag 124, either of which may be used by the handheld device 40 to initiate resource-sharing using the techniques described above.

FIG. 52 represents a screen 734 that may be displayed on the handheld device 40 following the operation 726 above. The screen 734 may represent a prompt that may be displayed on the handheld device 40, providing a button 736 labeled, "Share Video-Game System Resources." The screen 734 may thus prompt the user to launch the resource-sharing application for the purpose of sharing one or more resources of the video game system 728. Accordingly, it should be understood that the resource-sharing schemes described above with reference to FIGS. 44A-B may be employed following the selection of the button 736.

Figure 53:
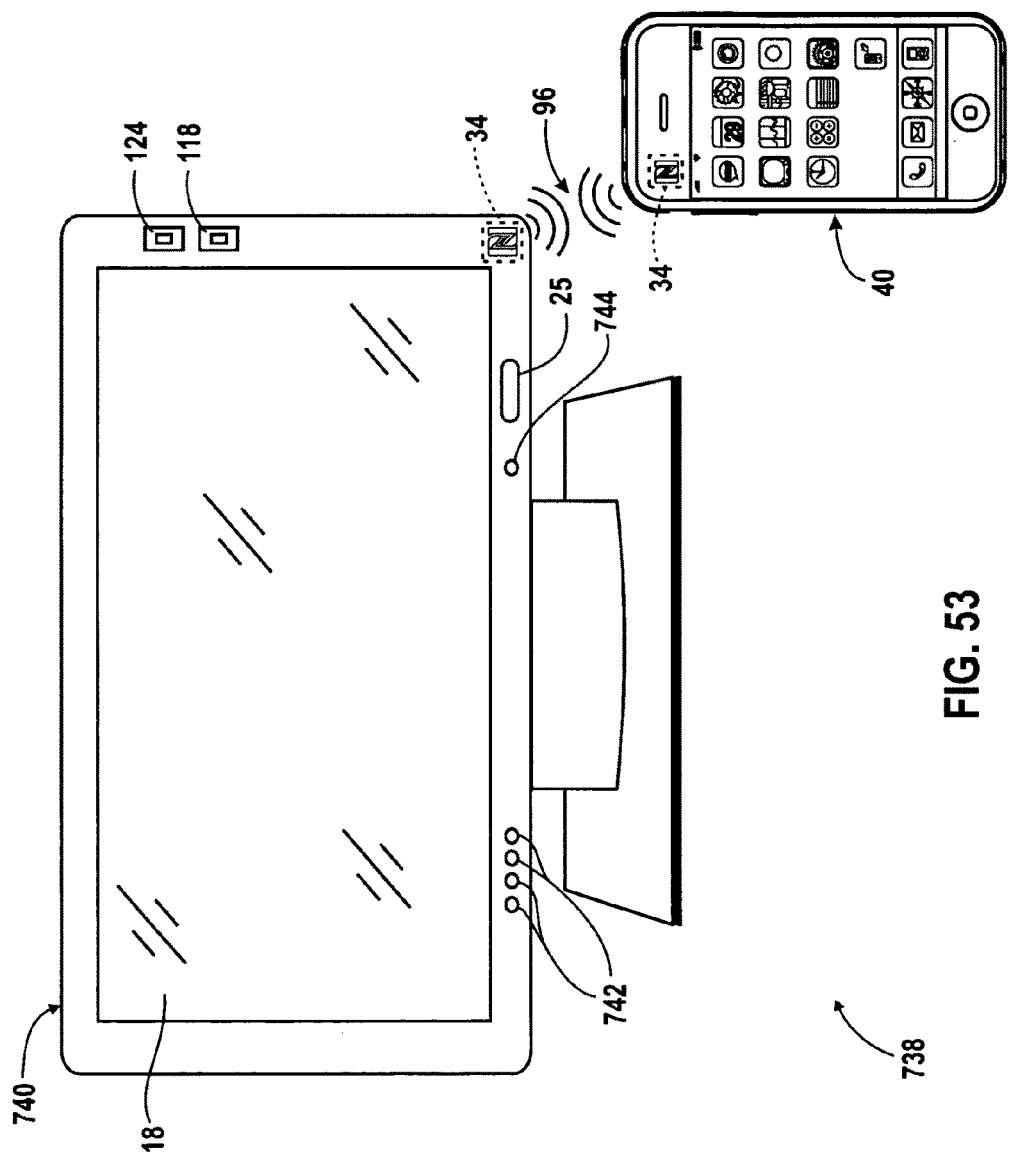
FIG. 53 is a resource-sharing operation for establishing resource-sharing with a television.

FIGS. 53-54 relate to using resources of a digital or analog television from another electronic device 10, such as the handheld device 40. Turning first to FIG. 53, a resource-sharing operation 738 may take place between the handheld device 40 and a digital television 740, which may represent an embodiment of the electronic device 10 of FIG. 1. The digital television 740 may include internal circuitry configured to decode a cable or satellite TV signal or a digital broadcast signal, and may output the audiovisual data obtained from the decoded signal to a display 18. A series of user-selectable buttons 742 and/or an indicator light 744 may appear on the face of the digital television 740 to indicate, for example, whether the device is on or off or responding to a resource-sharing stream from a resource-using device 92, as well as to enable the user to select a channel, volume, menu, or other capabilities of the digital television 740. As should be appreciated, the digital television 740 may be capable of interfacing with another electronic device 10, such as the handheld device 40, through such means as the infrared interface 25 or the network interfaces 26.

The digital television 740 may or may not include the NFC interface 34. If the NFC 34 is present, a user may tap the handheld device 40 to the NFC interface 34 of the digital television 740 to create an NFC communication channel 96. Various resource-sharing information may be transferred across the NFC communication channel 96 according to the techniques described above. If the NFC interface 34 is not present, the digital television 740 may include an RFID tag 118 or a matrix barcode tag 124, either of which may be used by the handheld device 40 to initiate resource-sharing using the techniques described above.

Figures 54E, 54F:
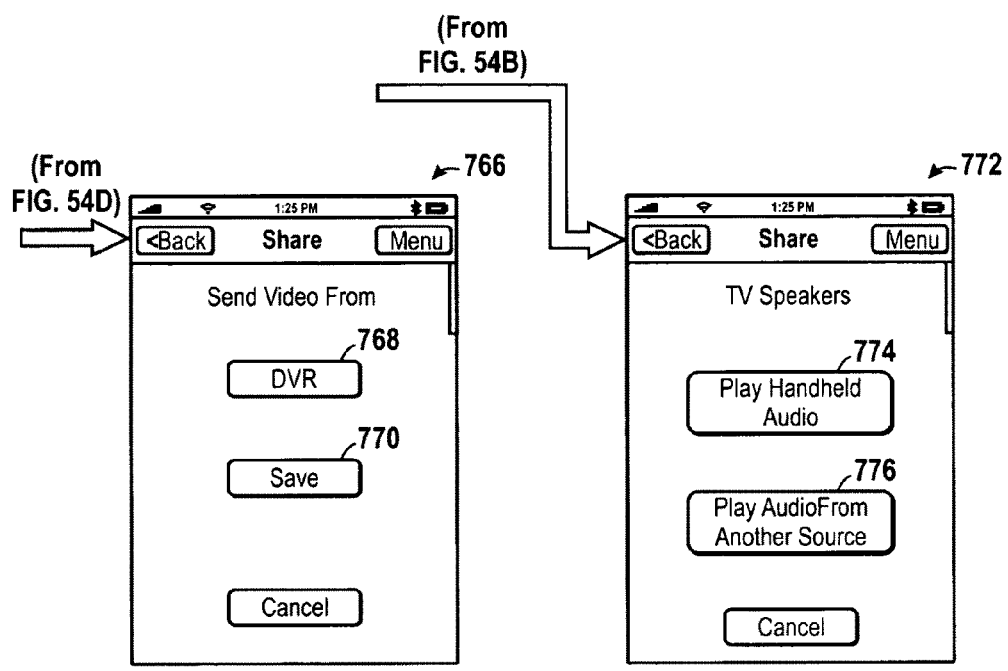

FIGS. 54A-F represent screens that may be displayed on the handheld device 40 following the operation 738 above. Turning first to FIG. 54A, a screen 746 may represent a prompt that may be displayed on the handheld device 40, providing a button 748 labeled, "Share TV Resources." The screen 746 may thus prompt the user to launch the resource-sharing application for the purpose of using one or more resources of the digital television 740. It should be appreciated that the screens of FIGS. 54A-F presume that the digital television 740 has already been added as a device that may share resources from the handheld device 40, in accordance with techniques described above.

Turning to FIG. 54B, a screen 750 may be displayed on the handheld device 40 when the button 748, labeled "Share TV Resources," is selected by the user. The screen 750 may include a variety of list items 752, each of which may enable the user to use a resource of the digital television 740 using a specific resource-sharing scheme. By way of example, such resources that may be available to share on the digital television 740 may include a content stream of television programming, a television display or monitor, or television speakers.

By selecting the list item 752 labeled "Television Programming," the user may make use of a resource of decoded television signals from the digital television 740, and the handheld device 40 may display a screen 754, as illustrated in FIG. 54C. To use the stream of television programming, the screen 754 may include a button 756, labeled "Watch on Handheld," and a button 758, labeled "Send to Other Device." Selecting the button 756 may enable the user to watch the stream of television programming from the handheld device 40. Selecting the button 758 may enable a user to specify to which resource-sharing devices 94 the components of the stream of television programming may be sent, as described above with reference to FIG. 46C.

FIG. 54D represents a screen 760 that may be displayed when a user selects the list item 752 labeled "TV Monitor." Accordingly, the screen 760 may represent a resource-sharing scheme to enable the use of the display 18 of the television by the handheld device 40. A button 762, labeled "Display Handheld Video," may enable video currently displayed on the handheld device 40 to be displayed on the display 18 of the digital television 740. A button 764, labeled "Display Video From Another Source," may enable video from another source to be sent to the display 18 of the digital television 740. Thus, by selecting the button 764, the handheld device 40 may display a screen 766, as illustrated in FIG. 54E. A drop-down menu 768 may enable a user to select a resource-sharing device 94 having as an available resource a video stream (e.g., the DVR 607) to send to the display 18 of the digital television 740. A button 770 may enable the user to save the selected settings.

By selecting the list item 752 labeled "TV Speakers," the user may make use of speakers on the the digital television 740 from the handheld device 40. Accordingly, the handheld device 40 may display a screen 772, as illustrated in FIG. 54F. A button 762, labeled "Play Handheld Audio," may enable audio currently playing on the handheld device 40 to be played on the speakers of the digital television 740. A button 764, labeled "Play Audio From Another Source," may enable audio from another source to be sent to the display 18 of the digital television 740. Selecting the button 764 may enable the user to select a resource-sharing device 94 having as an available resource an audio stream in the manner described above with reference to FIG. 54E.

FIGS. 55-56 relate to using one or more resources of a home theater receiver from another electronic device 10, such as the handheld device 40. Turning first to FIG. 55, a resource-sharing operation 784 may take place between the handheld device 40 and home theater receiver 786, which may represent an embodiment of the electronic device 10 of FIG. 1. The home theater receiver 786 may include internal circuitry configured to receive audiovisual signals from home theater devices, such as the DVR 607, the optical disc player 654, the cable or satellite TV receiver 692, the video game system 728, or the digital television 740. The audiovisual signals may be subsequently processed and output to speakers and/or a display device, such as the digital television 740. A hardware power button 788 may enable the home theater receiver 786 to be switched on or off in hardware, and a display screen 790 may indicate, for example, whether the device is on or off or responding to a resource-sharing stream from a resource-using device 92. User selectable buttons 792 may enable the user to select a device from which to receive an audiovisual signal as well as various audiovisual processing options, while a dial 794 may enable the user to adjust the volume. As should be appreciated, the home theater receiver 786 may be capable of interfacing with another electronic device 10, such as the handheld device 40, through such means as the infrared interface 25 or the network interfaces 26.

The home theater receiver 786 may or may not include the NFC interface 34. If the NFC 34 is present, a user may tap the handheld device 40 to the NFC interface 34 of the home theater receiver 786 to create an NFC communication channel 96. Various resource-sharing information may be transferred across the NFC communication channel 96 according to the techniques described above. If the NFC interface 34 is not present, the home theater receiver 786 may include an RFID tag 118 or a matrix barcode tag 124, either of which may be used by the handheld device 40 to initiate resource-sharing using the techniques described above.

FIGS. 56A-D represent screens that may be displayed on the handheld device 40 following the operation 784 above. Turning first to FIG. 56A, a screen 796 may represent a prompt that may be displayed on the handheld device 40, providing a button 798 labeled, "Share A/V Receiver Resources." The screen 796 may thus prompt the user to launch the resource-sharing application for the purpose of using one or more of resources of the home theater receiver 786. It should be appreciated that the screens of FIGS. 56A-D presume that the home theater receiver 786 has already been added as a device that may share resources with the handheld device 40, in accordance with techniques described above.

Turning to FIG. 56B, a screen 800 may be displayed on the handheld device 40 when the button 798, labeled "Share A/V Receiver Resources," is selected by the user. The screen 800 may include a variety of list items 802 representing resource-sharing schemes for sharing different available resources. Thus, the list items may be labeled, for example, "Radio Programming," "Current Audio," "Current Video," "Attached Speakers," and/or "Attached Video Display." Selecting the list item 802 labeled "Radio Programming" may enable the user to use a stream of radio data from the home theater receiver 786. Accordingly, the handheld device 40 may display a screen 804, as illustrated in FIG. 56C. A button 806, labeled "Listen on Handheld," may send the stream of radio data to the handheld device 40. A button 808, labeled "Send to Other Device," may enable the stream of radio data to be sent to another resource-sharing device 94. Selecting the button 808 may enable the user to select a resource-sharing device 94 having as an available resource an audio output device (e.g., the television 740) in the manner described above with reference to FIG. 54E. It should further be understood that selecting the list items 802 labeled "Current Audio" or "Current Video" may enable the user to use the current audio or video signals of the home theater receiver 786 in a manner similar to that of the radio programming, as described with reference to FIG. 56C.

Similarly, selecting the list item 802 labeled "Attached Speakers" may enable the user to send audio to speakers that may be attached to the home theater receiver 786. Accordingly, the handheld device 40 may display a screen 810, as illustrated in FIG. 56D. A button 812, labeled "Play Handheld Audio," may send audio currently playing on the handheld device 40 to the home theater receiver 786 to play over the attached speakers. A button 814, labeled "Play Audio From Other Source," may enable the stream of radio data to be sent to another resource-sharing device 94. Selecting the button 814 may enable the user to select a resource-sharing device 94 having as an available resource an audio stream (e.g., the television 740) in the manner described above with reference to FIG. 54E. It should further be understood that selecting the list item 802 labeled "Attached Video Display" may enable the user to send video to a display that may be attached to the home theater receiver 786 in a manner similar to that of the attached speakers, as described with reference to FIG. 56D.

As noted above, the computer 62 may represent a resource-sharing device 94 that may share one or more resources with a resource-using device 92, such as another computer 62 or the handheld device 40. While FIGS. 40-41 illustrate using a video display 18 resource of the computer 62, the computer 62 may be capable of sharing many other resources. FIGS. 57A-E may describe the use of such resources of the computer 62 from the handheld device 40. However, it should be understood that other electronic devices 10 may act in place of the computer 62 and the handheld device 40.

Turning first to FIG. 57A, the screen 308 may be displayed on the handheld device 40 following a resource-sharing initiation operation, such as the resource-sharing operation 276 of FIG. 19. If the computer 62 has previously been added as a resource-sharing device 94 using the techniques described above, the resource-sharing application may launch following the selection of the button 310 labeled, "Share iMac Resources."

When the button 310 is selected, a screen 874 may be displayed on the handheld device 40, as illustrated in FIG. 57B. The screen 874 may include a series of list items 876, noting such available resources as "Integrated Resources," which may include available integrated components of the computer 62, "Peripheral Resources," which may include available peripherals communicably coupled to the computer 62, and "Software Resources," which may include available software that may be running on the computer 62. Selecting the first list item 876, labeled "Integrated Resources," may cause the handheld device 40 to display a screen 878, as illustrated in FIG. 61C.

The screen 878 of FIG. 57C may list as resources various integrated components of the computer 62 in a series of list items 880. Selecting each of the list items 880 may enable the handheld device 40 to employ the various resources. For example, selecting the list item 880 labeled "Monitor" may enable the handheld device 40 to send video to an integrated monitor in the manner described above with reference to FIGS. 40-41. Selecting the list item 880 labeled "Storage Devices" may enable the handheld device 40 to access the nonvolatile storage 16 of the computer 62. Selecting the list item 880 labeled "Optical Drive" may enable the handheld device 40 to read optical discs that may be read on an optical drive of the computer 62. Selecting the list item 880 labeled "USB Port" may enable the handheld device 40 to receive data obtained through the wired I/O interface 18 of the computer 62. Particularly with regard to storage or I/O resources, such as the "Storage Devices," "Optical Drive," or "USB Port" resources, it should be appreciated that depending on the particular resource-sharing scheme provided in the resource-sharing software plug-in, the handheld device 40 may be capable of treating such resources as an extension of its own capabilities. By way of example, access to the "Storage Devices" resource of the computer 62 may map a portion of the nonvolatile storage 16 of the computer 62 as a network drive accessible to the handheld device 40. Additional integrated resources of the computer 62 may include, for example, the list items 880 labeled "Microphone," "iSight Camera," or "Speakers." Each may be employed by the handheld device 40 in the manners described above with reference to the use of the video display 18 of the computer 62.

If the second list item 876 of the screen 874, labeled "Peripheral Resources," is selected, the handheld device 40 may display a screen 882 as illustrated in FIG. 57D. The screen 882 may list a variety of peripheral resources that may appear as list items 884. Selecting each of the list items 884 may enable the handheld device 40 to employ the various resources. For example, selecting the list item 884 labeled "Keyboard" may enable the user to type on a keyboard attached to the computer 62 to input text onto the handheld device 40. Selecting the list item 884 labeled "Mouse" may enable the user to use a mouse attached to the computer 62 to navigate the handheld device 40. It should be appreciated that the combined use of certain resources, such as the video monitor accessible via the screen 878 with the keyboard and mouse peripherals available via the screen 882, may enable a particularly effective manner of using the handheld device 40 in conjunction with the computer 62. Additional peripherals that may be communicably coupled to the computer 62 and accessible as resources may include the list items 884 labeled "External Storage," "Printer," and/or "Scanner." It should be appreciated that selecting each of the remaining list items 884 may enable the handheld device 40 to use the attached peripheral devices as if the devices were instead coupled to the handheld device 40.

Figure 57E:
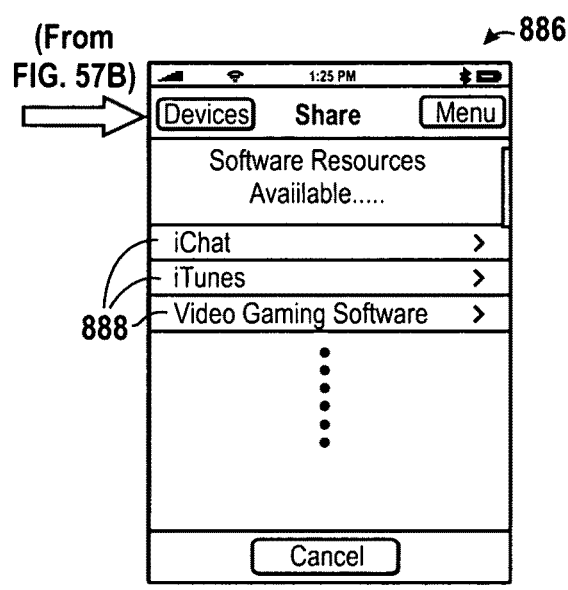
Figure 58:
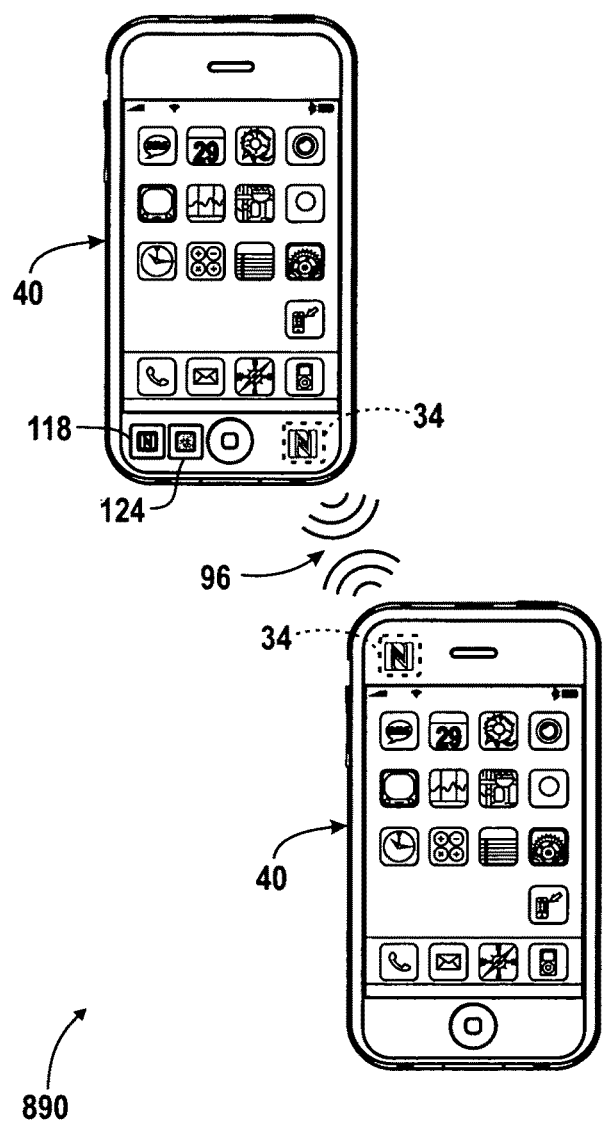
FIG. 58 is a schematic of a resource-sharing operation for establishing resource-sharing between two handheld devices of FIG. 2.

If the third list item 876, labeled "Software Resources," is selected, the handheld device 40 may display a screen 886, which may list a series of software resources that may appear as list items 888, as illustrated in FIG. 57E. Selecting each of the list items 884 may enable the handheld device 40 to employ the various software resources. For example, selecting the list item 888 labeled "iChat" may enable the user to participate in a remote meeting using remote meeting software running on the computer 62. Selecting the list item 888 labeled "iTunes" may enable the user to temporarily access a music library stored on the computer 62 and to play music by streaming it from the computer 62. Selecting the list item 888 labeled "Video Game Software" may enable the user to access video game resources on the computer 62 in the manner described above with reference to the video game system 728.

FIGS. 58-59 relate to using one or more resources of a handheld device 40 from another electronic device 10, such as another handheld device 40. Turning first to FIG. 58, a resource-sharing operation 890 may take place between a first handheld device 40 and a second handheld device 40. The second handheld device 40 may or may not include the NFC interface 34. If the NFC 34 is present, a user may tap the first handheld device 40 to the NFC interface 34 of the second handheld device 40 to create an NFC communication channel 96. Various resource-sharing information may be transferred across the NFC communication channel 96 according to the techniques described above. If the NFC interface 34 is not present, the home theater receiver 786 may include an RFID tag 118 or a matrix barcode tag 124, either of which may be used by the handheld device 40 to initiate resource-sharing using the techniques described above.

Figures 59A, 59B:
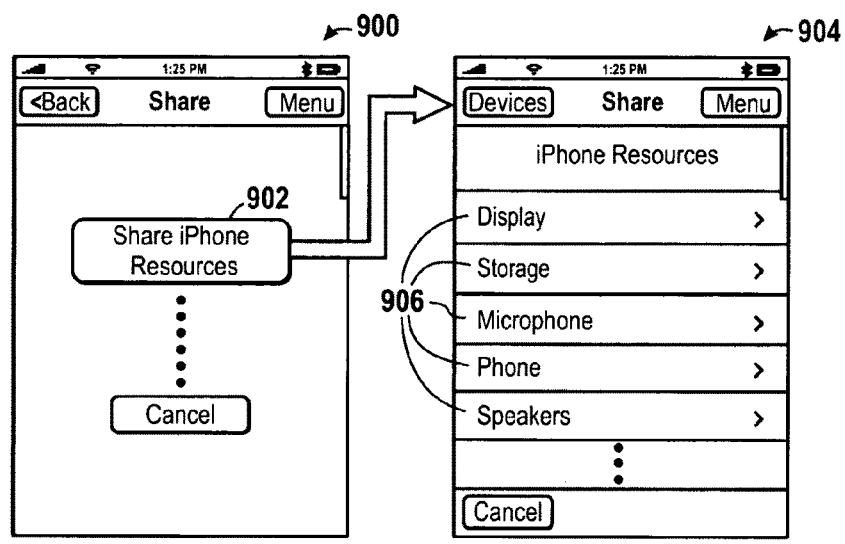
FIGS. 59A-B are schematics of screens that may be displayed for using the resources of a handheld device of FIG. 2.

FIGS. 59A-B represent screens that may be displayed on the first handheld device 40 following the operation 890 above. Turning first to FIG. 59A, a screen 900 may represent a prompt that may be displayed on the handheld device 40, providing a button 902 labeled, "Share iPhone Resources." The screen 900 may thus prompt the user to launch the resource-sharing application for the purpose of using one or more of resources of the second handheld device 40. It should be appreciated that the screens of FIGS. 59A-B presume that the second handheld device 40 has already been added as a device that may share resources with the first handheld device 40, in accordance with techniques described above.

When the resource-sharing application launches following the selection of the button 902, labeled "Share iPhone Resources," the first handheld device 40 may display a screen 904, as illustrated in FIG. 59B. The screen 904 may include a series of selectable list items 906, which may list various resources of the second handheld device 40 that may be accessible via the first handheld device 40. For example, a first list item 906 may be labeled "Display," and may enable the first handheld device 40 to send video data to be displayed on the display 18 of the second handheld device 40. A second list item 906 may be labeled "Storage," and may enable the first handheld device 40 to access at least a portion of the nonvolatile storage 16 of the second handheld device 40. A third list item 906 may be labeled "Microphone," and may enable the first handheld device 40 to use a microphone of the second handheld device 40 as if it were operably coupled to the first handheld device 40. By sharing the microphone of the second handheld device 40 with the first handheld device 40, it may be possible to make stereo recordings. A fourth list item 906 may be labeled "Phone," and may enable the first handheld device 40 to utilize telephone capabilities of the second handheld device 40, which may allow, for example, certain conference calling capabilities. A fifth list item 906 may be labeled "Speakers," and may enable the first handheld device 40 to send audio to the second handheld device 40 in the manners described above with reference to FIG. 46C.

FIGS. 60-61 relate to using one or more resources of a printer from another electronic device 10, such as the handheld device 40. Turning first to FIG. 60, a resource-sharing operation 910 may take place between the handheld device 40 and printer 912, which may represent an embodiment of the electronic device 10 of FIG. 1. The printer 912 may include internal circuitry such as the network interfaces 26, which may be configured to connect the printer 912 to other electronic devices 10 on one or more networks. A hardware power button 913 may enable the printer 912 to be switched on or off in hardware, and a display screen 914 may enable manual control at the printer 910 using a series of buttons 916. Indicator lights 918 may indicate, for example, whether the device is on or off or responding to a resource-sharing stream from a resource-using device 92. As should be appreciated, the printer 912 may be capable of interfacing with another electronic device 10, such as the handheld device 40, through such means as the network interfaces 26.

The printer 912 may or may not include the NFC interface 34. If the NFC 34 is present, a user may tap the handheld device 40 to the NFC interface 34 of the printer 912 to create an NFC communication channel 96. Various resource-sharing information may be transferred across the NFC communication channel 96 according to the techniques described above. If the NFC interface 34 is not present, the printer 912 may include an RFID tag 118 or a matrix barcode tag 124, either of which may be used by the handheld device 40 to initiate resource-sharing using the techniques described above.

FIGS. 61A-B represent screens that may be displayed on the handheld device 40 following the operation 910 above. Turning first to FIG. 61A, a screen 930 may represent a prompt that may be displayed on the handheld device 40, providing a button 932 labeled, "Share Printer Resources." The screen 930 may thus prompt the user to launch the resource-sharing application for the purpose of using one or more of resources of the printer 912. It should be appreciated that the screens of FIGS. 61A-B presume that the printer 912 has already been added as a device that may share resources with the handheld device 40, in accordance with techniques described above.

Turning to FIG. 61B, a screen 934 may be displayed on the handheld device 40 when the button 932, labeled "Share Printer Resources," is selected by the user. The screen 934 may indicate that the printer 912 may be set to be a default printer for the handheld device 40. As such, a button 936 may enable the user to set the printer 912 as the default printer. After the printer 912 is set as the default printer, the handheld device 40 may thereafter be capable of printing from the printer 912.

FIGS. 62-63 illustrate using the handheld device 40 to use a resource of a digital projector using the techniques described above. FIG. 62 depicts a resource-sharing operation 966 for using the resources of a projector 968 from the handheld device 40. The projector 968 may represent an embodiment of the electronic device 10 having a capability to display video data, which may be received via the I/O interface 24 or other means from a computer 62 or other electronic device 10. The projector 968 may include an optical element 970 for projecting the video data and may be capable of establishing a connection using one of the communication channels 90 as described above with reference to FIG. 7.

The projector 968 may or may not include the NFC interface 34. If the NFC 34 is present, a user may tap the handheld device 40 to the NFC interface 34 of the projector 968 to create an NFC communication channel 96. Various resource-sharing information may be transferred across the NFC communication channel 96 according to the techniques described above. If the NFC interface 34 is not present, the projector 968 may include an RFID tag 118 or a matrix barcode tag 124, either of which may be used by the handheld device 40 to initiate resource-sharing using the techniques described above.

Figures 63A, 63B:
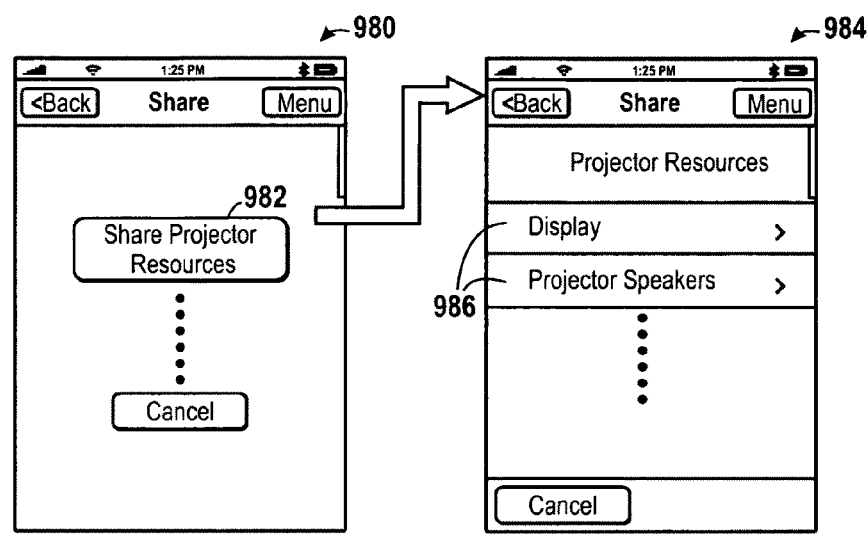
FIGS. 63A-B are schematics of screens that may be displayed for using the resources of the projector of FIG. 62.

FIGS. 63A-B depict screens that may be displayed on the handheld device 40 following the resource-sharing operation 966. FIG. 63A illustrates a screen 980, which may be displayed on the handheld device 40 as a prompt to a user to use a resource of the projector 968. The screen 980 may include a variety of buttons 982, including, for example, a button 982, labeled "Share Projector Resources." Selecting the button 982 may launch the resource-sharing application that may run on the handheld device 40, and a screen 984, as illustrated in FIG. 63B, may be displayed. The screen 984 may include a series of list items 986, which may enable a user to select various resources of the projector 968 for use from the handheld device 40. By way of example, selecting the list item 986 labeled "Display" may enable the handheld device 40 to send video data from the handheld device 40 or another resource-sharing device 94 to the projector 968. Similarly, selecting the list item 986 labeled "Projector Speakers" may enable the handheld device 40 to send audio data from the handheld device 40 or another resource-sharing device 94 to the projector 968. As should be appreciated, using the resources of the projector 968 listed above may take place in the manner described above with reference to FIG. 46C.

Figure 64:
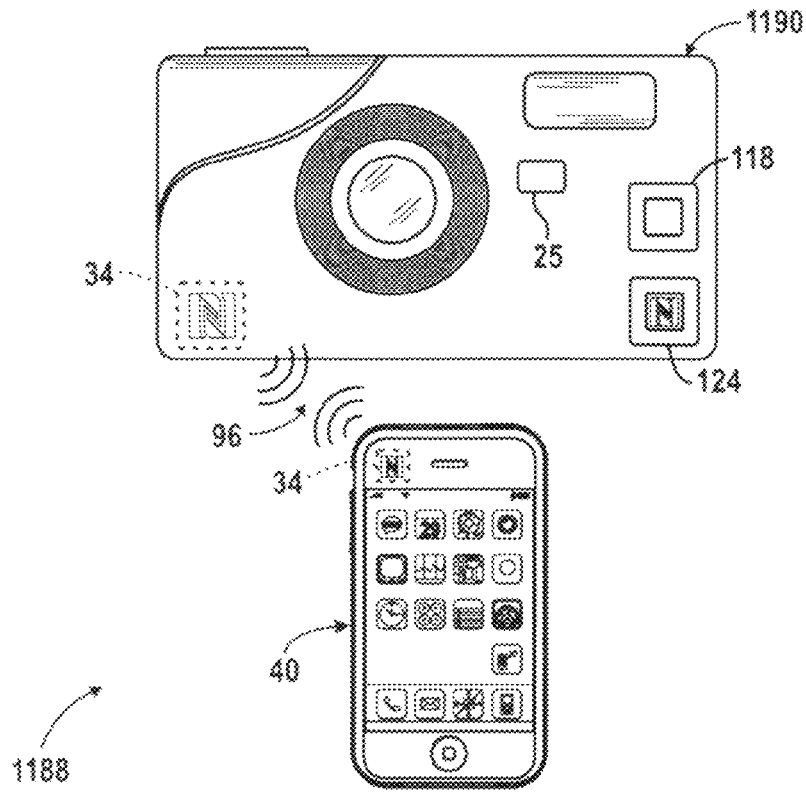
FIG. 64 is a schematic of a resource-sharing operation for establishing resource-sharing with a digital camera.

FIGS. 64-65 illustrate sharing one or more resources of a networkable digital camera using the handheld device 40 and the techniques described above. FIG. 64 depicts a resource-sharing operation 1188 for using the resources of a digital camera 1190 using a handheld device 40. The digital camera 1190 may be any digital camera capable of interfacing with a network or over the Internet, and may represent an embodiment of the electronic device 10. The digital camera 1190 may include, among other things, an infrared interface 25 that may be used to initiate an image capture on the digital camera 1190.

The digital camera 1190 may or may not include the NFC interface 34. If the NFC 34 is present, a user may tap the handheld device 40 to the NFC interface 34 of the digital camera 1190 to create an NFC communication channel 96. Various resource-sharing information may be transferred across the NFC communication channel 96 according to the techniques described above. If the NFC interface 34 is not present, the digital camera 1190 may include an RFID tag 118 or a matrix barcode tag 124, either of which may be used by the handheld device 40 to initiate resource-sharing using the techniques described above.

Figures 65A, 65B:
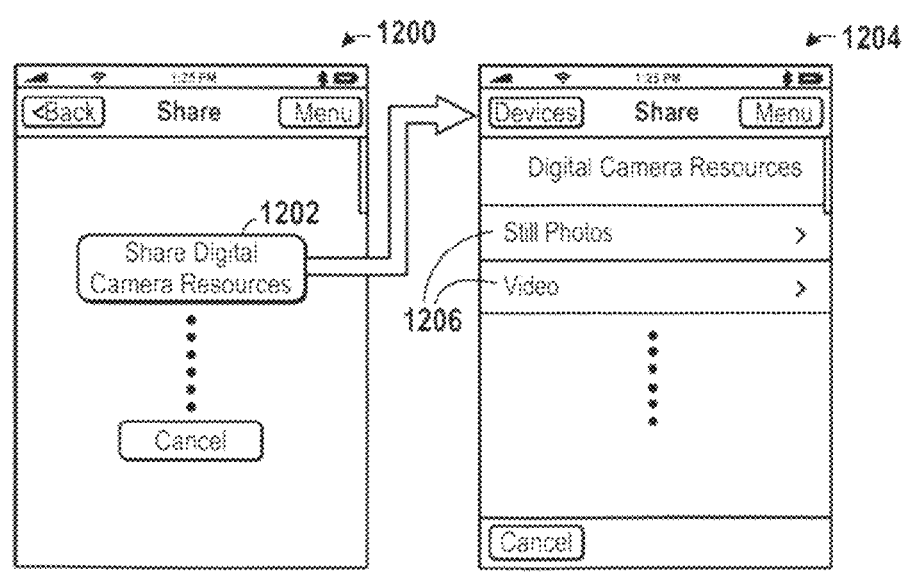
FIGS. 65A-B are schematics of screens that may be displayed for using the resources of the digital camera of FIG. 64.

FIGS. 65A-B represent screens that may be displayed on the handheld device 40 following the resource-sharing operation 1188. FIG. 65A depicts a screen 1200, which may represent a prompt to use a resource of the digital camera 1190 following the resource-sharing operation 1188 of FIG. 64. The screen 1200 may include a button 1194, labeled "Share Digital Camera Resources." Selecting the button 1194 may cause the handheld device 40 to launch the resource-sharing application and to display a screen 1204, as illustrated in FIG. 65B. The screen 1204 may list a series of resource-sharing schemes as list items 1206. A list item 1206 labeled "Still Photos" may enable the handheld device 40 to receive still images captured by the digital camera 1190. A list items 1206 labeled "Video" may enable the handheld device 40 to receive video captured by the digital camera 1190. Such resources may, for example, provide a source of video data for use in a video conference call.

Figure 66:
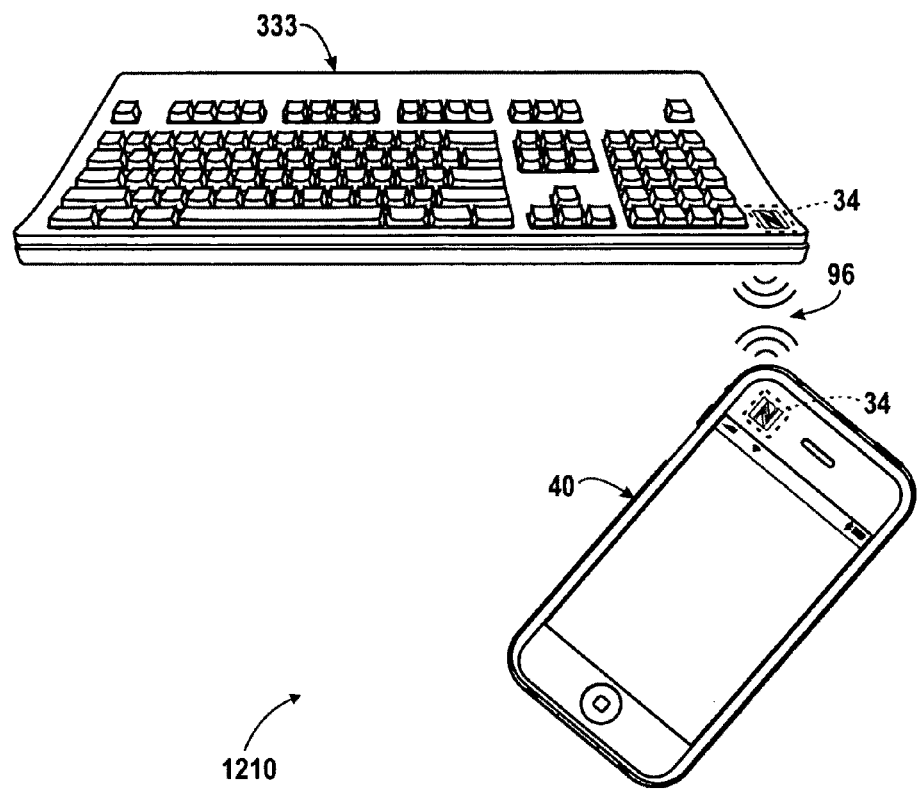
FIG. 66 is a schematic of a resource-sharing operation for establishing resource-sharing with a keyboard.
Figure 67:
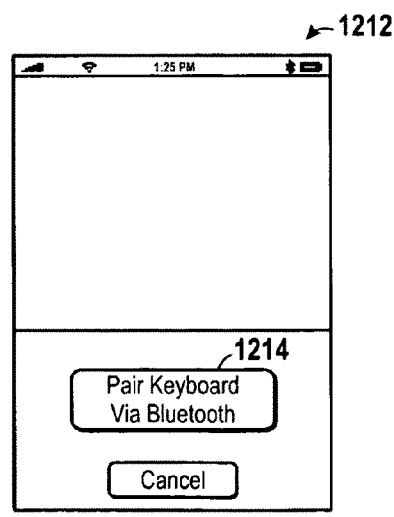
FIG. 67 is a schematic of a screen that may be displayed for using the resources of the keyboard of FIG. 66.

FIGS. 66-67 describe an alternative manner of sharing resources directly from a peripheral resource-sharing device 94 to a resource-using device 92. In a resource-sharing operation 1210 illustrated by FIG. 66, a keyboard 333 may represent a peripheral resource-sharing device 94 and the handheld device 40 may represent a resource-using device 92. The keyboard 333 may represent an embodiment of the electronic device 10 of FIG. 1, and may include the NFC interface 34 and the PAN interface 28. However, it should be understood that the resource-sharing device 94 may be represented by any peripheral device having the NFC interface 34 and the PAN interface 28, such as a mouse, input tablet, etc.

A user may tap the handheld device 40 to the NFC interface 34 of the keyboard 333 to create an NFC communication channel 96. Various resource-sharing information may be transferred across the NFC communication channel 96 according to the techniques described above. Particularly, communication between the handheld device 40 and the keyboard 333 may take place in the manner described above with reference to FIGS. 13 and/or 20. Thus, the handheld device 40 may receive sufficient information from the keyboard 333 to establish a link via the PAN communication channel 98, through which capabilities of the keyboard 333 may be shared with the handheld device 40.

Turning to FIG. 67, the handheld device 40 may display a screen 1212 following the resource-sharing operation 1210 of FIG. 66. Particularly, the screen 1212 may include a prompt 1214 to pair directly to the keyboard 333 via Bluetooth, which may appear in addition or alternatively to an option to share resources with any communicably coupled computer 62. The option to pair directly to the keyboard 333 may stem from information received during the resource-sharing operation 1210 of FIG. 66, such as may have been exchanged in device profiles or in network configuration information, as described above with reference to FIGS. 13 and/or 20. Once paired, typing on the keyboard 333 may input characters onto the handheld device 40, as a resource-sharing stream over the PAN communication channel 98 may enable the keyboard 333 resources to be shared with the handheld device 40.

One or more specific embodiments of the present invention have described above. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

What is claimed is:

1. A method comprising:
   establishing, by a handheld device, communication with a computing device via a first communication channel;
   receiving, by the handheld device, through the first communication channel, resource-sharing information that includes information identifying the computing device and information identifying a particular hardware device of the computing device;
   prompting, by the handheld device, a user to use the particular hardware device of the computing device with the handheld device, wherein the resource-sharing information further includes information sufficient to enable the handheld device to use the particular hardware device;
   receiving, by the handheld device, an approval from the computing device to use the particular hardware device of the computing device, in response to the computing device determining that the particular hardware device is available;
   obtaining, by the handheld device, a resource-sharing software plug-in described in the resource-sharing information, wherein the resource-sharing software plug-in enables the particular hardware device to use a resource-sharing stream of data between the handheld device and the computing device;
   locating, by the handheld device, the computing device using a network address specified in the resource-sharing information;
   establishing, by the handheld device, a connection with the computing device via a second communication channel in response to locating the computing device; and
   using, by the handheld device, the particular hardware device of the computing device with the resource-sharing stream of data between the handheld device and the computing device based on the resource-sharing software plug-in.

2. The method of claim 1, wherein the resource-sharing information is received in a near field communication interface of handheld device.

3. The method of claim 1, wherein the resource-sharing information is received from a radio frequency identification tag associated with the computing device.

4. The method of claim 1, wherein the information identifying the computing device includes a serial number of the computing device.

5. The method of claim 1, wherein the first communication channel is a near-field (NFC) communication channel, and the second communication channel is an Internet Protocol (IP) communication channel.

6. The method of claim 1, wherein locating the computing device includes searching a communication network for the network address.

7. The method of claim 1, wherein locating the computing device includes contacting a web service to obtain the network address.

8. The method of claim 1, wherein obtaining the resource-sharing software plug-in includes receiving the plug-in from the computing device.

9. The method of claim 1, wherein obtaining the resource-sharing software plug-in includes receiving the plug-in from a web service.

10. The method of claim 1, wherein the second communication channel comprises a local area network connection, a personal area network connection, a wide area network connection, a wired input/output connection, an infrared connection, an Internet connection, or a combination thereof.

11. The method of claim 1, wherein using the particular hardware device of the computing device comprises sharing at least one hardware resource of a media player, a computer, a digital video recorder, an optical disc player, a cable or satellite television receiver, a video game system, a digital television, a home theater receiver, a digital projector, a handheld computer, a printer, a portable phone, a digital camera, or a keyboard, or any combination thereof.

12. The method of claim 1, wherein using the particular hardware device comprises using a display associated with the computing device, a microphone associated with the computing device, an optical disc player associated with the computing device, a television receiver associated with the computing device, speakers associated with the computing device, a radio receiver associated with the electronic computing device, a storage device associated with the computing device, an input/output port associated with the computing device, a camera associated with the computing device, a keyboard associated with the computing device, a mouse associated with the computing device, a printer associated with the computing device, a scanner associated with the computing device, or a digital projector output associated with the computing device, or any combination thereof.

13. A handheld electronic device comprising:
   a processor configured to:
   establish communication with a computing device via a first communication channel;
   receive, through the first communication channel, resource-sharing information that includes information identifying the computing device and information identifying a particular hardware device of the computing device;
   prompt a user to use the particular hardware device of the computing device with the handheld device, wherein the resource-sharing information further includes information sufficient to enable the handheld device to use the particular hardware device;
   receive an approval from the computing device to use the particular hardware device of the computing device, in response to the computing device determining that the particular hardware device is available;
   obtain a resource-sharing software plug-in described in the resource-sharing information, wherein the resource-sharing software plug-in enables the particular hardware device to use a resource-sharing stream of data between the handheld device and the computing device;
   locate the computing device using a network address specified in the resource-sharing information;
   establish a connection with the computing device via a second communication channel in response to locating the computing device; and
   use the particular hardware device of the computing device with the resource-sharing stream of data between the handheld device and the computing device based on the resource-sharing software plug-in.

14. The device of claim 13, wherein the resource-sharing information is received in a near field communication interface of the handheld electronic device.

15. The device of claim 13, wherein the resource-sharing information is received from a radio frequency identification tag associated with the computing device.

16. A non-transitory machine-readable medium for a computer system, the non-transitory machine-readable medium having stored thereon a series of instructions executable by a processor, the series of instructions comprising:

instructions that cause the processor to establish communication with a computing device via a first communication channel;

instructions that cause the processor to receive, through the first communication channel, resource-sharing information that includes information identifying the computing device and information identifying a particular hardware device of the computing device;

instructions that cause the processor to prompt a user to use the particular hardware device of the computing device with the handheld device, wherein the resource-sharing information further includes information sufficient to enable the handheld device to use the particular hardware device;

instructions that cause the processor to receive an approval from the computing device to use the particular hardware device of the computing device, in response to the computing device determining that the particular hardware device is available;

instructions that cause the processor to obtain a resource-sharing software plug-in described in the resource-sharing information, wherein the resource-sharing software plug-in enables the particular hardware device to use a resource-sharing stream of data between the handheld device and the computing device;

instructions that cause the processor to locate the computing device using a network address specified in the resource-sharing information;

instructions that cause the processor to establish a connection with the computing device via a second communication channel in response to locating the computing device; and instructions that cause the processor to use the particular hardware device of the computing device with the resource-sharing stream of data between the handheld device and the computing device based on the resource-sharing software plug-in.

17. The medium of claim 16, wherein the first communication channel is a near-field (NFC) communication channel, and the second communication channel is an Internet Protocol (IP) communication channel.

18. The medium of claim 16, wherein the instructions that cause the processor to locate the computing device include instructions that cause the processor to search a communication network for the network address.

19. The medium of claim 16, wherein the instructions that cause the processor to obtain the resource-sharing software plug-in include instructions that cause the processor to receive the plug-in from the computing device.

* * * * *

UNITED STATES PATENT AND TRADEMARK OFFICE
CERTIFICATE OF CORRECTION

PATENT NO. : 8,850,052 B2  
APPLICATION NO. : 12/286495  
DATED : September 30, 2014  
INVENTOR(S) : Michael Rosenblatt et al.

It is certified that error appears in the above-identified patent and that said Letters Patent is hereby corrected as shown below:

In the Claims:

Column 51, line 40 (Claim 2, line 3): "of handheld device" should read --of the handheld device--.

Column 52, lines 16-17 (Claim 12, lines 7-8): "the electronic computing device" should read --the computing device--.

Column 52, line 58 (Claim 14, line 1): "The device" should read --The handheld electronic device--.

Column 52, line 61 (Claim 15, line 1): "The device" should read --The handheld electronic device--.

Column 53, line 11 (Claim 16, line 15): "the handheld device" should read --a handheld device--.

Signed and Sealed this
Fourteenth Day of April, 2015

Michelle K. Lee
*Director of the United States Patent and Trademark Office*